United States Patent
Hiratsuka

(10) Patent No.: US 12,463,825 B2
(45) Date of Patent: Nov. 4, 2025

(54) IMAGE PROCESSING APPARATUS AND METHOD

(71) Applicant: Sony Group Corporation, Tokyo (JP)

(72) Inventor: Yosuke Hiratsuka, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 196 days.

(21) Appl. No.: 18/257,559

(22) PCT Filed: Oct. 28, 2021

(86) PCT No.: PCT/JP2021/039772
§ 371 (c)(1),
(2) Date: Jun. 14, 2023

(87) PCT Pub. No.: WO2022/137798
PCT Pub. Date: Jun. 30, 2022

(65) Prior Publication Data
US 2024/0113891 A1 Apr. 4, 2024

Related U.S. Application Data

(60) Provisional application No. 63/128,260, filed on Dec. 21, 2020.

(51) Int. Cl.
*H04L 9/40* (2022.01)
*G06T 7/55* (2017.01)
(Continued)

(52) U.S. Cl.
CPC .............. *H04L 9/3247* (2013.01); *G06T 7/55* (2017.01); *G06V 20/95* (2022.01)

(58) Field of Classification Search
CPC .......... H04L 9/3247; G06T 7/55; G06V 20/95
See application file for complete search history.

(56) References Cited

U.S. PATENT DOCUMENTS 6,762,766 B1 * 7/2004 Nakayama ............. G01C 11/06
345/581
8,077,964 B2 * 12/2011 Berestov .............. H04N 13/204
382/285
(Continued)

FOREIGN PATENT DOCUMENTS

CN 110519297 A 11/2019
JP H05266176 A 10/1993
(Continued)

OTHER PUBLICATIONS

International Search Report (PCT/ISA/210), International Application No. PCT/JP2021/039772, dated Jan. 11, 2022.

*Primary Examiner* — Ghodrat Jamshidi
(74) *Attorney, Agent, or Firm* — Michael Best & Friedrich LLP

(57) ABSTRACT

The present disclosure relates to an image processing apparatus and method capable of more accurately determining authenticity of an image.

An image of a subject is acquired by capturing an optical image from the subject, 3D information is acquired from the optical image on the same optical axis as the image, and a signature of the image and the 3D information is generated. Furthermore, by comparing the image with the 3D information acquired on the same optical axis as the image, authenticity of the image is confirmed. The present disclosure can be applied to, for example, an image processing apparatus, an image processing method, or the like.

24 Claims, 45 Drawing Sheets

(51) Int. Cl.
   *G06V 20/00*   (2022.01)
   *H04L 9/32*   (2006.01)

(56) References Cited

U.S. PATENT DOCUMENTS

| | | | | |
|---|---|---|---|---|
| 9,207,766 | B1* | 12/2015 | Arbour, Jr. | G06V 40/1312 |
| 9,314,692 | B2* | 4/2016 | Konoplev | A63F 13/10 |
| 10,382,736 | B1* | 8/2019 | Thurner | G01S 17/36 |
| 2002/0051577 | A1 | 5/2002 | Kinjo | |
| 2004/0112962 | A1 | 6/2004 | Farrall | |
| 2012/0230606 | A1* | 9/2012 | Sugiyama | H04N 23/698 |
| | | | | 382/284 |
| 2012/0295527 | A1* | 11/2012 | Hattori | A22C 17/004 |
| | | | | 452/136 |
| 2012/0324714 | A1* | 12/2012 | Ui | H04N 25/77 |
| | | | | 257/E31.113 |
| 2013/0073619 | A1* | 3/2013 | Tumuluri | H04L 67/131 |
| | | | | 709/204 |
| 2013/0201322 | A1* | 8/2013 | Park | G02B 21/16 |
| | | | | 359/385 |
| 2014/0085293 | A1* | 3/2014 | Konoplev | A63F 13/55 |
| | | | | 345/419 |
| 2014/0372390 | A1* | 12/2014 | Matsuzawa | G06F 16/51 |
| | | | | 707/693 |
| 2016/0042557 | A1* | 2/2016 | Lin | G06T 7/73 |
| | | | | 345/426 |
| 2016/0266255 | A1* | 9/2016 | Nishikawa | H04N 25/13 |
| 2018/0088307 | A1* | 3/2018 | Nakatsuka | G06T 7/20 |
| 2018/0165828 | A1* | 6/2018 | Sasatani | G06V 40/10 |
| 2019/0180419 | A1* | 6/2019 | Smit | G06T 5/70 |
| 2020/0066394 | A1* | 2/2020 | Toyoda | G16H 10/60 |
| 2020/0296253 | A1* | 9/2020 | Ichikawa | H04N 1/32283 |
| 2021/0399886 | A1* | 12/2021 | Dhanabalan | G06F 16/176 |

FOREIGN PATENT DOCUMENTS

| | | | | |
|---|---|---|---|---|
| JP | 2002198958 | A | 7/2002 | |
| JP | 2004356802 | A | 12/2004 | |
| JP | 2007201606 | A | 8/2007 | |
| JP | 2010154499 | A | 7/2010 | |
| JP | 2012054754 | A | 3/2012 | |
| JP | 2012191486 | A | 10/2012 | |
| JP | 2015002441 | A | 1/2015 | |
| JP | 2017188839 | A | 1/2017 | |
| WO | WO 2012005730 | * | 1/2012 | G06Q 10/10 |
| WO | WO-2018079031 | A1 | 5/2018 | |
| WO | 2020246166 | A1 | 12/2020 | |

* cited by examiner

FIG. 5

| DEVICE UNIQUE ID | DEVICE PUBLIC KEY | INVALIDATION DATE |
|---|---|---|
| 2312d4rs | Lkjfaif30asfoij aseojiafezjv······ | Null |
| 34rsdf1ws | Lkjfaif30asfoij aseojiafezjv······ | 2020/8/1 |

223

IMAGE PROCESSING APPARATUS AND METHOD

TECHNICAL FIELD

The present disclosure relates to an image processing apparatus and method, and more particularly, to an image processing apparatus and method capable of more accurately determining authenticity of an image.

BACKGROUND ART

Conventionally, a method has been proposed in which a captured image or the like is converted into a hash value in a digital camera or the like, and an electronic signature using the hash value is added to the captured image to be used for detection of falsification of the captured image. However, in this method, it is not possible to detect a false image generated by so-called trick shooting or the like.

Therefore, a method of detecting a false image on the basis of consistency between information indicating a focal length at the time of imaging and a focal length obtained from a captured image has been considered (see, for example, Patent Document 1). Furthermore, a method of detecting a false image by determining whether or not a subject of a captured image is a plane on the basis of multi-point distance measurement data of a camera has been considered (see, for example, Patent Document 2).

CITATION LIST

Patent Document

Patent Document 1: WO 2020/246166 A
Patent Document 2: Japanese Patent Application Laid-Open No. 2002-198958

SUMMARY OF THE INVENTION

Problems to be Solved by the Invention

However, in the method described in Patent Document 1, only the consistency of the focal length is determined, and the consistency such as the unevenness of the subject cannot be confirmed. In addition, in the method described in Patent Document 2, only whether or not the subject is a plane is determined, and it is not possible to confirm consistency such as unevenness of the subject. In addition, there is no guarantee that the subject of the captured image and the subject (distance measurement target) of the distance measurement data are the same. Therefore, there is a possibility that detection of a false image becomes inaccurate.

The present disclosure has been made in view of such a situation, and an object thereof is to enable more accurate determination of authenticity of an image.

Solutions to Problems

An image processing apparatus according to one aspect of the present technology is an image processing apparatus including: an image acquisition unit that acquires an image of a subject by capturing an optical image from the subject; a 3D information acquisition unit that acquires 3D information from the optical image on a same optical axis as the image; and a signature generation unit that generates a signature of the image and the 3D information.

An image processing method according to one aspect of the present technology is an image processing method including: acquiring an image of a subject by capturing an optical image from the subject; acquiring 3D information from the optical image on a same optical axis as the image; and generating a signature of the image and the 3D information.

An image processing apparatus according to another aspect of the present technology is an image processing apparatus including: an image confirmation processing unit that confirms authenticity of the image by comparing the image with 3D information acquired on the same optical axis as the image.

An image processing method according to another aspect of the present technology is an image processing method including confirming authenticity of an image by comparing the image with 3D information acquired on a same optical axis as the image In the image processing apparatus and method according to one aspect of the present technology, an image of a subject is acquired by capturing an optical image from the subject, 3D information is acquired from the optical image on the same optical axis as the image, and a signature of the image and the 3D information is generated.

In an image processing apparatus and method according to another aspect of the present technology, authenticity of an image is confirmed by comparing the image with 3D information acquired on the same optical axis.

BRIEF DESCRIPTION OF DRAWINGS

FIG. 5 is a diagram illustrating an example of a device public key database.

MODE FOR CARRYING OUT THE INVENTION

Figure 1:
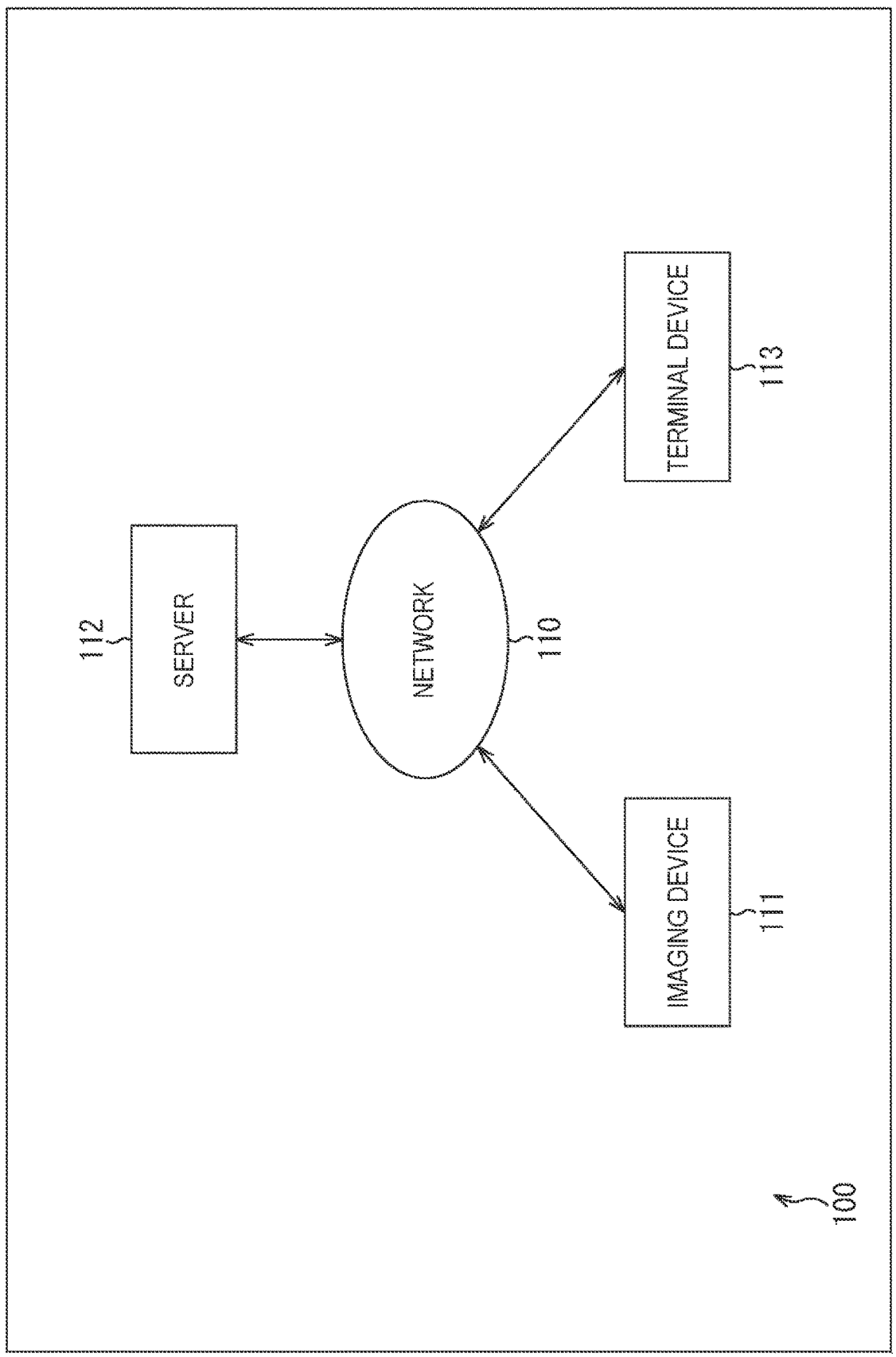
FIG. 1 is a block diagram illustrating a main configuration example of an image processing system.

Hereinafter, modes for carrying out the present disclosure (hereinafter referred to as embodiments) will be described. Note that the description will be given in the following order.

1. Detection of False Image
2. Detection of False Image Using 3D Information
3. Reduced Image Signature
4. Reflection of Captured Image Modification on 3D Information
5. Application Example
6. Appendix

1. DETECTION OF FALSE IMAGE

Conventionally, a method has been proposed in which a captured image or the like is converted into a hash value in a digital camera or the like, and an electronic signature using the hash value is added to the captured image to be used for detection of falsification of the captured image. However, in this method, it is not possible to detect a false image generated by so-called trick shooting or the like. The false image is a captured image in which a non-existent situation appears to exist, that is, a captured image of a non-existent situation that looks like a captured image obtained by capturing a real situation. Trick shooting refers to a shooting technique of generating a false image by using a tool, devising shooting, or the like.

Therefore, for example, as described in Patent Document 1, a method of detecting a false image on the basis of consistency between information indicating a focal length at the time of imaging and a focal length obtained from a captured image has been considered. Furthermore, for example, as described in Patent Document 2, a method of detecting a false image by determining whether or not a subject of a captured image is a plane on the basis of multi-point distance measurement data of a camera has been considered.

However, in these methods, there is a possibility that detection of a false image becomes inaccurate. For example, in the method described in Patent Document 1, only the consistency of the focal length is determined, and the consistency of the unevenness or the like of the subject cannot be confirmed. Therefore, for example, even in the case of a false image that is generated by capturing a face photograph or the like and pretends as if the subject of the photograph is captured, it is difficult to detect the false image by the method described in Patent Document 1, if the focal length matches the metadata.

In addition, in the method described in Patent Document 2, there is a possibility that distance measurement data is obtained on an optical axis different from the captured image. Therefore, for example, it has been possible to easily perform a trick shooting such as capturing a face photograph or the like and detecting a distance to a person different from the subject of the face photograph. Therefore, in a case where a captured image of a face photograph (that is, a false image) and distance measurement data having unevenness are obtained by the above-described trick shooting, it is difficult to detect the false image by the method described in Patent Document 2.

2. DETECTION OF FALSE IMAGE USING 3D INFORMATION

Therefore, in an imaging device that images a subject and generates an image, 3D information is acquired on the same optical axis as the image, and a signature of the image and the 3D information is generated.

For example, an image processing apparatus includes an image acquisition unit that acquires an image of a subject by capturing an optical image from the subject, a 3D information acquisition unit that acquires 3D information from the optical image on the same optical axis as the image, and a signature generation unit that generates a signature of the image and the 3D information.

For example, in an image processing method, an image of a subject is acquired by capturing an optical image from the subject, 3D information is acquired from the optical image on the same optical axis as the image, and a signature of the image and the 3D information is generated.

Here, the image generated by the image generation unit is a captured image obtained by capturing an optical image from a subject, that is, an image obtained by the image generation unit receiving light from the subject and performing photoelectric conversion. This image may be a RAW image or a YUV image. Furthermore, this image may be encoded, for example, as a joint photographic experts group (JPEG) image. Further, this image may be a still image or a moving image.

Furthermore, the 3D information (three-dimensional information) generated by the 3D information generation unit may be distance-related information of the subject. Furthermore, the 3D information may be information generated using the distance-related information. Furthermore, the 3D information may be information including both of them. That is, the "acquisition" of the 3D information may be to detect the distance-related information from the optical image. Furthermore, the "acquisition" of the 3D information may be that the distance-related information is detected from the optical image, and the other information is generated from the detected distance-related information.

The distance-related information may be distance information itself from the image processing apparatus to the subject, such as a depth map. Furthermore, the distance-related information may be information necessary for calculating distance information from the image processing apparatus to the subject, such as phase difference data and time of flight (ToF) data. Furthermore, the distance-related information may be a set of parallax images (for example, a set of images when captured by shaking the imaging device sideways in the 3D swing panoramic mode). For example, as described in Japanese Patent Application Laid-Open No. 2012-70154, a parallax image can be generated by performing swing imaging in which an imaging device is laterally swung.

In addition, the optical axis refers to a principal ray passing through the center of a light flux passing through the entire system in the optical system. "Acquiring the 3D information from the optical image on the same optical axis as the image" means that the optical axis of the optical image from which the image is obtained is the same as the optical axis of the optical image from which the 3D information is obtained. That is, in this case, the image processing apparatus acquires an image and 3D information from one optical image, for example. Furthermore, the image processing apparatus may divide the one optical image into two optical images (the same optical images) using a beam splitter (half mirror) using a prism or the like, acquire an image from one optical image, and acquire 3D information from the other optical image.

As described above, since the optical axis of the optical image for obtaining the image and the optical axis of the optical image for obtaining the 3D information are the same, it is possible to obtain the 3D information of the subject in the range (view angle) of the scene included in the image from the same angle as in the case of the image with respect to the subject. That is, "acquiring the 3D information from the optical image on the same optical axis as the image" can be said to indicate that the 3D information from the same angle as in the case of the image with respect to the subject within the angle of view of the image is acquired. Note that the range of the 3D information acquired from the optical image is arbitrary. For example, the range of the 3D information may be the same as the angle of view of the image, or may be a range including a part or all of the angle of view. For example, 3D information from the same angle as in the case of the image may be obtained at a plurality of places within the angle of view of the image.

The image processing apparatus that determines the authenticity of the image can detect falsification of the image and the 3D information on the basis of such a signature. In other words, the image processing apparatus can determine the authenticity of the image by using the image and the 3D information that have not been falsified. In addition, since the distance-related information is detected on the same optical axis as the image, it is difficult to perform, for example, trick shooting such as capturing a face photograph or the like and detecting a distance to a person different from the subject of the face photograph. That is, it is difficult to obtain 3D information indicating that the subject has unevenness as the 3D information corresponding to the false image obtained by capturing the face photograph. Therefore, the image processing apparatus that determines the authenticity of this image can more accurately detect (identify) the false image. That is, the image processing apparatus can more accurately determine the authenticity of the image.

Furthermore, in an imaging device that determines the authenticity of an image, the authenticity of the image is determined using 3D information obtained on the same optical axis as the image.

For example, the image processing apparatus includes an image confirmation processing unit that compares an image with 3D information acquired on the same optical axis as the image to confirm authenticity of the image.

For example, in an image processing method, the authenticity of an image is confirmed by comparing the image with 3D information acquired on the same optical axis as the image.

By comparing the distance-related information (3D information) at a plurality of places in the image with the image, the image processing apparatus can compare the state of the unevenness of the subject. That is, the image processing apparatus can detect (identify) the false image on the basis of whether or not the state of the unevenness of the subject matches between the image and the 3D information. Therefore, the image processing apparatus can detect (identify) the false image more accurately than the case of simply determining whether or not the focal lengths match.

Furthermore, as described above, since the distance-related information is detected on the same optical axis as the image, it becomes difficult to perform trick shooting, and for example, it becomes difficult to obtain 3D information indicating that the subject has unevenness as the 3D information corresponding to the false image obtained by capturing the face photograph. Therefore, the image processing apparatus can more accurately detect (identify) a false image.

That is, by doing so, the image processing apparatus can more accurately determine the authenticity of the image.

<2-1. System Configuration>

Next, a configuration for realizing the above method will be described. FIG. 1 is a diagram illustrating an example of a configuration of an image processing system to which the present technology is applied. An image processing system 100 illustrated in FIG. 1 is a system in which an imaging device images a subject to generate an image, and registers the image in a server. As illustrated in FIG. 1, the image processing system 100 includes an imaging device 111, a server 112, and a terminal device 113.

The imaging device 111, the server 112, and the terminal device 113 are communicably connected to each other via a network 110. The network 110 is a communication network serving as a communication medium between respective devices. The network 110 may be a communication network of wired communication, a communication network of wireless communication, or both of them. For example, it may be a wired local area network (LAN), a wireless LAN, a public telephone line network, a wide area communication network for a wireless mobile body such as a so-called 4G line or 5G line, the Internet, or the like, or a combination thereof. Furthermore, the network 110 may be a single communication network or a plurality of communication networks. Furthermore, for example, a part or all of the network 110 may be configured by a communication cable of a predetermined standard, such as a universal serial bus (USB) (registered trademark) cable, a high-definition multimedia interface (HDMI) (registered trademark) cable, or the like.

In FIG. 1, one imaging device 111, one server 112, and one terminal device 113 are illustrated, but the number of these devices is arbitrary.

The imaging device 111 images a subject and generates an image (captured image). Furthermore, the imaging device 111 acquires 3D information on the same optical axis as the image. Furthermore, the imaging device 111 generates a signature (electronic signature) of information including at least the image and the 3D information. For example, the imaging device 111 generates the signature by using key information (for example, the device secret key) corresponding to the imaging device 111. Then, the imaging device 111 transmits (uploads) the generated image, 3D information, and signature to the server 112.

The server 112 receives the information uploaded from the imaging device 111, and performs processing related to confirmation of authenticity of the image, and the like. The terminal device 113 is a device operated by a user (reviewer) who confirms authenticity of an image. The authenticity of the image can be confirmed by the server 112 or by the user of the terminal device 113. In a case where the server 112 performs processing of confirming the authenticity of the image, the server 112 presents the confirmation result to the user of the terminal device 113 by causing the terminal device 113 to display the confirmation result. Furthermore, in a case where the user of the terminal device 113 performs work of confirming the authenticity of the image, the server 112 presents information for assisting the confirmation to the user of the terminal device 113 by causing the terminal device 113 to display the information.

<2-1-1. Imaging Device>

The imaging device 111 includes, for example, an information processing terminal device having an imaging function and a 3D information generation function, such as a digital camera, a smartphone, a tablet terminal, or a notebook personal computer. The imaging device 111 may include one device (electronic device) or may include a plurality of devices (electronic devices). For example, the imaging device 111 may include a digital camera and a smartphone. In this case, for example, the digital camera may acquire the image and the 3D information, and the smartphone may generate the signature or upload the image and the 3D information to the server 112. In the following description, it is assumed that the imaging device 111 includes one device (electronic device).

Figure 2:
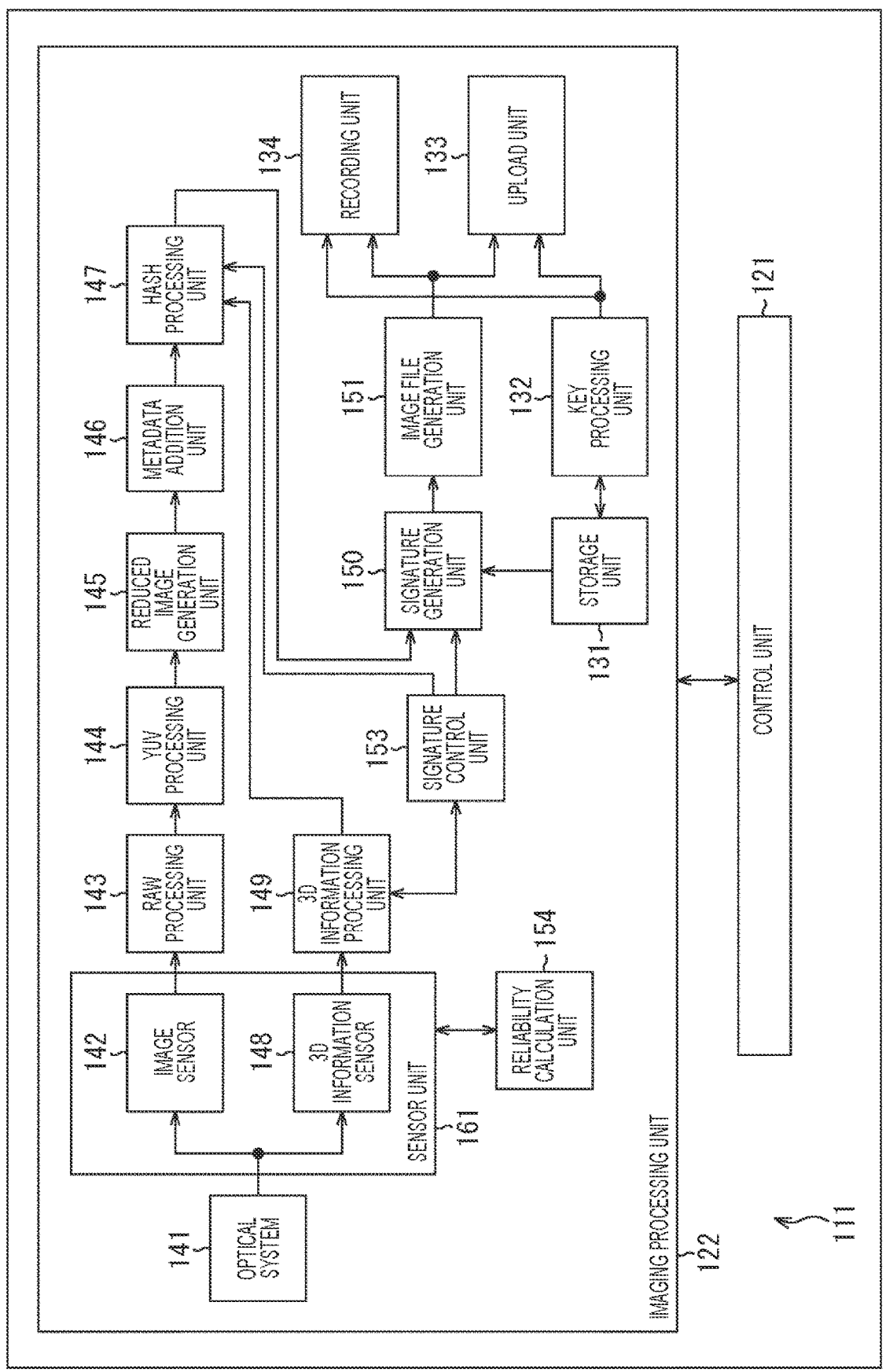
FIG. 2 is a block diagram illustrating a main configuration example of an imaging device.

FIG. 2 is a block diagram illustrating an example of a configuration of the imaging device 111 which is an aspect of an image processing apparatus to which the present technology is applied.

Note that, in FIG. 2, main processing units, data flows, and the like are illustrated, and those illustrated in FIG. 2 are not necessarily all. That is, in the imaging device 111, there may be a processing unit not illustrated as a block in FIG. 2, or there may be processing or a data flow not illustrated as an arrow or the like in FIG. 2.

As illustrated in FIG. 2, the imaging device 111 includes a control unit 121 and an imaging processing unit 122. The control unit 121 controls each processing unit in the imaging processing unit 122. The imaging processing unit 122 is controlled by the control unit 121 and performs processing related to imaging.

The imaging processing unit 122 includes a storage unit 131, a key processing unit 132, an upload unit 133, and a recording unit 134.

The storage unit 131 includes, for example, an arbitrary storage medium such as a semiconductor memory or a hard disk, and stores information in the storage medium. For example, the storage unit 131 stores in advance a device unique ID corresponding to the imaging device 111. The device unique ID is identification information unique to the electronic device for identifying the electronic device. That is, the storage unit 131 stores in advance an ID (an ID for identifying the imaging device 111) assigned to the imaging device 111. Here, "in advance" refers to an initial state of the imaging device 111 or a state close to the initial state, for example, at the time of factory shipment or the like.

The key processing unit 132 performs processing related to key information corresponding to the electronic device. For example, the key processing unit 132 reads the device unique ID from the storage unit 131, and uses the device unique ID to generate a device secret key that is a secret key corresponding to the imaging device 111 and a device public key that is a public key corresponding to the imaging device 111. That is, the key processing unit 132 can also be said to be a key generation unit. The device secret key and the device public key are also referred to as pair keys. In addition, the key processing unit 132 supplies the paired key to the storage unit 131 and causes the paired key to be stored in the storage medium. Further, the key processing unit 132 supplies the device public key to one or both of the upload unit 133 and the recording unit 134, and causes the device public key to be provided to the server 112. Note that the key processing unit 132 may generate a common key shared with the server 112 instead of the pair key. In this case, the key processing unit 132 supplies the generated common key to the storage unit 131 and causes the storage medium to store the generated common key. In addition, the key processing unit 132 supplies the common key to one or both of the upload unit 133 and the recording unit 134, and causes the common key to be provided to the server 112. Note that the key processing unit 132 may generate key information (pair key or common key) without using the device unique ID. For example, the key processing unit 132 may generate the key information using a random number.

The upload unit 133 has a communication function and can communicate with other devices via the network 110. For example, the upload unit 133 transmits (uploads) the key information (the device public key or the common key) supplied from the key processing unit 132 to the server 112.

That is, the upload unit 133 can also be said to be a providing unit (transmitting unit) that provides the key information to the server 112.

The recording unit 134 includes a drive that drives a removable recording medium such as a magnetic disk, an optical disk, a magneto-optical disk, or a semiconductor memory, and performs writing and reading. The recording unit 134 records information on a removable recording medium via the drive. For example, the recording unit 134 records key information (a device public key or a common key) supplied from the key processing unit 132 on a removable recording medium. For example, the removable recording medium is mounted in a drive of another information processing apparatus, and the recorded key information is read and transmitted to the server 112. That is, in this case, the key information is provided to the server 112 via the removable recording medium. Therefore, the recording unit 134 can also be said to be a providing unit that provides the key information to the server 112. Note that the recording unit 134 may record information on a non-removable recording medium. For example, the recording unit 134 may record key information (a device public key or a common key) supplied from the key processing unit 132 in a non-removable recording medium.

Furthermore, the imaging processing unit 122 includes an optical system 141, an image sensor 142, a RAW processing unit 143, a YUV processing unit 144, a reduced image generation unit 145, a metadata addition unit 146, a hash processing unit 147, a 3D information sensor 148, a 3D information processing unit 149, a signature generation unit 150, an image file generation unit 151, a signature control unit 153, and a reliability calculation unit 154. The image sensor 142 and the 3D information sensor 148 are also collectively referred to as a sensor unit 161.

The optical system 141 includes, for example, optical elements such as a lens, a mirror, a filter, and a diaphragm, has a predetermined influence on a light beam from a subject, and guides the light beam to the sensor unit 161. That is, the light beam from the subject enters the sensor unit 161 through the optical system 141.

The image sensor 142 captures an optical image from a subject to acquire an image of the subject. That is, the image sensor 142 can also be said to be an image acquisition unit. For example, the image sensor 142 has a pixel array in which pixels having photoelectric conversion elements are arranged in a matrix. In the pixel array, the image sensor 142 receives a light beam from a subject incident through the optical system 141 and photoelectrically converts the light beam to generate an image (RAW image). The image sensor 142 supplies the generated RAW image to the RAW processing unit 143.

The RAW processing unit 143 acquires a RAW image supplied from the image sensor 142 and performs predetermined processing on the RAW image. The content of this processing is arbitrary. For example, the processing may be correction or noise removal processing of a defective pixel for which a normal pixel value has not been obtained. The RAW processing unit 143 supplies the processed RAW image to the YUV processing unit 144.

The YUV processing unit 144 acquires the RAW image supplied from the RAW processing unit 143, and converts the RAW image into an image (also referred to as a luminance color difference image) including a luminance component and a color difference component. For example, the YUV processing unit 144 performs color separation processing (for example, demosaic processing in the case of a mosaic color filter such as a Bayer array) on the RAW image and converts the obtained color-separated RGB plane image into a luminance color difference image. Furthermore, the YUV processing unit 144 performs white balance correction on the RGB plane image after color separation or the luminance color difference image after conversion.

The luminance color difference image may be a YUV image including a luminance component (Y) and a color difference component (U, V) or a YCbCr image including a luminance component (Y) and a color difference component (Cb, Cr). Hereinafter, a YUV image will be described as an example of the luminance color difference image. The YUV processing unit 144 supplies the obtained luminance color difference image (YUV image) to the reduced image generation unit 145.

The reduced image generation unit 145 acquires the YUV image supplied from the YUV processing unit 144 and generates the reduced image. A method of generating the reduced image is arbitrary. For example, a reduced image may be generated by thinning out some pixel values of the image, or a reduced image may be generated by combining pixel values for each predetermined partial region to reduce the number of pixels. Furthermore, for example, all the pixels of the original image may be viewed and created. In a case where the number of taps is insufficient, the reduced image generation unit 145 may repeat reduction of a magnification sufficient for the number of taps a plurality of times to generate a reduced image having a desired reduction magnification. Note that the original YUV image with respect to the reduced image is also referred to as "main image". The reduced image generation unit 145 supplies the generated reduced image to the metadata addition unit 146 together with the main image (YUV image).

The metadata addition unit 146 acquires the main image and the reduced image supplied from the reduced image generation unit 145. The metadata addition unit 146 generates the metadata and associates the metadata with the main image. The content of the metadata is arbitrary. For example, the metadata may include an item defined by a standard or the like, an item set by a manufacturer, or the like. The metadata addition unit 146 supplies the generated metadata to the hash processing unit 147 together with the main image and the reduced image.

The hash processing unit 147 acquires the main image, the reduced image, and the metadata supplied from the metadata addition unit 146. Furthermore, the hash processing unit 147 acquires the 3D information supplied from the 3D information processing unit 149. The hash processing unit 147 calculates a hash value using the main image, the reduced image, the metadata, and the 3D information. The hash processing unit 147 supplies the calculated hash value to the signature generation unit 150 together with the main image, the reduced image, the metadata, and the 3D information.

Note that the hash processing unit 147 may be controlled and driven by the signature control unit 153. That is, the hash processing unit 147 may calculate the hash value as described above in a case where the signature control unit 153 instructs the calculation of the hash value, and may omit the calculation of the hash value in a case where the signature control unit 153 does not instruct the calculation of the hash value. In a case where the calculation of the hash value is omitted, the hash processing unit 147 supplies the main image, the reduced image, the metadata, and the 3D information to the signature generation unit 150.

The 3D information sensor 148 acquires 3D information from the optical image of the subject on the same optical axis as the image obtained by the image sensor 142. That is, the 3D information sensor 148 can also be said to be a 3D information acquisition unit.

Here, the optical axis refers to a principal ray passing through the center of a light flux passing through the entire system in the optical system. "Acquire 3D information from the optical image of the subject on the same optical axis as the image" indicates that the optical axis of the optical image from which the image is obtained and the optical axis of the optical image from which the 3D information is obtained are the same. That is, in this case, the optical image from the subject incident on the 3D information sensor 148 and the optical image from the subject incident on the image sensor 142 are incident on the imaging device 111 from the same place, pass through the optical system 141 in the same path, and are incident on the sensor unit 161. Therefore, 3D information from the same angle as that of the image with respect to the subject within the range (view angle) of the scene included in the image can be obtained. For this reason, for example, assuming that the image sensor and the distance measurement sensor are on different optical axes, it is difficult to place a mirror inclined by 45 degrees only in front of the distance measurement sensor, image a face photograph or the like, and perform a trick shooting such as detecting a distance to a person different from the subject of the face photograph in the distance measurement sensor. That is, there is a high possibility that the subject of the RAW image and the subject indicated by the 3D information are the same.

Furthermore, the 3D information can include distance-related information for a plurality of places (that is, a plurality of places of the optical image from the subject) in the image obtained by the image sensor 142, or information generated on the basis of the distance-related information. Note that the "distance-related information" may be information indicating a distance from the imaging device 111 (3D information sensor 148) to the subject, or may be information for deriving the distance. For example, the distance-related information may include a depth map, phase difference data, ToF data, a set of parallax images, or the like.

The 3D information sensor 148 supplies the generated 3D information to the 3D information processing unit 149.

Note that, in FIG. 2, the image sensor 142 and the 3D information sensor 148 are configured as separate bodies, but the image sensor 142 and the 3D information sensor 148 may be integrated, or the image sensor 142 may also serve as the 3D information sensor 148.

For example, in a case where the distance-related information is ToF data, the 3D information sensor 148 may include a ToF sensor that is separate from the image sensor 142 and measures a distance by the ToF method. Furthermore, in a case where the distance-related information is phase difference data, the 3D information sensor 148 may include a phase difference sensor that is separate from the image sensor 142 and detects phase difference data. As in these examples, in a case where the image sensor 142 and the 3D information sensor 148 are configured as separate bodies, one optical image (optical image from a subject) incident on the sensor unit 161 may be divided into two optical images (same optical images) using a beam splitter (half mirror) using a prism or the like, one optical image may be incident on the image sensor 142, and the other optical image may be incident on the 3D information sensor 148. That is, in this case, an image is acquired from one optical image of the two divided optical images, and 3D information is acquired from the other optical image.

Figure 3:
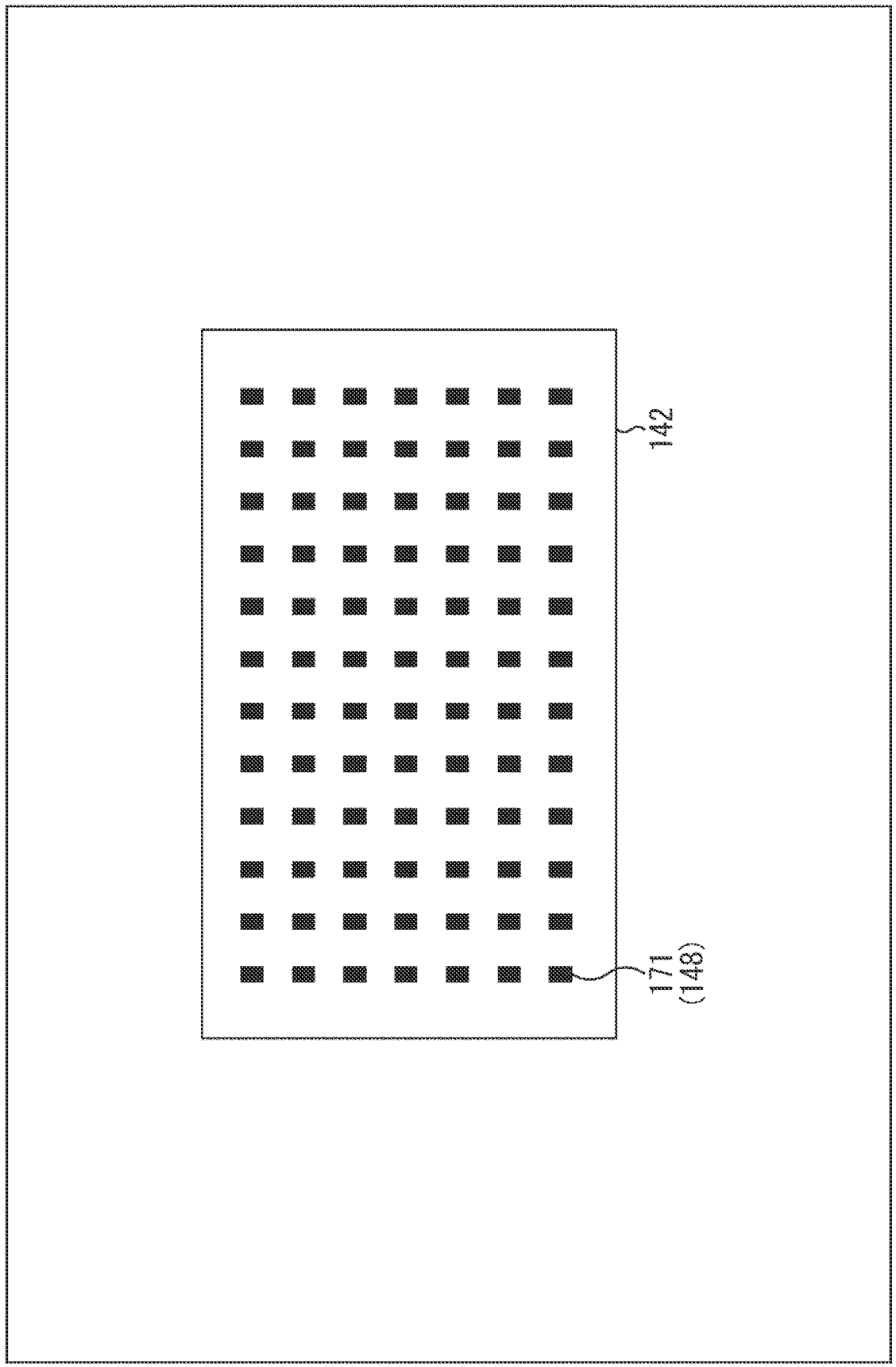
FIG. 3 is a diagram illustrating a main configuration example of a sensor unit.

Furthermore, for example, in a case where the distance-related information is phase difference data, as illustrated in FIG. 3, the 3D information sensor 148 may include image plane phase difference detection pixels 171 formed in an effective pixel region of a pixel array of the image sensor 142. The image plane phase difference detection pixels 171 are pixels that can also be used for a phase difference type focusing (autofocus) function, and can detect phase difference data. That is, in this case, the image sensor 142 and the 3D information sensor 148 are integrally formed. Then, the 3D information sensor 148 (image plane phase difference detection pixels 171) acquires 3D information (phase difference data) using the phase difference method. Note that, in FIG. 3, only one image plane phase difference detection pixel is denoted by a reference sign, but all pixels indicated by black squares are the image plane phase difference detection pixels 171. That is, in the case of this example, the 3D information sensor 148 (image plane phase difference detection pixels 171) acquires phase data at a plurality of places in the image acquired by the image sensor 142. As in this example, in a case where the image sensor 142 and the 3D information sensor 148 are integrally configured, one optical image (optical image from a subject) incident on the sensor unit 161 is incident on the integrated image sensor 142 and 3D information sensor 148. That is, in this case, the image and the 3D information are acquired from the one optical image.

Furthermore, in a case where the distance-related information is a set of parallax images generated by 3D swing panoramic imaging or the like, the image sensor 142 also serves as the 3D information sensor 148. In other words, in this case, the image sensor 142 acquires the image and the 3D information, and the 3D information sensor 148 may be omitted. That is, also in the case of this example, the image and the 3D information are acquired from the one optical image.

Hereinafter, unless otherwise specified, a case where the 3D information sensor 148 includes the image plane phase difference detection pixels 171 will be described as an example. That is, a case where the 3D information sensor 148 detects the phase difference data as the distance-related information will be described as an example.

The 3D information processing unit 149 acquires the 3D information supplied from the 3D information sensor 148. The 3D information processing unit 149 performs predetermined processing on the 3D information. For example, the 3D information processing unit 149 supplies the acquired 3D information to the hash processing unit 147. Furthermore, in a case where a signature is not generated on the basis of the control of the signature control unit 153, the 3D information processing unit 149 reduces the resolution of the 3D information and supplies the low-resolution 3D information to the hash processing unit 147. Furthermore, in a case where the signature is generated on the basis of the control of the signature control unit 153, the 3D information processing unit 149 omits the resolution reduction of the 3D information and supplies the acquired 3D information to the hash processing unit 147. That is, the 3D information processing unit 149 can also be said to be a 3D information resolution setting unit. Furthermore, the 3D information processing unit 149 determines whether or not the subject (distance measurement target) indicated by the acquired 3D information is a plane, and supplies the determination result to the signature control unit 153. That is, the 3D information processing unit 149 can also be said to be a plane determination unit.

The signature generation unit 150 generates a signature (electronic signature) corresponding to the image (main image) obtained in the image sensor 142 and the 3D information obtained in the 3D information sensor 148. The signature only needs to correspond to at least the main image and the 3D information, and may also correspond to information other than the main image and the 3D information. In other words, the signature generation unit 150 generates a signature of information including at least the main image and the 3D information. The signature generation unit 150 may generate this signature using key information corresponding to the imaging device 111. This key information may be, for example, a device secret key corresponding to the imaging device 111, or a common key shared with the server 112 and the like (a method using the same key on the signing side and the confirming side).

For example, the signature generation unit 150 acquires the main image, the reduced image, the metadata, the 3D information, and the hash value supplied from the hash processing unit 147. Furthermore, the signature generation unit 150 acquires the device secret key corresponding to the imaging device 111 stored in the storage unit 131. Then, the signature generation unit 150 generates a signature by encrypting the hash value using the device secret key. That is, in the case of this example, the signature generation unit 150 generates signatures (electronic signatures) of the main image, the 3D information, the reduced image, and the metadata. The signature generation unit 150 supplies the generated signatures to the image file generation unit 151 together with the main image, the reduced image, the metadata, and the 3D information.

Note that this signature (at least a signature corresponding to the main image and the 3D information) may be generated using an image other than the main image (YUV image). For example, instead of the main image, this signature may be generated using a reduced image (for example, a screen nail having a display size or the like) obtained by reducing the YUV image generated by the YUV processing unit 144 within a range not affecting the features thereof. In that case, the hash processing unit 147 generates a screen nail by reducing the main image (YUV image), and acquires the screen nail, the reduced image, the metadata, the 3D information, and the hash value. Then, the signature generation unit 150 generates a signature by encrypting the hash value using the device secret key. The features of the screen nail (reduced image) are substantially equivalent to the YUV image generated by the YUV processing unit 144. Therefore, it can be said that the signature generated by using this screen nail (reduced image) corresponds to the main image. By using the screen nail (reduced image), an increase in the data amount of the hash value and the signature can be suppressed.

Furthermore, the signature generation unit 150 may be controlled and driven by the signature control unit 153. That is, the signature generation unit 150 may generate the signature as described above in a case where the signature control unit 153 instructs generation of the signature, and may omit generation of the signature in a case where the signature control unit 153 does not instruct generation of the signature. In a case where the generation of the signature is omitted, the signature generation unit 150 supplies the main image, the reduced image, the metadata, and the 3D information to the image file generation unit 151.

The image file generation unit 151 acquires the main image, the reduced image, the metadata, the 3D information, and the signature supplied from the signature generation unit 150. The image file generation unit 151 compresses and encodes a YUV image, which is the main image, and converts the YUV image into a joint photographic experts group (JPEG) image. Note that this compression encoding method is arbitrary. That is, the file format of the compressed and encoded main image is arbitrary, and may be other than JPEG. The image file generation unit 151 generates an image file in a predetermined format, and stores the main image (JPEG image), the reduced image, the metadata, the 3D information, and the signature in the image file. Note that the compression encoding of the YUV image may be omitted, and the YUV image may be stored in the image file. The image file generation unit 151 supplies the image file to one or both of the upload unit 133 and the recording unit 134, and causes the image file to be provided to the server 112.

The upload unit 133 acquires the image file supplied from the image file generation unit 151, and transmits (uploads) the image file to the server 112. That is, the upload unit 133 can also be said to be a providing unit (transmitting unit) that provides the image file to the server 112.

The recording unit 134 acquires the image file supplied from the image file generation unit 151, and records the image file on a removable recording medium. That is, in this case, the image file is provided to the server 112 via the removable recording medium. Therefore, the recording unit 134 can also be said to be a providing unit that provides the image file to the server 112. Note that the recording unit 134 may record the image file supplied from the image file generation unit 151 on a non-removable recording medium.

The signature control unit 153 controls whether or not to generate a signature. For example, the signature control unit 153 controls whether or not to generate a signature on the basis of an instruction based on a user operation input via the control unit 121 or an instruction from an application or the like. Furthermore, the signature control unit 153 controls whether or not to generate a signature on the basis of a determination result as to whether or not the subject (distance measurement target) indicated by the 3D information supplied from the 3D information processing unit 149 is a plane. For example, the signature control unit 153 performs control to omit generation of the signature in a case where it is determined that the subject (distance measurement target) indicated by the 3D information is a plane, and performs control to generate the signature in a case where it is determined that the subject (distance measurement target) indicated by the 3D information is not a plane. The signature control unit 153 controls whether or not to generate a signature by controlling the hash processing unit 147 and the signature generation unit 150. For example, in a case of performing control so as not to generate a signature, the signature control unit 153 causes the hash processing unit 147 to omit calculation of a hash value, and causes the signature generation unit 150 to omit generation of a signature. Furthermore, in a case of performing control to generate a signature, the signature control unit 153 causes the hash processing unit 147 to calculate a hash value and causes the signature generation unit 150 to generate a signature. Note that, in a case of performing control so as not to generate a signature, the signature control unit 153 may cause the hash processing unit 147 to calculate a hash value, and may cause the signature generation unit 150 to omit generation of a signature. Furthermore, the signature control unit 153 can also supply control information indicating whether or not to generate a signature to the 3D information processing unit 149.

The reliability calculation unit 154 calculates the reliability of the 3D information generated by the 3D information sensor 148. In other words, the reliability calculation unit 154 can also be said to be a reliability generation unit that generates the reliability of the 3D information. For example, the reliability calculation unit 154 acquires the metadata generated by the image sensor 142 and the 3D information generated by the 3D information sensor 148. Then, the reliability calculation unit 154 compares the image with the 3D information, and calculates the reliability of the 3D information (the certainty of (the unevenness indicated by) the 3D information with respect to the feature (unevenness) of the image). Note that a method of calculating this reliability is arbitrary. For example, the method described in WO 2019/073814 A may be applied. The calculated reliability is supplied to the image file generation unit 151 via the 3D information sensor 148, the 3D information processing unit 149, the hash processing unit 147, and the signature generation unit 150. Then, the image file generation unit 151 stores information indicating the reliability in the image file.

Note that a RAW image may be stored in the image file as a main image instead of a compressed and encoded image (for example, a JPEG image). In this case, the RAW image is supplied from the RAW processing unit 143 to the image file generation unit 151 via the YUV processing unit 144, the reduced image generation unit 145, the metadata addition unit 146, the hash processing unit 147, and the signature generation unit 150. The image file generation unit 151 stores the RAW image thus supplied as a main image in the image file. Note that, in this case, the YUV processing unit 144 may be omitted. In addition, both the RAW image and the compressed and encoded image (for example, JPEG image) may be stored in the image file as the main image. In this case, for the signature, a RAW image may be used, a compressed and encoded image (for example, a JPEG image) may be used, or both a RAW image and a compressed and encoded image (for example, a JPEG image) may be used. In addition, in a case where a RAW image is used as a main image, the RAW image may be stored in a file different from other information (3D information, reduced images, metadata, signatures, and the like). In this case, the file in which the RAW image is stored and the file in which the other information is stored store information (for example, a universal unique identifier (UUID) or the like) that associates each other.

In addition, the storage of the reduced image in the image file may be omitted. In that case, the reduced image generation unit 145 may be omitted. In addition, storage of the signature in the image file may be omitted. In that case, the signature generation unit 150 may be omitted.

<2-1-2. Server>

The server 112 has an arbitrary configuration. For example, the server 112 may include a single information processing apparatus or may include a plurality of information processing apparatuses. Furthermore, the server 112 may be implemented as cloud computing (that is, the cloud server) that is shared and processed in cooperation by a plurality of devices via a network.

Figure 4:
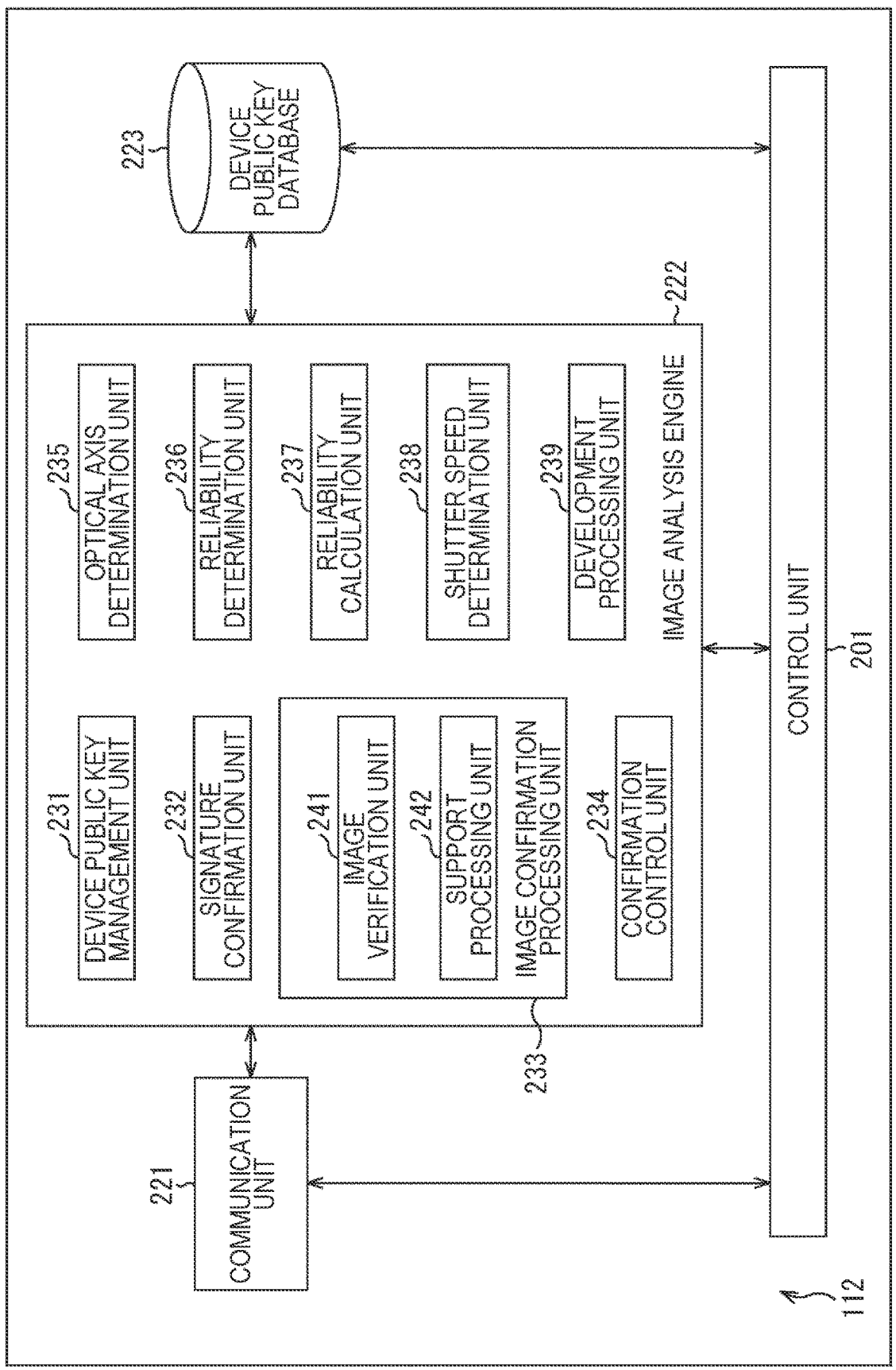
FIG. 4 is a block diagram illustrating a main configuration example of a server.

FIG. 4 is a block diagram illustrating an example of a configuration of the server 112 which is an aspect of an image processing apparatus to which the present technology is applied.

Note that, in FIG. 4, main processing units, data flows, and the like are illustrated, and those illustrated in FIG. 4 are not necessarily all. That is, in the server 112, there may be a processing unit not illustrated as a block in FIG. 4, or there may be a process or a data flow not illustrated as an arrow or the like in FIG. 4.

As illustrated in FIG. 4, the server 112 includes a control unit 201, a communication unit 221, an image analysis engine 222, and a device public key database 223. The control unit 201 controls the communication unit 221, the image analysis engine 222, and the device public key database 223.

The communication unit 221 has a communication function and can communicate with other devices via the network 110. For example, the communication unit 221 communicates with the imaging device 111, and receives key information (a device public key or a common key) and an image file transmitted from the imaging device 111. Furthermore, in a case where the information processing apparatus reads the key information and the image file generated by the imaging device 111 from the removable recording medium and transmits the key information and the image file to the server 112, the communication unit 221 communicates with the information processing apparatus and receives the key information and the image file. Then, the communication unit 221 supplies the received information (for example, key information or an image file) as in these examples to the image analysis engine 222. Furthermore, the communication unit 221 transmits the confirmation result of the authenticity of the image, the information for assisting the confirmation of the authenticity of the image, and the like supplied from the image analysis engine 222 to the terminal device 113.

The image analysis engine 222 includes a central processing unit (CPU), a read only memory (ROM), a random access memory (RAM), and the like, and performs processing related to image analysis using these components. The image analysis engine 222 includes a device public key management unit 231, a signature confirmation unit 232, an image confirmation processing unit 233, a confirmation control unit 234, an optical axis determination unit 235, a reliability determination unit 236, a reliability calculation unit 237, a shutter speed determination unit 238, and a development processing unit 239.

The device public key management unit 231 manages information stored in the device public key database 223. For example, the device public key management unit 231 registers the device public key supplied from the communication unit 221 in the device public key database 223. In addition, the device public key management unit 231 reads a desired device public key from the device public key database 223. In addition, the device public key management unit 231 determines whether the device public key is valid. Therefore, the device public key management unit 231 can also be said to be a public key determination unit.

Note that the device public key management unit 231 may handle a common key (key information shared by the imaging device 111 and the server 112) instead of the device public key. In this case, the device public key management unit 231 registers the common key supplied from the communication unit 221 in the device public key database 223. In addition, the device public key management unit 231 reads a desired common key from the device public key database 223. Of course, the device public key management unit 231 may handle both the device public key and the common key. That is, the device public key management unit 231 may handle key information (one or both of the device public key and the common key).

The signature confirmation unit 232 performs processing related to verification of the signature stored in the image file supplied from the communication unit 221. This signature is a signature of information including at least the main image and the 3D information stored in the image file. For example, the signature confirmation unit 232 confirms the validity of the signature of the image and the 3D information by using key information (device public key or common key) corresponding to another device (for example, the imaging device 111) that is a supply source of the image and the 3D information.

The image confirmation processing unit 233 performs processing related to confirmation of authenticity of the image. For example, the image confirmation processing unit 233 compares the image with the 3D information detected on the same optical axis as the image to confirm the authenticity of the image. Furthermore, in a case where the validity of the signature cannot be confirmed by the signature confirmation unit 232, the image confirmation processing unit 233 determines that there is no authenticity of the image.

The image confirmation processing unit 233 includes an image verification unit 241 and a support processing unit 242. The image verification unit 241 performs processing of confirming authenticity of the image, such as verification of the image. The support processing unit 242 performs support processing for confirming authenticity of an image, such as presentation of information to a reviewer.

The confirmation control unit 234 performs control related to confirmation of authenticity of the image. For example, the confirmation control unit 234 controls the image confirmation processing unit 233 to control whether or not to confirm the authenticity of the image. For example, the confirmation control unit 234 controls whether or not to confirm the authenticity of the image on the basis of the determination result by the optical axis determination unit 235, the determination result by the reliability determination unit 236, the determination result by the shutter speed determination unit 238, or the like.

The optical axis determination unit 235 determines whether or not the 3D information is acquired on the same optical axis as the image. For example, the optical axis determination unit 235 makes this determination on the basis of information indicating that the 3D information is acquired on the same optical axis as the image, the information being stored as metadata in the image file. The "information indicating that the 3D information is acquired on the same optical axis as the image" may be, for example, flag information indicating whether or not the image and the 3D information are acquired on the same optical axis, or may be a device name, a model name, identification information, or the like of a device in which the image and the 3D information are necessarily acquired on the same optical axis.

The reliability determination unit 236 determines whether the 3D information is reliable on the basis of reliability information indicating the reliability of the 3D information stored as metadata regarding the image in the image file storing the image and the 3D information.

The reliability calculation unit 237 calculates the reliability of the 3D information on the basis of the camera parameters related to the image stored in the image file that stores the image and the 3D information. These camera parameter may be any information. For example, the number of effective pixels, the F-number, the focal length, or the like of the sensor unit 161 (the image sensor 142 or the 3D information sensor 148) of the imaging device 111 may be included in the camera parameters. In addition, a method of calculating the reliability is arbitrary.

The shutter speed determination unit 238 determines whether the shutter speed of imaging when the image is generated is higher than a predetermined standard on the basis of the camera parameters regarding the image stored in the image file that stores the image and the 3D information.

The development processing unit 239 performs development processing of converting a RAW image included in the image file into a YUV image.

The device public key database 223 includes a storage medium such as a hard disk or a semiconductor memory, and stores information such as a device public key in the storage medium. FIG. 5 is a diagram illustrating an example of information stored in the device public key database 223. For example, the device public key database 223 stores information such as a device unique ID, a device public key, and an invalidation date in association with each other. The invalidation date indicates a date on which the device public key is invalidated. Note that the device public key database 223 may store a common key (key information shared by the imaging device 111 and the server 112) instead of the device public key. Of course, the device public key database 223 may store both the device public key and the common key. That is, the device public key database 223 may store key information (one or both of the device public key and the common key).

Note that, in the following description, unless otherwise specified, it is assumed that the image and the 3D information processed by the image analysis engine 222 are detected on the same optical axis. That is, it is assumed that only the image file generated by the imaging device 111 is provided to the server 112.

<2-1-3. Terminal Device>

Figure 6:
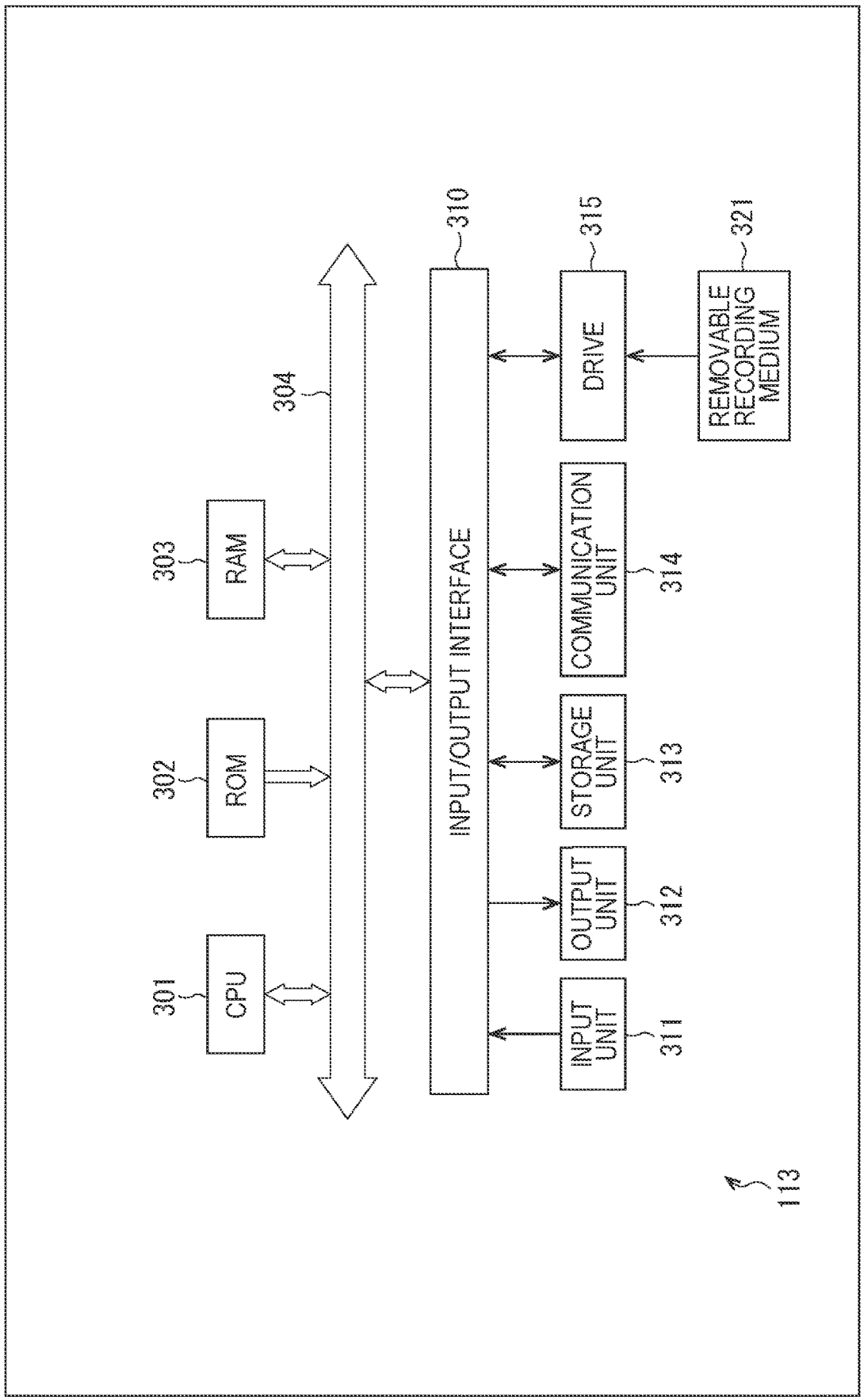
FIG. 6 is a block diagram illustrating a main configuration example of a terminal device.

FIG. 6 is a block diagram illustrating an example of a configuration of a terminal device 113 which is an aspect of an image processing apparatus to which the present technology is applied.

Note that, in FIG. 6, main processing units, data flows, and the like are illustrated, and those illustrated in FIG. 6 are not necessarily all. That is, in the terminal device 113, there may be a processing unit not illustrated as a block in FIG. 6, or there may be processing or a data flow not illustrated as an arrow or the like in FIG. 6.

As illustrated in FIG. 6, the terminal device 113 includes a CPU 301, a ROM 302, a RAM 303, a bus 304, an input/output interface 310, an input unit 311, an output unit 312, a storage unit 313, a communication unit 314, and a drive 315.

The CPU 301, the ROM 302, and the RAM 303 are connected to one another via the bus 304. An input/output interface 310 is also connected to the bus 304. The input unit 311, the output unit 312, the storage unit 313, the communication unit 314, and the drive 315 are connected to the input/output interface 310.

The input unit 311 includes, for example, a keyboard, a mouse, a microphone, a touch panel, an input terminal, and the like. The output unit 312 includes, for example, a display, a speaker, an output terminal, and the like. The storage unit 313 includes, for example, a hard disk, a RAM disk, a nonvolatile memory, and the like. The communication unit 314 includes, for example, a network interface. The drive 315 drives a removable recording medium 321 such as a magnetic disk, an optical disk, a magneto-optical disk, or a semiconductor memory.

For example, the CPU 301 loads a program stored in the ROM 302 or the storage unit 313 into the RAM 303 and executes the program. The RAM 303 also appropriately stores data and the like necessary for the CPU 301 to execute various processes. By executing the program in this manner, the CPU 301 performs processing such as presentation of information regarding image confirmation, for example.

The program executed by the computer may be recorded, for example, in the removable recording medium 321 as a package medium or the like and provided to the terminal device 113. In that case, the program is read from the removable recording medium 321 attached to the drive 315 and installed in the storage unit 313 via the input/output interface 310.

Furthermore, this program may be provided to the terminal device 113 via a wired or wireless transmission medium such as a local area network, the Internet, or digital satellite broadcasting. In this case, the program is received by the communication unit 314 and installed in the storage unit 313.

In addition, this program may be installed in the ROM 302 or the storage unit 313 in advance.

<2-2. Processing of Imaging Device>
<2-2-1. Key Processing>

Figure 7:
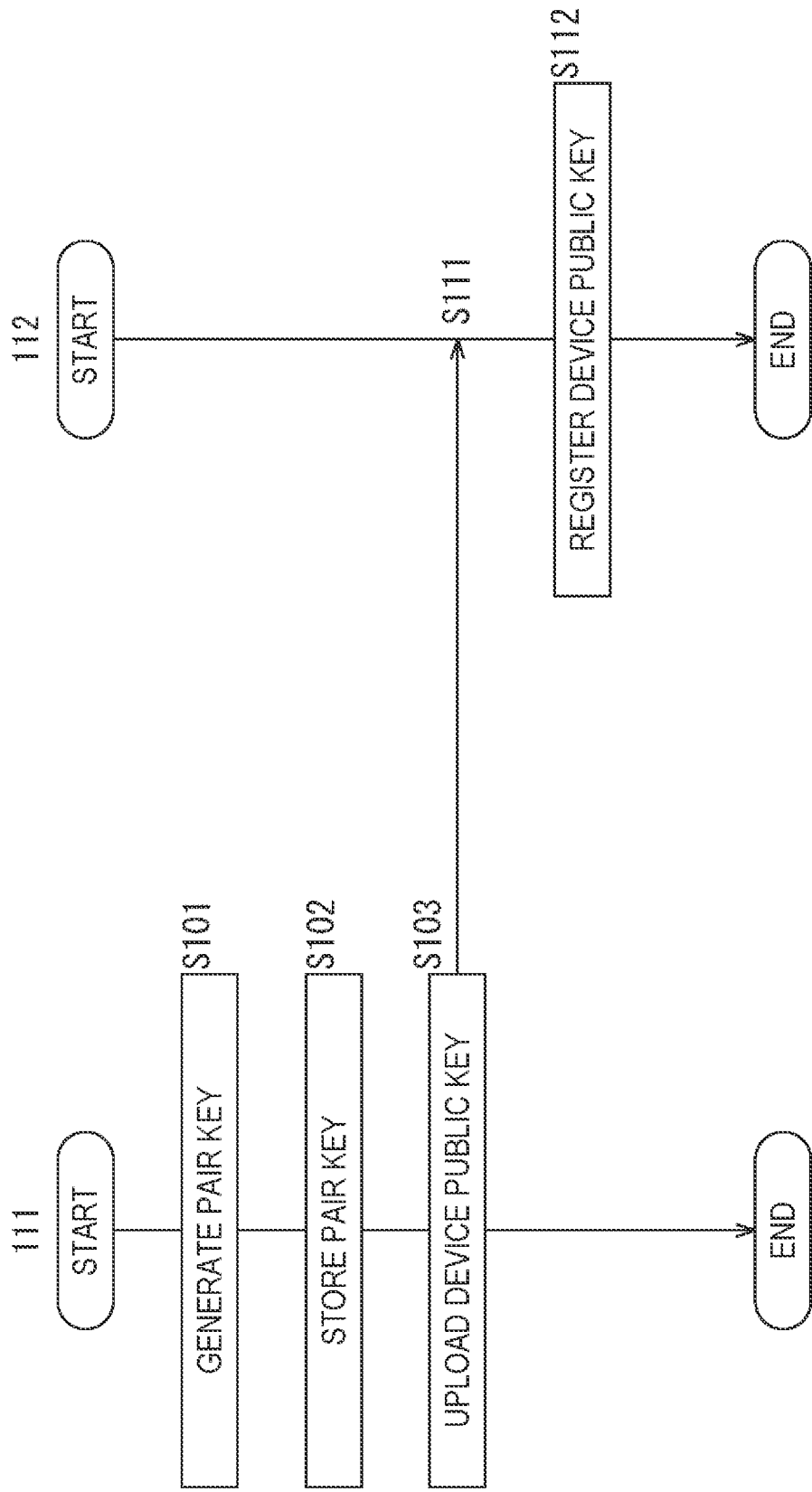
FIG. 7 is a flowchart illustrating an example of a flow of key processing.

Next, each process executed by the imaging device 111 and the like will be described. First, an example of a flow of key processing in which the imaging device 111 generates a device public key and uploads the device public key to the server 112 will be described with reference to a flowchart of FIG. 7.

When the key processing is started, in step S101, the key processing unit 132 of the imaging device 111 reads the device unique ID stored in the storage unit 131, and generates a pair key (a device secret key and a device public key) using the device unique ID. That is, the key processing unit 132 generates a device secret key and a device public key corresponding to the imaging device 111.

Figure 8:
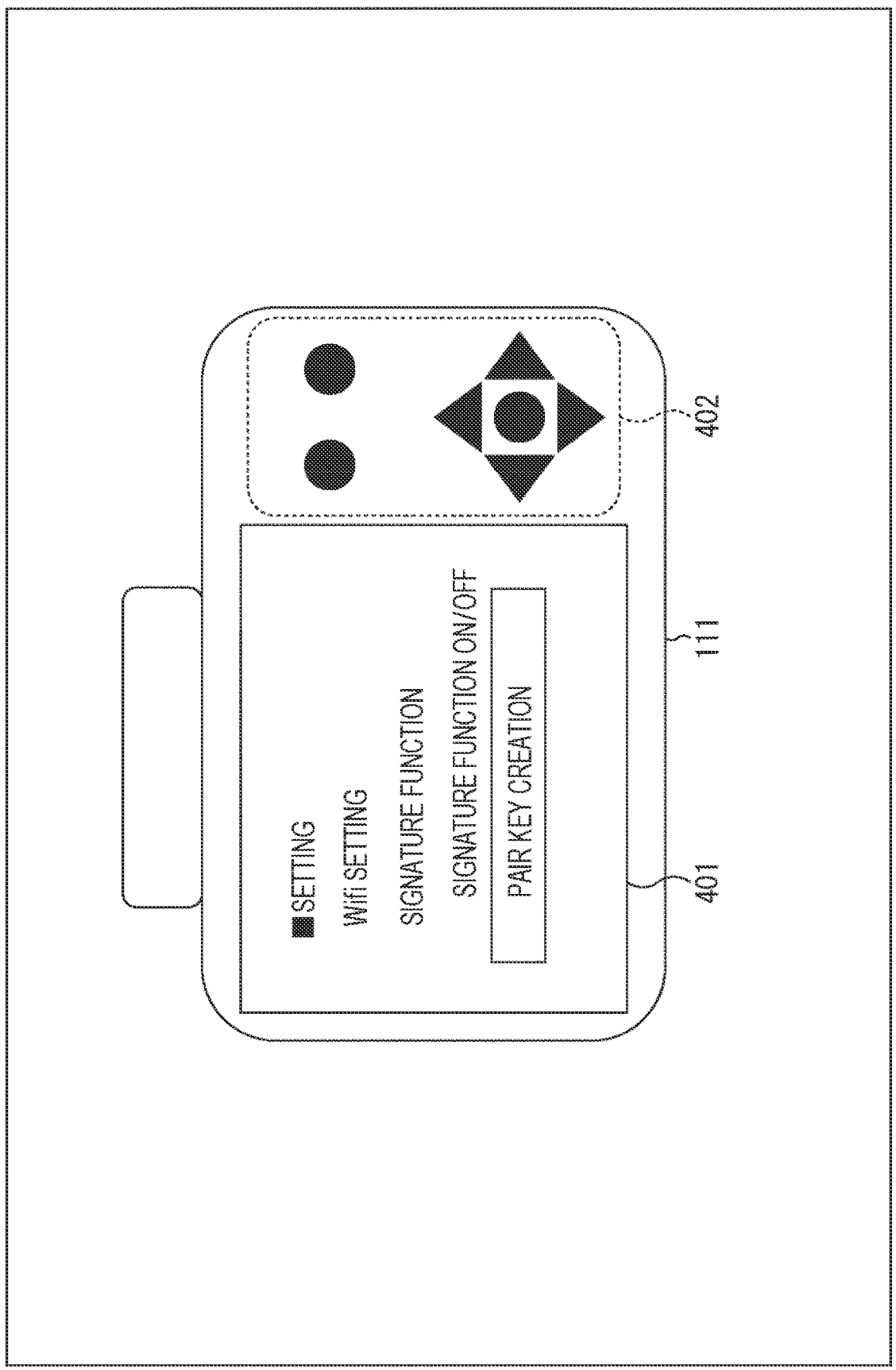
FIG. 8 is a diagram for explaining an example of a display image.

As illustrated in FIG. 8, the imaging device 111 includes a display device 401 such as a liquid crystal display (LCD) or an organic electro luminescence display (OELD). Furthermore, the imaging device 111 includes an operation device 402 such as a button or a cross key.

Figure 9:
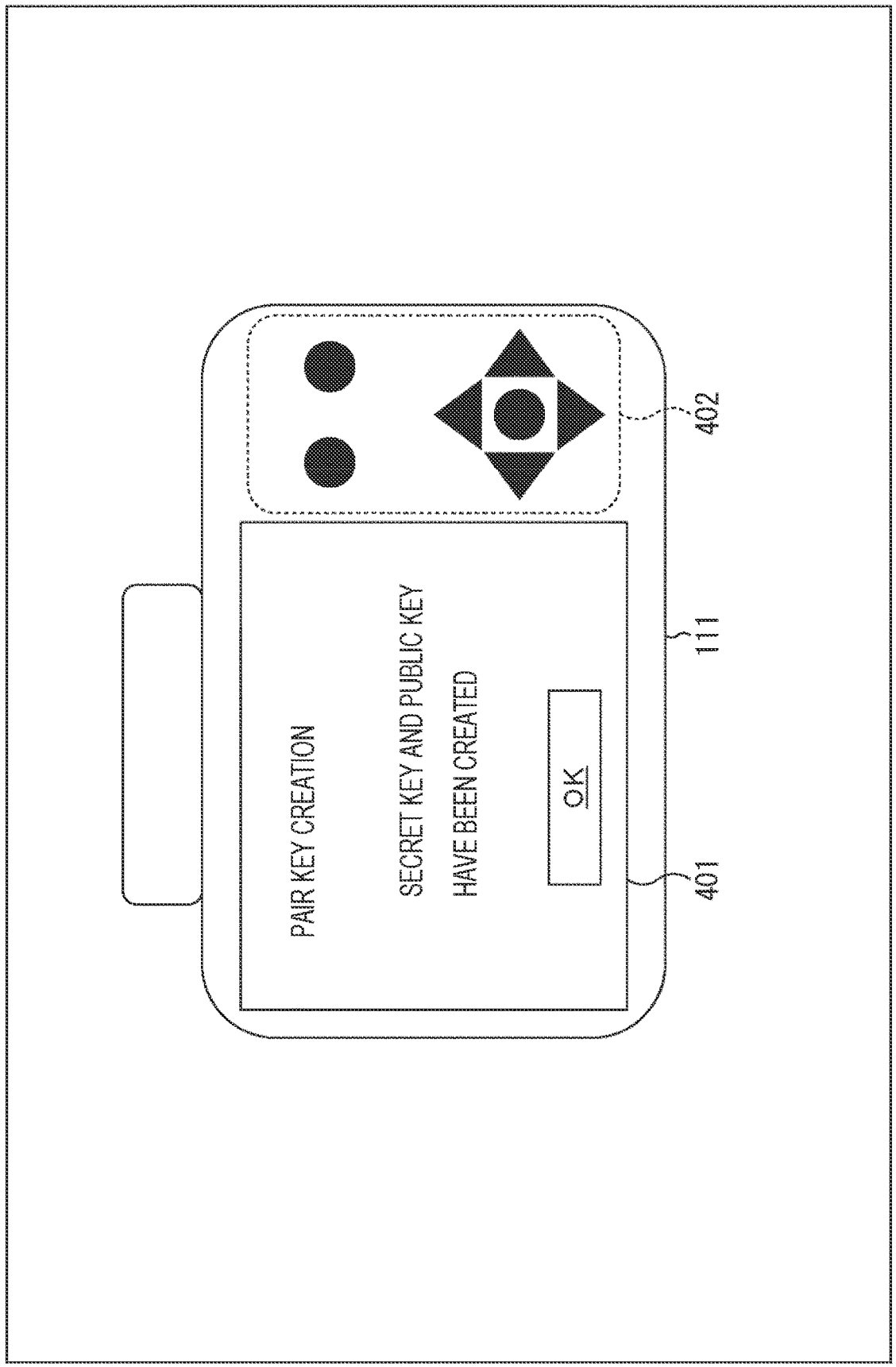
FIG. 9 is a diagram for explaining an example of a display image.

For example, the user of the imaging device 111 operates the operation device 402 to display a graphical user interface (GUI) as illustrated in FIG. 8 on the display device 401. The GUI in the example of FIG. 8 is a menu screen for selecting processing to be executed. Then, when the user selects the menu of "pair key creation" by operating the operation device 402 to move a cursor or the like, the process of step S101 is executed and a pair key is generated as described above. Then, when the pair key is generated, a GUI as illustrated in FIG. 9 is displayed on the display device 401.

In step S102, the key processing unit 132 supplies the pair key (the device secret key and the device public key) generated in step S101 to the storage unit 131 and causes the pair key to be stored. The storage unit 131 stores the paired key supplied from the key processing unit 132.

Figure 10:
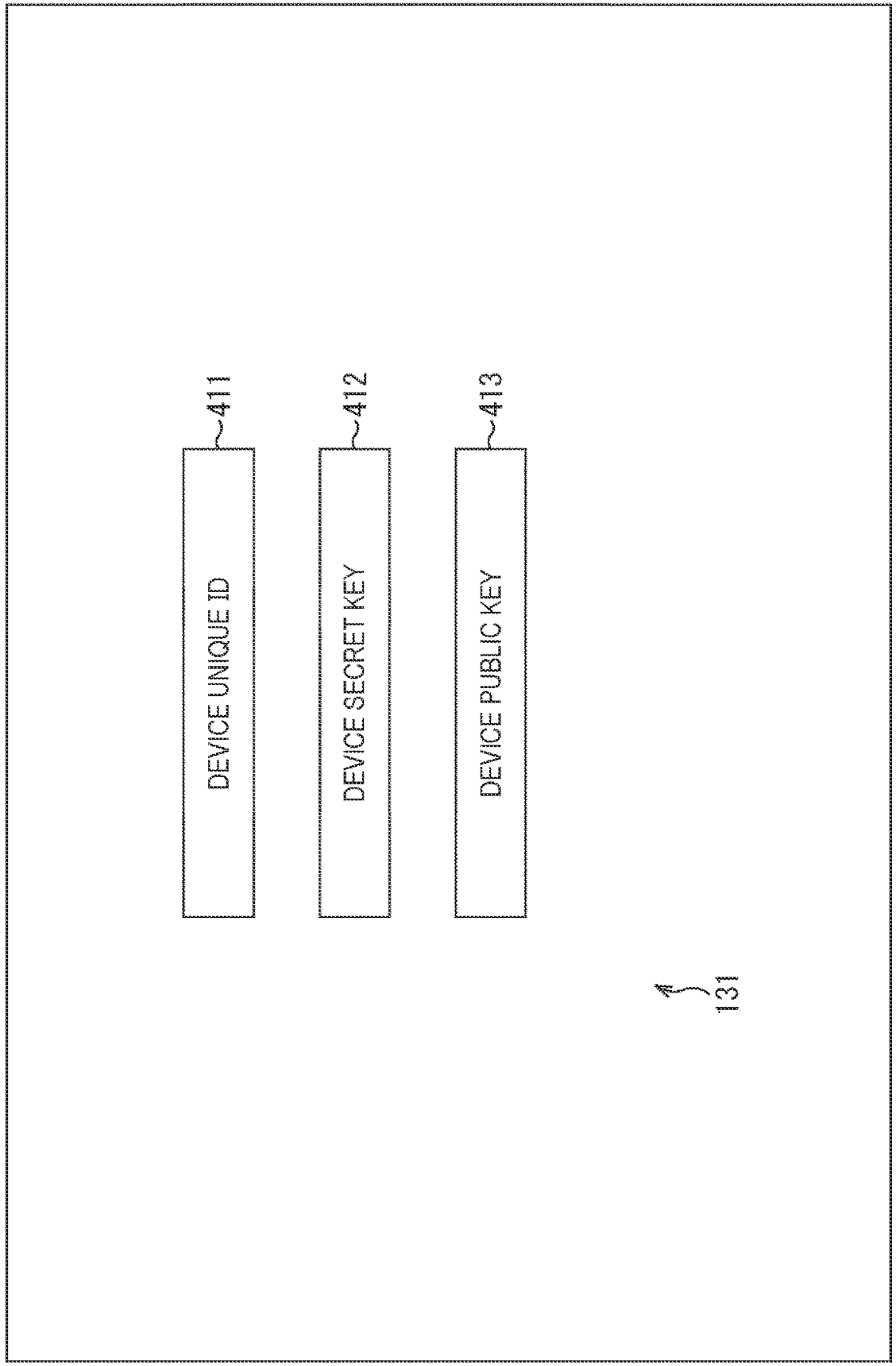
FIG. 10 is a diagram for explaining an example of information stored in a storage unit.

FIG. 10 is a diagram illustrating an example of information stored in the storage unit 131. The device unique ID 411 is stored in advance in the storage unit 131, and the device secret key 412 and the device public key 413 are further stored by executing the process of step S102.

In step S103, the key processing unit 132 supplies the device public key generated in step S101 to the upload unit 133, and causes the device public key to be transmitted (uploaded) to the server 112. The upload unit 133 uploads the device public key supplied from the key processing unit 132 to the server 112 via the network 110. That is, the device public key is provided to the server 112.

Figure 11:
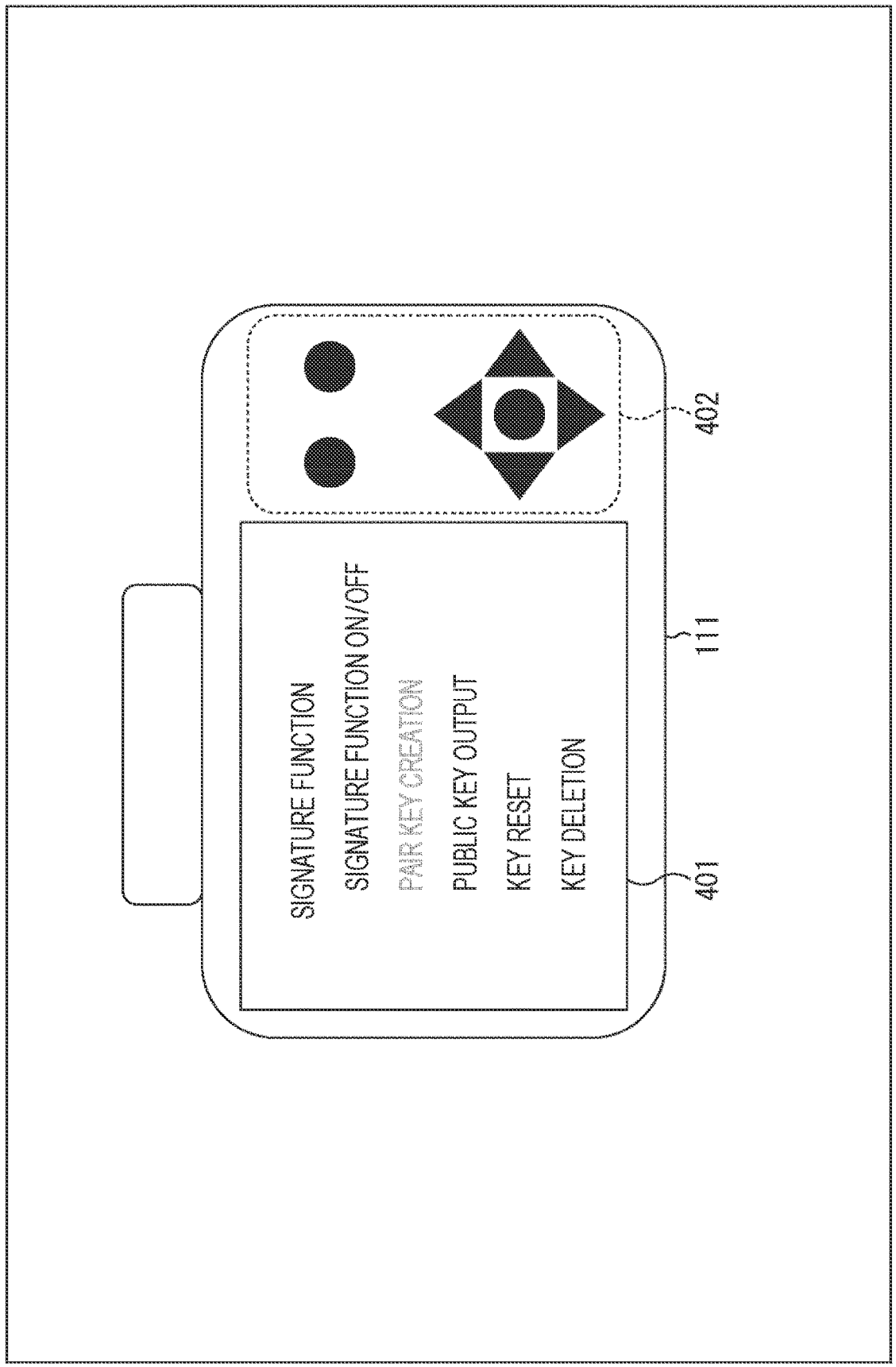
FIG. 11 is a diagram for explaining an example of a display image.

For example, in the example of FIG. 9, when the user operates the operation device 402 and presses the OK button of the GUI displayed on the display device 401, the GUI as illustrated in FIG. 11 is displayed on the display device 401. That is, the "paired key generation" cannot be selected on the menu screen in the example of FIG. 8.

Figure 12:
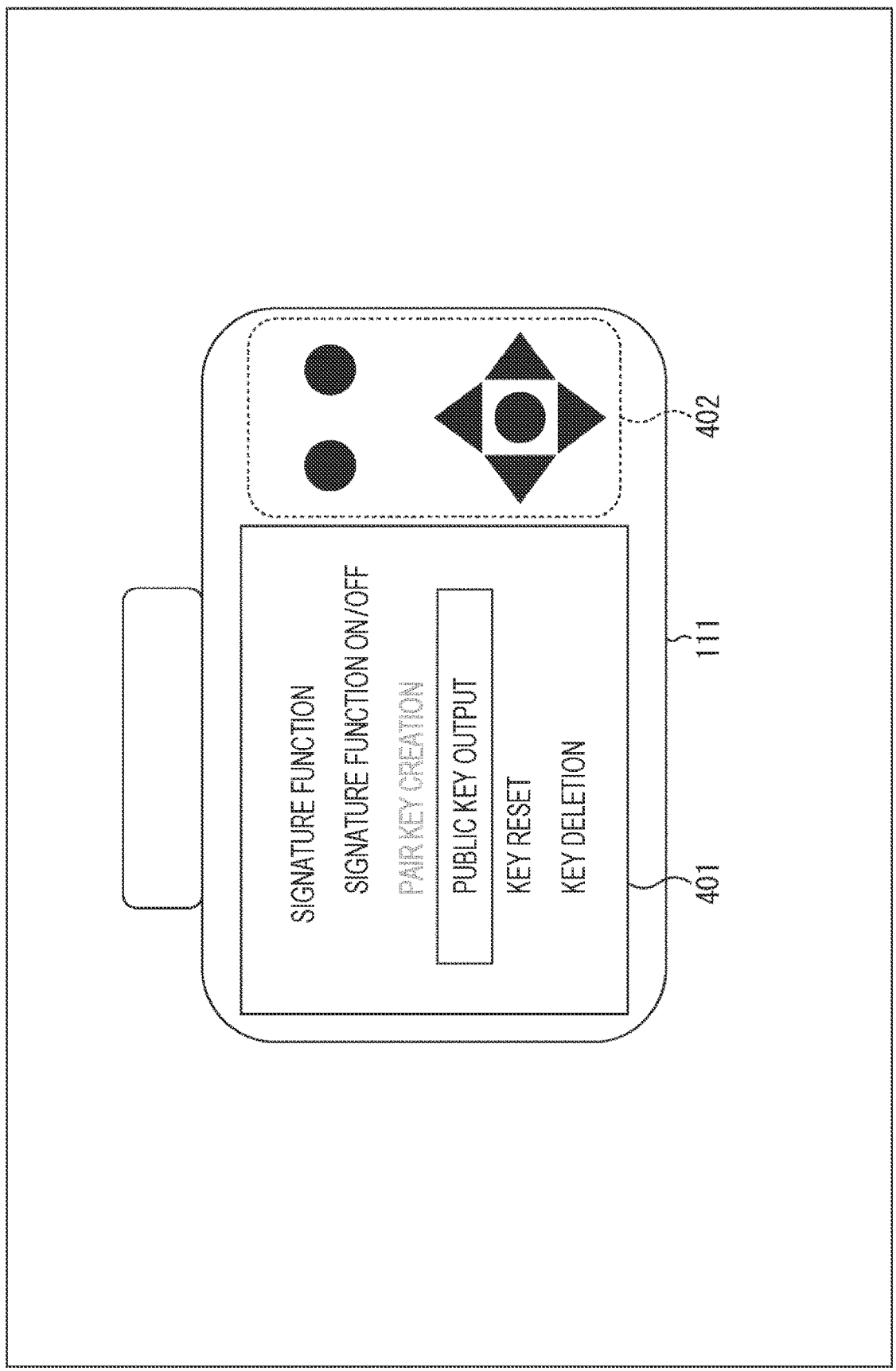
FIG. 12 is a diagram for explaining an example of a display image.
Figure 13:
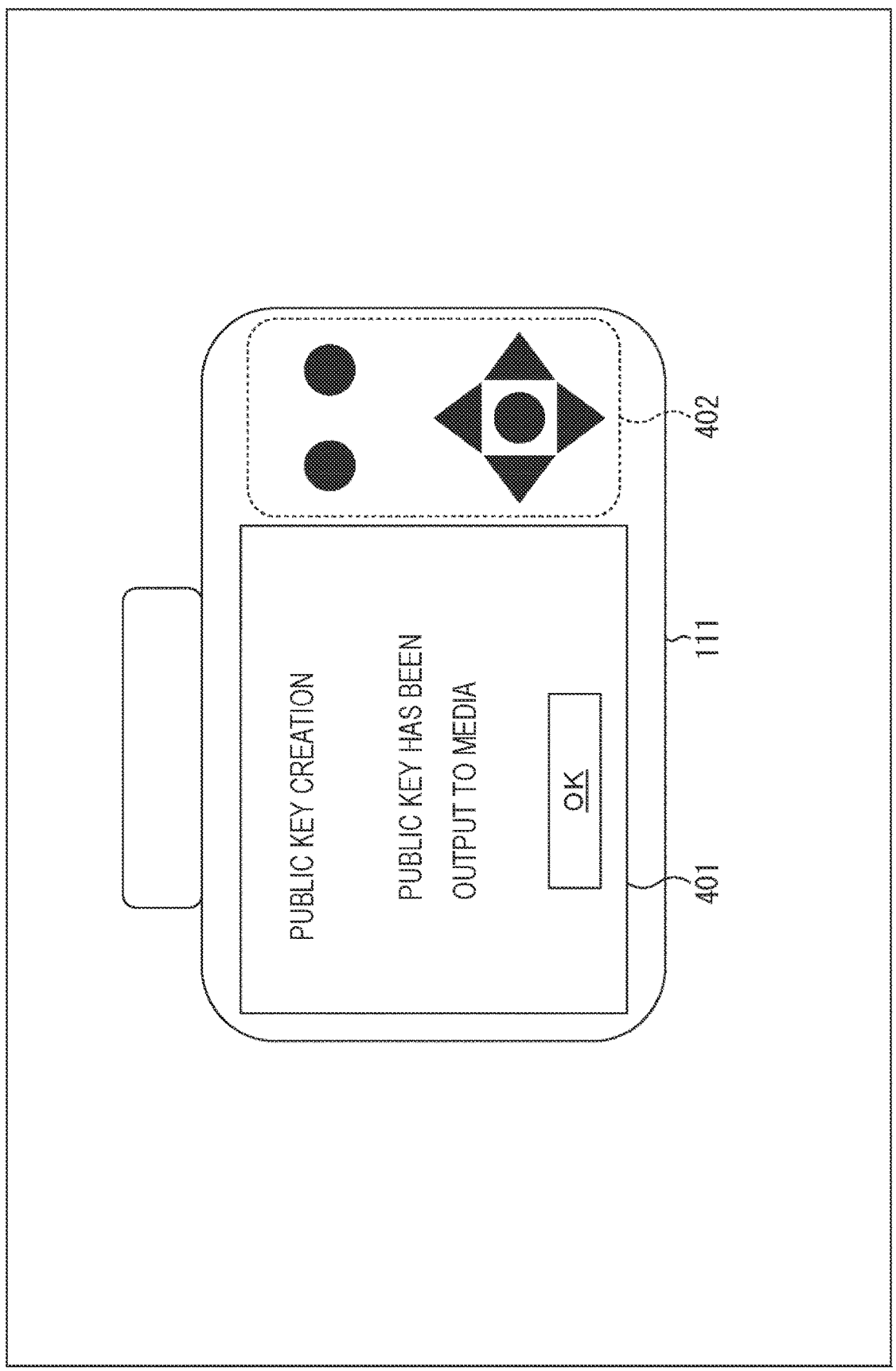
FIG. 13 is a diagram for explaining an example of a display image.

Then, when the user selects a menu of "public key output" as illustrated in FIG. 12 by operating the operation device 402 to move a cursor or the like, the process of step S103 is executed, and the device public key is uploaded as described above. Then, when the device public key is uploaded, a GUI as illustrated in FIG. 13 is displayed on the display device 401.

In step S111, the communication unit 221 of the server 112 receives the uploaded device public key.

In step S112, the device public key management unit 231 registers the device public key received in step S111 in the device public key database 223. At that time, the device public key management unit 231 registers the device public key in the device public key database 223 in association with the device unique ID of the imaging device 111 that is the supply source of the device public key. The server 112 grasps the device unique ID of the imaging device 111 that is the supply source of the device public key. For example, the server 112 acquires the device unique ID from the imaging device 111 when starting a session with the imaging device 111. Furthermore, the device unique ID may be uploaded in association with the device public key. In addition, the device public key management unit 231 may set an invalidation date on which the device public key is invalidated, and register the invalidation date in the device public key database 223 in association with the device public key.

When the process of step S112 ends, the key processing ends. By executing each process in this manner, the imaging device 111 can generate a pair key corresponding to itself and upload the device public key in the pair key to the server 112. As a result, the server 112 can detect falsification of the image and the 3D information using the signature. Therefore, the server 112 can more accurately determine the authenticity of the image.

Note that, in the above description, the device public key is uploaded from the imaging device 111 to the server 112 by communication, but the device public key generated in the imaging device 111 may be recorded in a removable recording medium and provided to the server 112 via the removable recording medium. In that case, for example, in step S103, the key processing unit 132 supplies the generated device public key to the recording unit 134. The recording unit 134 records the device public key in a removable recording medium or the like. For example, the removable recording medium is mounted in a drive of another information processing apparatus, and the recorded key information is read and transmitted to the server 112. In step S111, the communication unit 221 of the server 112 receives the transmitted device public key.

Furthermore, the timing at which the device public key is provided to the server 112 is arbitrary. For example, the device public key may be provided to the server 112 at the same time as the image (for example, stored in an image file). In addition, the device public key may be provided to the server 112 before the image file. Further, the device public key may be provided to the server 112 after the image file.

Furthermore, the server 112 (device public key management unit 231) may confirm the validity of the provided device public key. For example, the imaging device 111 and the server 112 have a common key, the imaging device 111 encrypts a device public key using the common key, and provides the encrypted device public key to the server 112. Then, the server 112 verifies the validity of the device public key by decrypting the encrypted device public key using the common key. In this manner, the validity of the device public key may be confirmed. Furthermore, the imaging device 111 and the server 112 have a common key, and the imaging device 111 calculates a hash value of the device public key using the common key and provides the hash value to the server 112. Then, the server 112 verifies the validity of the device public key by verifying the hash value using the common key. In this manner, the validity of the device public key may be confirmed. Furthermore, the imaging device 111 generates a signature of the device public key by using a model secret key that is a secret key corresponding to the model, and provides the signature to the server 112. Then, the server 112 verifies the validity of the device public key by verifying the signature using a model public key (that is, the public key corresponding to the model) that is a public key corresponding to the model secret key. In this manner, the validity of the device public key may be confirmed. Furthermore, the imaging device 111 encrypts the device public key using a server public key that is a public key corresponding to the server 112, and provides the encrypted device public key to the server 112. Then, the server 112 decrypts the encrypted device public key using the server secret key that is a secret key corresponding to the server 112, thereby verifying the validity of the device public key. In this manner, the validity of the device public key may be confirmed. Furthermore, a trusted person or institution may register the device public key in the device public key database 223 of the server 112.

Although the case where the device public key is provided from the imaging device 111 to the server 112 has been described above as an example, a common key may be provided instead of the device public key. In addition, a device public key and a common key may be provided. That is, key information (one or both of the device public key and the common key) may be provided from the imaging device 111 to the server 112.

<2-2-2. Preview Reliability Determination Processing>

The reliability of the captured 3D information obtained by the 3D information sensor 148 may be calculated and displayed on the display device 401 as a preview screen. The captured 3D information is 3D information corresponding to the captured image obtained by the 3D information sensor 148 during the period in which the image sensor 142 is driven in the capturing mode. The capturing mode is an operation mode in which the image sensor 142 acquires a captured image. This captured 3D information is acquired on the same optical axis as the captured image.

Figure 14:
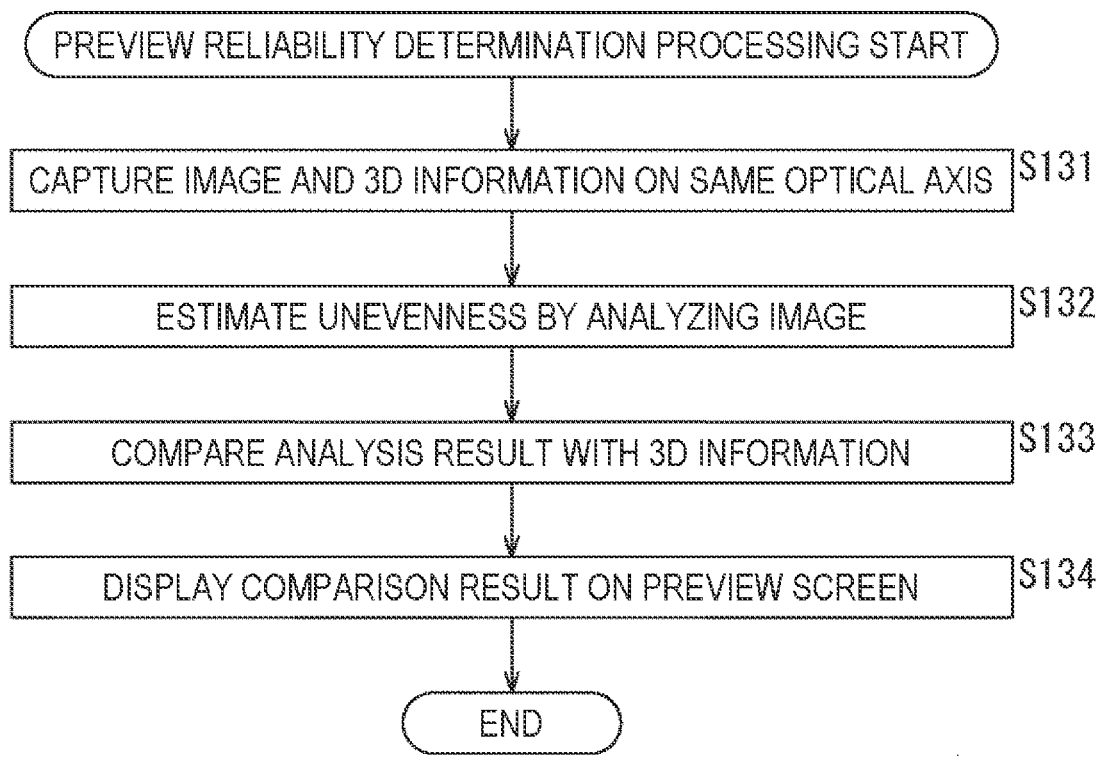
FIG. 14 is a flowchart illustrating an example of a flow of preview reliability determination processing.

An example of a flow of a preview reliability determination processing which is processing of displaying a preview screen including such reliability of the captured 3D information will be described with reference to a flowchart of FIG. 14.

When the preview reliability determination processing is started, in step S131, the sensor unit 161 of the imaging device 111 is driven in the capturing mode, and captures the captured image and the captured 3D information with the same optical axis. That is, the image sensor 142 acquires the captured image from the optical image from the subject. The 3D information sensor 148 acquires the captured 3D information from the optical image from the subject on the same optical axis as the captured image.

Figure 15:
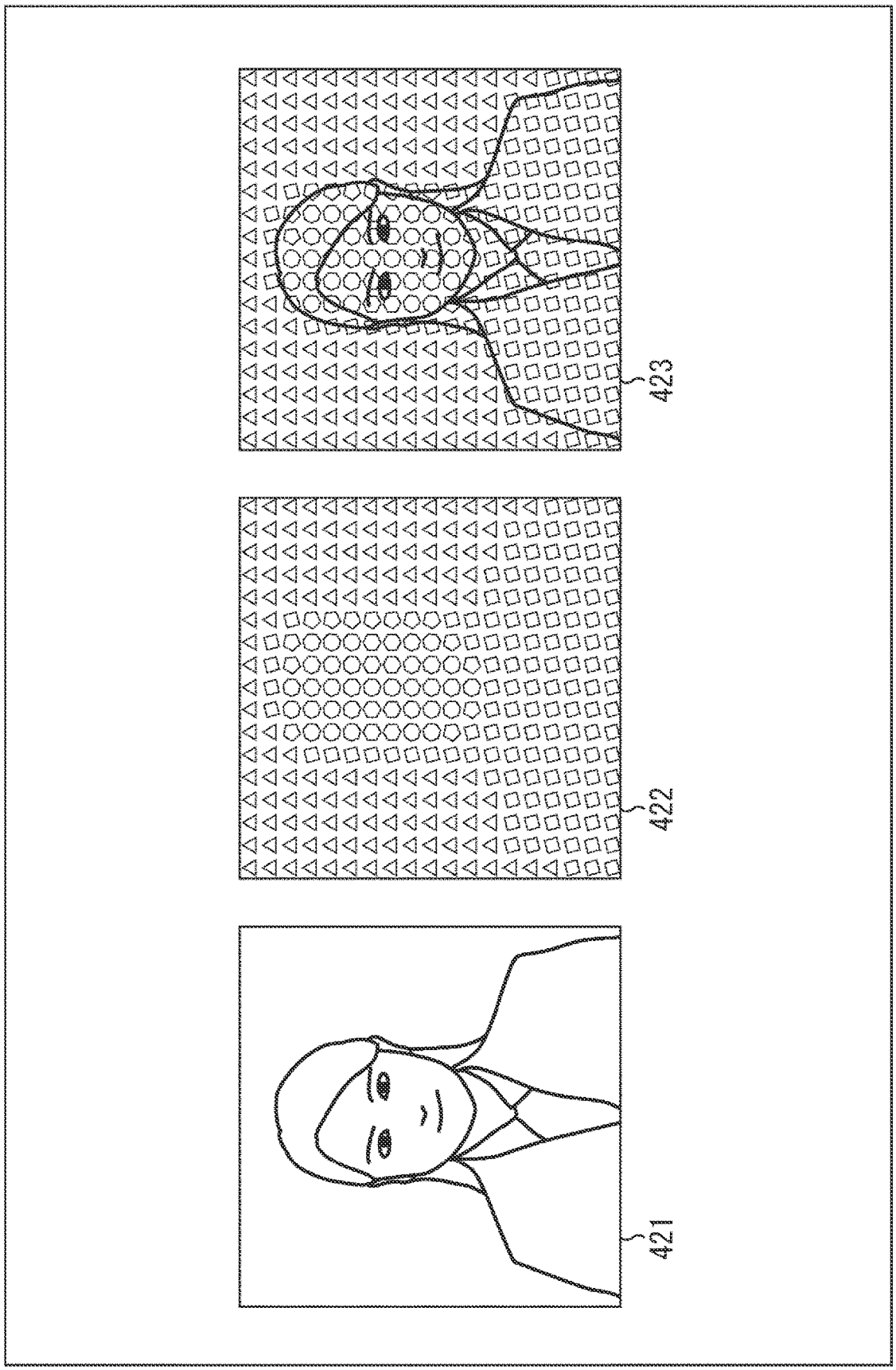
FIG. 15 is a diagram for explaining an example of a preview image and 3D information.

For example, in the capturing mode, the image sensor 142 generates a captured image 421 of FIG. 15, and 3D information sensor 148 generates the captured 3D information 422 of FIG. 15. In the captured 3D information 422, each polygon indicates distance-related information (for example, phase data, depth values, and the like). Each polygon indicates that the smaller the number of angles, the farther the subject in the area is from the imaging device 111 (3D information sensor 148). In other words, each polygon indicates that the subject in the region is closer to the imaging device 111 (3D information sensor 148) as the number of angles is larger. The resolution of the captured 3D information 422 is arbitrary, but if the data amount is not considered, it is desirable that the resolution be higher (for example, the same resolution as the captured image 421).

Since the captured image 421 and the captured 3D information 422 correspond to each other, for example, in a case where the captured image 421 and the captured 3D information 422 are superimposed as in a superimposed image 423, the state of the unevenness indicated by the captured 3D information 422 basically matches the state of the unevenness of the captured image 421 (the state of the unevenness estimated from the captured image 421). However, the 3D information sensor 148 cannot always detect correct distance-related information. For example, there may be a case where erroneous distance-related information is obtained depending on the composition, angle, or the like of the subject. In such a case, the appearance of the unevenness may not match (or the degree of matching is reduced) between the captured 3D information 422 and the captured image 421. In a case where the subject is imaged and the image (captured image) and the 3D information are generated in such a state, similarly to the case of the captured image 421 and the captured 3D information 422, the state of the unevenness may not match (or the degree of matching is reduced) between the image and the 3D information. Then, in a case where the authenticity of the image is confirmed using the 3D information in which the state of the unevenness does not match (or the degree of matching is low), the accuracy of the confirmation result may be reduced.

Therefore, the imaging device 111 calculates the reliability of the captured 3D information and displays the reliability on the display device 401 as a preview screen.

That is, in step S132, the reliability calculation unit 154 analyzes the captured image captured in step S131, and estimates the state of the unevenness of the subject (also referred to as the state of the unevenness of the captured image). A method of estimating the state of the unevenness of the captured image is arbitrary. For example, the reliability calculation unit 154 may obtain a feature of the captured image and estimate the state of the unevenness of the captured image on the basis of the feature. For example, the reliability calculation unit 154 may detect the face, the eyes, the nose, the ears, and the like included in the captured image and estimate the state of the unevenness of each detected portion.

Then, in step S133, the reliability calculation unit 154 compares the state of the unevenness (analysis result) of the captured image estimated in step S132 with the state of the unevenness (also referred to as the state of the unevenness of the captured 3D information) indicated by the captured 3D information, and calculates the reliability of the 3D information on the basis of the degree of coincidence. A method of calculating this reliability is arbitrary. For example, the method described in WO 2019/073814 A may be applied.

In step S134, the control unit 121 includes the comparison result (comparison result between the state of the unevenness of the captured image estimated in step S132 and the state of the unevenness of the 3D information) obtained by the processing in step S133 in the preview screen and causes the result to be displayed on the display device 401. The comparison result may be any information. For example, the control unit 121 may cause the calculated reliability to be displayed as a numerical value or an image. Furthermore, the control unit 121 may compare the calculated reliability with a predetermined threshold value and cause a comparison result (for example, whether the reliability is high or low (compared to the threshold value) or the like) to be displayed as a character or an image. In addition, the captured image 421 and the captured 3D information 422 may be included in the preview screen and displayed on the display device 401.

When the process of step S134 ends, the preview reliability determination processing ends.

By executing each process in this manner, the imaging device 111 can present the reliability of the captured 3D information to the user on the preview screen. The user can perform imaging in a state where the reliability becomes higher, for example, by correcting the position and posture of the imaging device 111 on the basis of this information or the like. Therefore, the server 112 can more accurately determine the authenticity of the image.

<2-2-3. Imaging Processing>

Next, an example of a flow of imaging processing executed when the imaging device 111 images a subject will be described with reference to a flowchart of FIG. 16.

Figure 17:
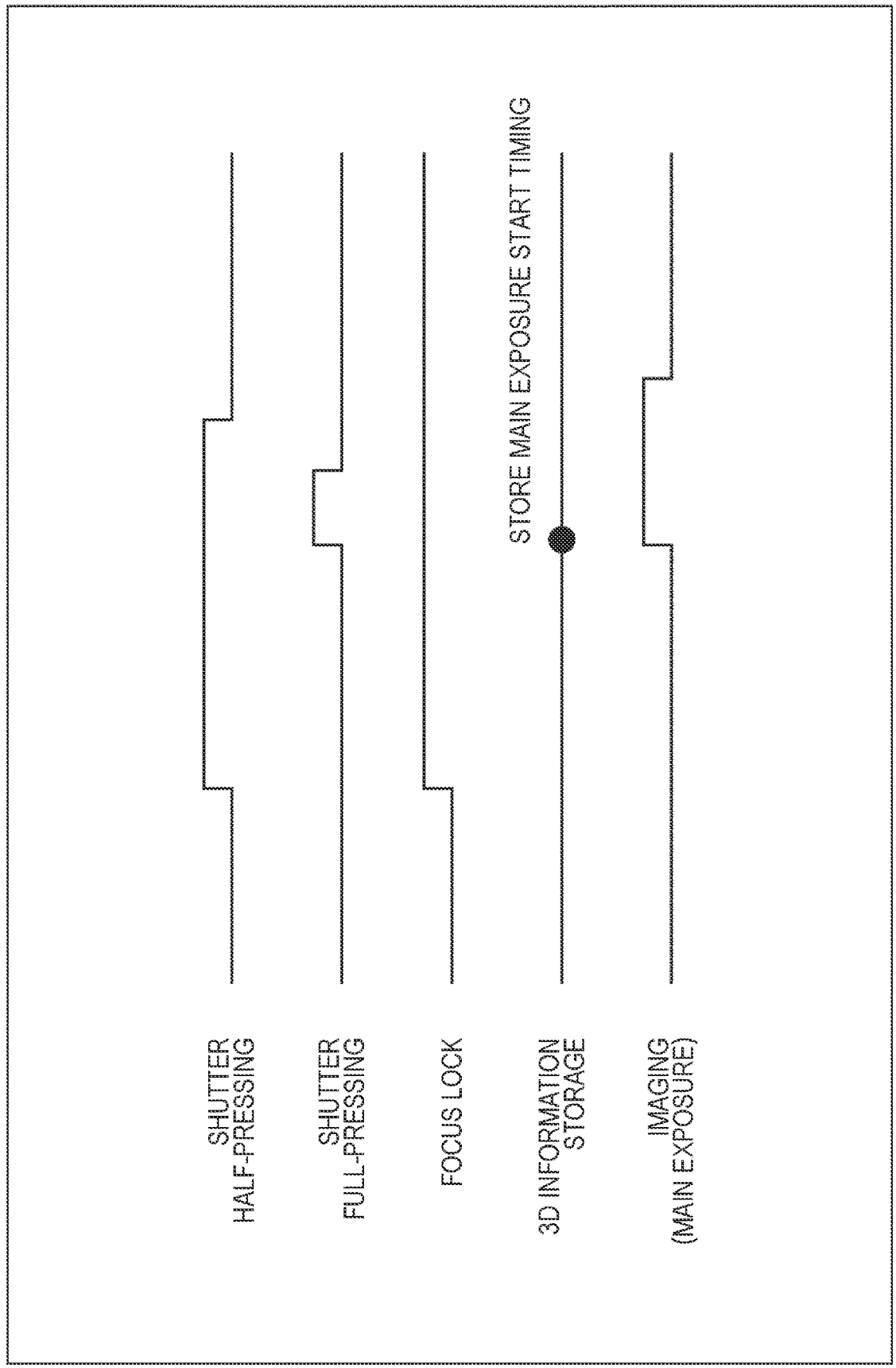
FIG. 17 is a timing chart for explaining 3D information generation timing.

When the imaging processing is started, the sensor unit 161 of the imaging device 111 acquires the RAW image and the 3D information on the same optical axis in step S151. That is, the image sensor 142 captures an optical image from a subject to acquire a RAW image of the subject. The 3D information sensor 148 acquires 3D information from an optical image from a subject on the same optical axis as that of the RAW image. The 3D information sensor 148 acquires 3D information at a main exposure start timing at which main exposure is started in the image sensor 142. The main exposure indicates exposure for so-called "imaging" for obtaining an image to be stored. For example, the main exposure is started on the basis of an imaging instruction operation (for example, a full press of a shutter button or the like) by the user or the like. That is, the exposure for obtaining the captured image (exposure during the period of driving in the capturing mode) is not included in the main exposure. For example, also in a case where the imaging device 111 images a subject in the single autofocus mode (AF-S), the 3D information sensor 148 acquires and stores 3D information (phase difference information) at the main exposure start timing of the image sensor 142, for example, as in the timing chart illustrated in FIG. 17. Note that the single autofocus mode (AF-S) indicates a mode in which the focal length is adjusted on the basis of a predetermined operation (for example, half-pressing of a shutter button or the like) by the user or the like, and then the focal length is fixed. In the case of the single autofocus mode, for example, when a predetermined operation such as half-pressing of the shutter button is performed by the user or the like, the optical system 141 adjusts the focal length so as to focus on the subject on the basis of the control of the control unit 121, and causes focus on the subject. When the subject is focused, the control unit 121 performs control for fixing the focus with respect to the optical system 141. This control is also referred to as focus lock. That is, as in the timing chart illustrated in FIG. 17, when the shutter button is half-pressed, the focus lock is applied. When the focus lock is applied, the optical system 141 fixes the focal length thereof.

That is, in a case where the focal length can be fixed for a long period of time as in the single autofocus mode, for example, if the 3D information is acquired at the timing when the focus lock is applied, it is possible to execute trick shooting in which the subject is switched and imaging is performed thereafter (while the focal length is fixed). That is, it is possible to generate a false image in which the 3D information and the image have different subjects by such trick shooting.

On the other hand, by acquiring the 3D information at the main exposure start timing as described above, it becomes difficult to perform such trick shooting. That is, it becomes difficult to generate a false image having different subjects between the 3D information and the image. Therefore, the server 112 can more accurately confirm the authenticity of the image.

Figure 18:
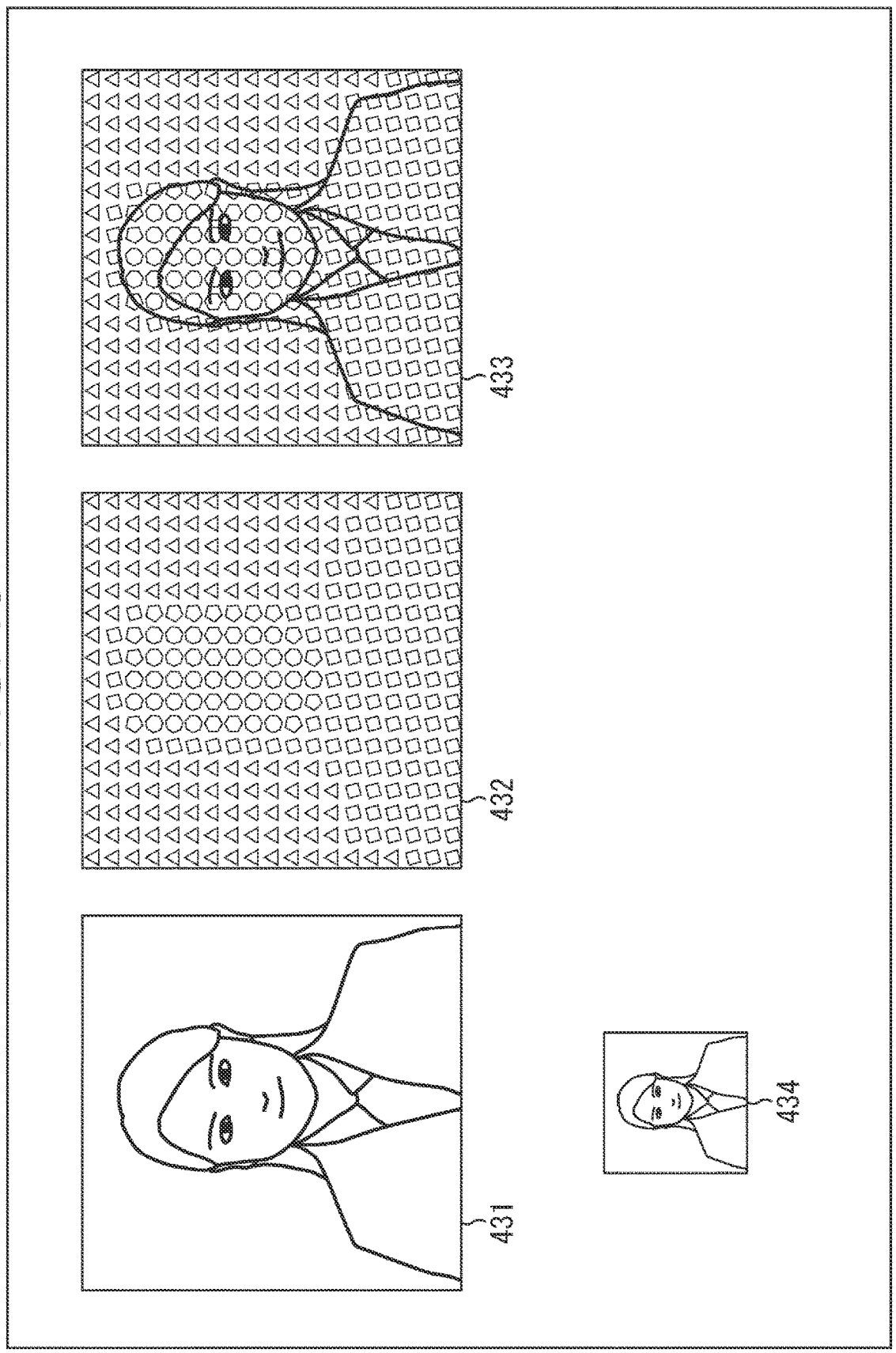
FIG. 18 is a diagram for explaining an example of a captured image and 3D information.

For example, the image sensor 142 generates an image 431 of FIG. 18, and the 3D information sensor 148 generates 3D information 432 of FIG. 18. In the 3D information 432, each polygon indicates distance-related information (for example, phase data, depth values, and the like). Each polygon indicates that the smaller the number of angles, the farther the subject in the area is from the imaging device 111 (3D information sensor 148). In other words, each polygon indicates that the subject in the region is closer to the imaging device 111 (3D information sensor 148) as the number of angles is larger. The resolution of the 3D information 432 is arbitrary, but if the data amount is not considered, it is desirable that the resolution be higher (for example, the same resolution as that of the image 431).

A superimposed image 433 in FIG. 18 illustrates an example of a state in which the image 431 and the 3D information 432 are superimposed. Since the image 431 and the 3D information 432 correspond to each other, the state of the unevenness indicated by the 3D information 432 as in the superimposed image 433 basically coincides with the state of the unevenness of the image 431 (the state of the unevenness estimated from the image 431).

In step S152, the RAW processing unit 143 performs predetermined processing on the RAW image obtained in step S151. For example, the RAW processing unit 143 executes processing such as correction of a defective pixel for which a normal pixel value has not been obtained and noise removal processing on the RAW image.

In step S153, the YUV processing unit 144 converts the RAW image subjected to the predetermined processing in step S152 into a YUV image. For example, the YUV processing unit 144 performs color separation processing (for example, demosaic processing in the case of a mosaic color filter such as a Bayer array) on the RAW image, and converts the obtained RGB plane image after color separation into a YUV image. Furthermore, the YUV processing unit 144 performs white balance correction on the RGB plane image after color separation or the YUV image after conversion.

In step S154, the reduced image generation unit 145 generates a reduced image obtained by reducing the YUV image (main image). For example, the reduced image generation unit 145 reduces the image 431 and generates a reduced image 434 in FIG. 18. A method of generating the reduced image is arbitrary. In addition, the size of the reduced image is arbitrary. For example, the reduced image may be a so-called thumbnail or a screen nail.

In step S155, the metadata addition unit 146 generates the metadata and adds the metadata to the main image.

In step S156, the hash processing unit 147 calculates the hash value using the main image, the 3D information, the reduced image, and the metadata.

In step S157, the signature generation unit 150 generates a signature of information including at least the main image and the 3D information. For example, the signature generation unit 150 generates the signature of the main image, the 3D information, the reduced image, and the metadata by encrypting the hash value calculated in step S156 using the device secret key corresponding to the imaging device 111. Note that the signature generation unit 150 may generate this signature by encrypting the hash value using a common key instead of the device secret key.

In step S158, the image file generation unit 151 compresses and encodes the YUV image (main image) to generate a JPEG image. In addition, the image file generation unit 151 generates an image file, and stores a main image (JPEG image), a reduced image, metadata, and a signature.

Figure 19:
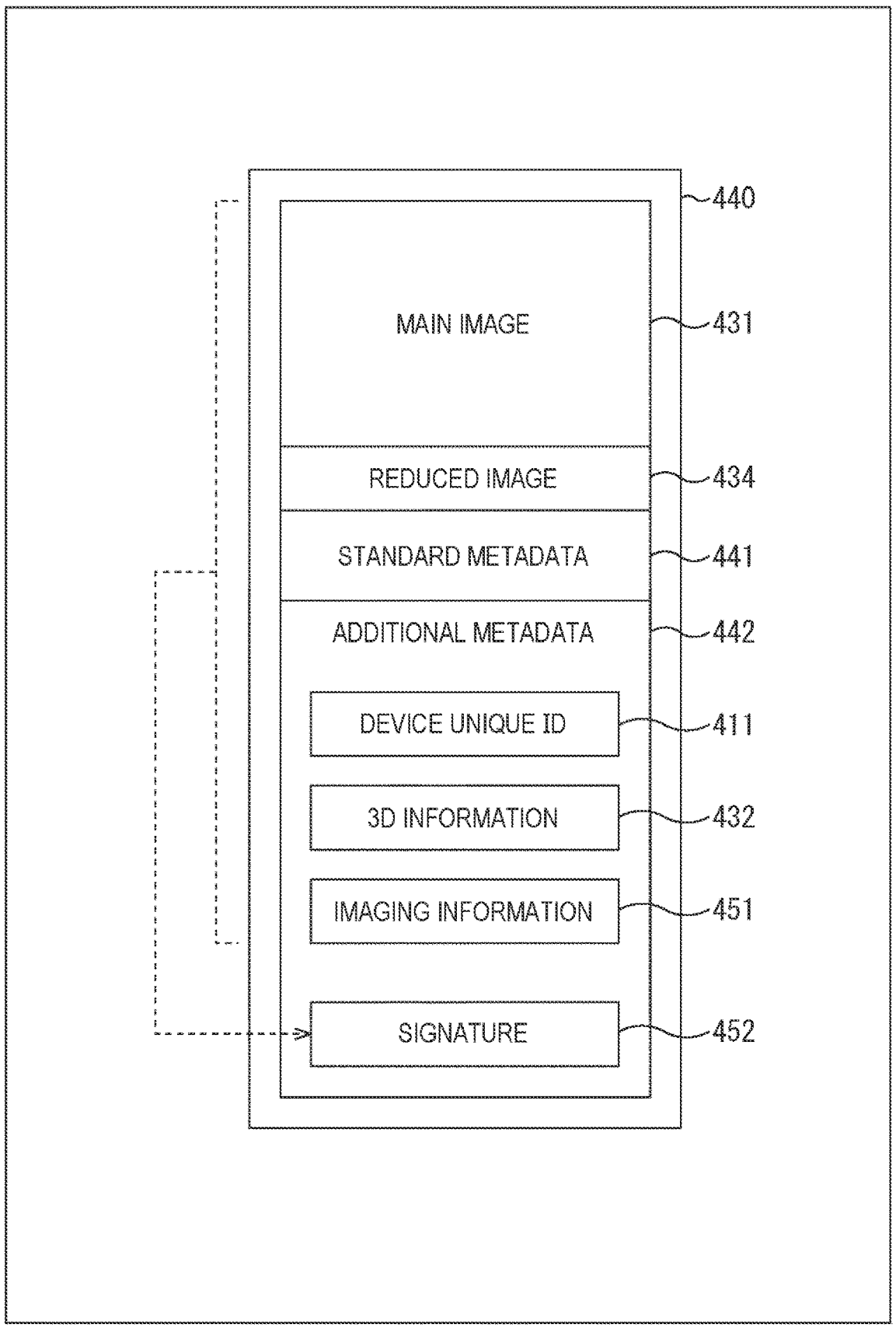
FIG. 19 is a diagram for explaining a main configuration example of an image file.

FIG. 19 is a diagram illustrating a main configuration example of the image file. The image file 440 illustrated in FIG. 19 stores a main image 431 and a reduced image 434. The main image 431 may be a JPEG image (main image subjected to compression encoding), a RAW image or a YUV image (main image not subjected to compression encoding), or both of them. The reduced image 434 may be a JPEG image obtained by compressing and encoding the YUV image reduced by the resizing processing, may be a reduced YUV image, or may be both of them.

Note that, in a case where a RAW image is stored as the main image 431 in the image file 440, the RAW image acquired by the image sensor 142 is supplied to the image file generation unit 151 via the RAW processing unit 143, the YUV processing unit 144, the reduced image generation unit 145, the metadata addition unit 146, the hash processing unit 147, and the signature generation unit 150. The image file generation unit 151 stores the RAW image as the main image 431 in the image file 440. Note that, in a case where a JPEG image (compressed and encoded image) is stored in the image file 440 as the main image 431 together with a RAW image or a YUV image (image not compressed and encoded), the image file generation unit 151 compresses and encodes the YUV image to generate a JPEG image, and stores the JPEG image in the image file 440 as the main image 431 together with the RAW image or the YUV image.

Furthermore, in a case where a JPEG image (compressed and encoded image) is stored as the reduced image 434 in the image file 440, the reduced image generation unit 145 reduces the YUV image. Then, the image file generation unit 151 compresses and encodes the reduced YUV image to generate a JPEG image, and stores the JPEG image as a reduced image 434 in the image file 440. Note that, in a case where a JPEG image (compressed and encoded image) is stored in the image file 440 together with a YUV image (uncompressed and encoded image) as the reduced image 4341, the image file generation unit 151 stores the JPEG image generated as described above in the image file 440 together with the reduced YUV image as the reduced image 434.

In addition, in the image file 440, standard metadata 441 and additional metadata 442 are stored as metadata. The standard metadata 441 includes, for example, items defined by a standard or the like. The additional metadata 442 includes items that are not included in the standard metadata 441, such as items set by a manufacturer. For example, the additional metadata 442 may include the device unique ID 411. Furthermore, the additional metadata 442 may include imaging information 451 that is information regarding imaging of the subject.

In addition, the 3D information 432 is stored in the image file 440 as additional metadata. Further, the signature generated in step S157 is stored in the image file 440 as additional metadata (signature 452).

Note that information indicating that the main image 431 and the 3D information 432 have been obtained on the same optical axis (for example, as additional metadata) may be stored in the image file 440. The information may be, for example, flag information indicating whether or not the main image 431 and the 3D information 432 are obtained on the same optical axis, or may be a device name, a model name, identification information, or the like of a device in which the main image 431 and the 3D information 432 are necessarily obtained on the same optical axis. By including such information in the image file 440, the signature can be determined without registering the device public key. That is, the image file generation unit 151 may store metadata including information indicating that the 3D information is acquired on the same optical axis as the image in the image file.

Furthermore, information indicating the shutter speed of the image sensor 142 in imaging of a subject for generating an image (for example, as additional metadata) may be stored in the image file 440. This information may indicate the shutter speed by any expression method. For example, this information may indicate the shutter speed numerically. In addition, this information may indicate the shutter speed for each stage in a predetermined level range. Further, this information may indicate whether the shutter speed is faster or slower than a predetermined standard. That is, the image file generation unit 151 may store the shutter speed of imaging as metadata in the image file.

As described above, the generation of the 3D information (detection of the distance-related information) is performed at the timing when the exposure of the image sensor 142 starts. Therefore, in a case where the shutter speed is low, in other words, in a case where the exposure period is long, there is a possibility that it is possible to execute trick shooting such as switching the subject during the exposure. That is, there is a possibility that a false image having different subjects between the 3D information and the image can be generated.

For example, if the shutter speed is set to 10 seconds in a dark room, the imaging device 111 is directed to a person until immediately before imaging, and the imaging device 111 is directed to the monitor of the composite image after exposure is started, an image of a subject different from the subject indicated by the 3D information can be obtained.

Therefore, as described above, the image file generation unit 151 stores the information indicating the shutter speed of imaging when an image is generated in the image file as metadata. With this configuration, the server 112 that confirms the authenticity of the image can grasp the shutter speed at the time of image generation on the basis of the metadata included in the image file. That is, the server 112 can confirm the authenticity of the image in consideration of the shutter speed. Therefore, the server 112 can more accurately confirm the authenticity of the image.

Furthermore, in a case where both a RAW image and a JPEG image are stored as the main image 431 in the image file 440, a signature of the RAW image may be stored as the signature 452 in the image file 440, a signature of the JPEG image may be stored in the image file 440, or a signature of the RAW image and the JPEG image may be stored in the image file 440.

Returning to FIG. 16, in step S159, the recording unit 134 records the image file generated in step S158 on a removable recording medium or the like. The image file is provided to the server 112 via the removable recording medium or the like.

Figure 20:
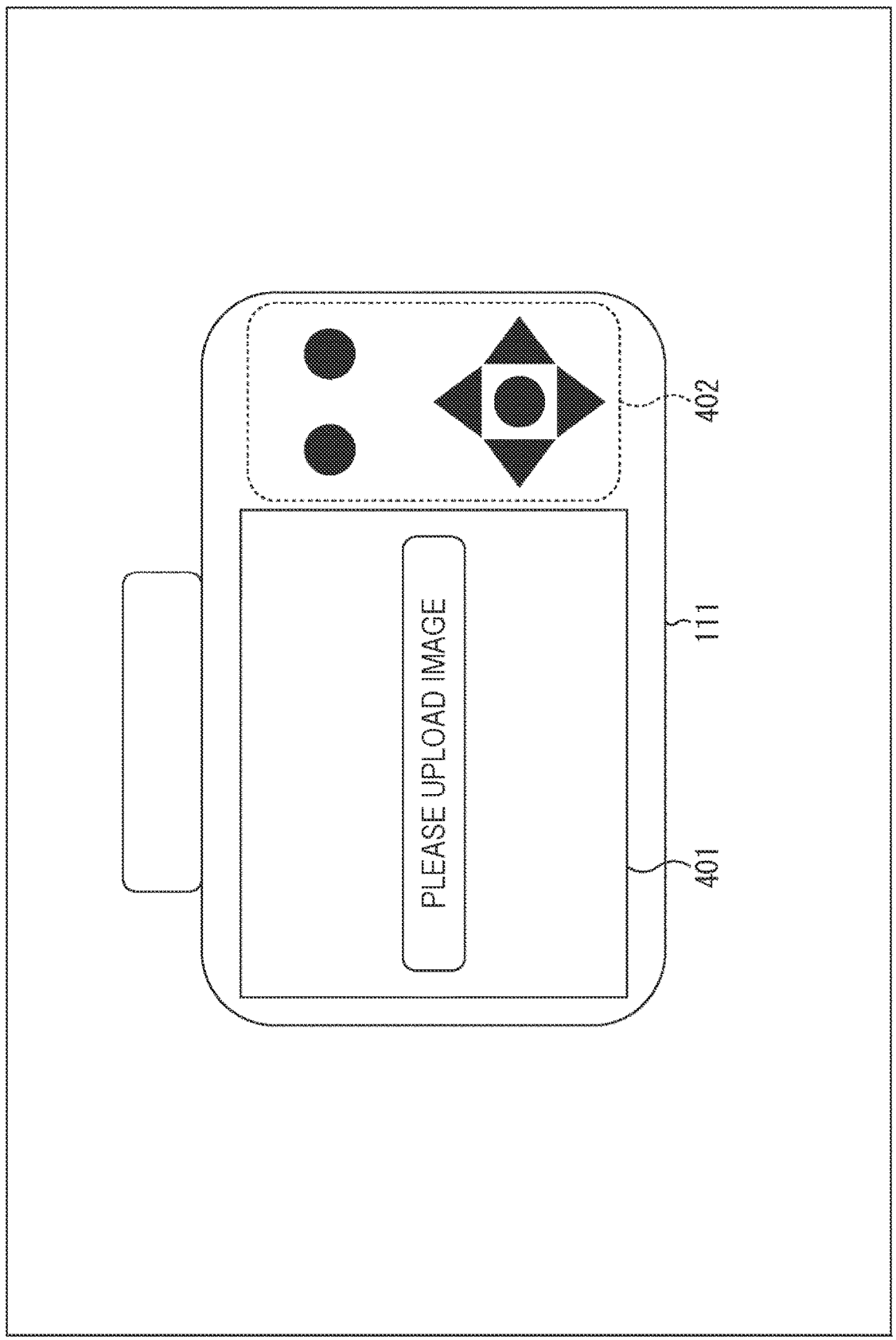
FIG. 20 is a diagram for explaining an example of a display image.

In step S160, the upload unit 133 uploads the image file generated in step S158 to the server 112. That is, the image file is provided to the server 112 by communication. For example, when a guide screen as illustrated in FIG. 20 is displayed on the display device 401, the user operates the operation device 402 and instructs uploading of an image file from a menu screen or the like. When the instruction is supplied to the upload unit 133 via the control unit 121, the upload unit 133 executes the process of step S160 and uploads the image file to the server 112.

When step S160 ends, the imaging processing ends. Note that either the process in step S159 or the process in step S160 may be omitted.

By executing each process as described above, the imaging device 111 can provide an image generated by imaging the subject, 3D information obtained on the same optical axis as the image, and a signature of the image and the 3D information generated using the device secret key corresponding to the imaging device 111 to the server 112. As a result, the server 112 can determine the authenticity of the image using the image and the 3D information that have not been falsified. Therefore, the server 112 can more accurately determine the authenticity of the image.

Note that, if the RAW image and the 3D information acquired by the process of step S151 and the metadata generated by the process of step S155 are stored, the processes of other steps (processing on RAW image, generation of YUV image, generation of reduced image, calculation of hash value, generation of signature, generation and provision of image file, and the like) may be executed as processing different from the imaging processing after the imaging processing is completed.

<2-2-4. Imaging Processing (Signature Control)>

The imaging device 111 may be able to control whether or not to create a signature. An example of a flow of imaging processing in that case will be described with reference to a flowchart of FIG. 21.

When the imaging processing is started, in step S181, the control unit 121 sets a signature execution mode (whether or not to generate a signature) on the basis of an instruction based on a user operation, an instruction of an application, or the like.

Figure 16:
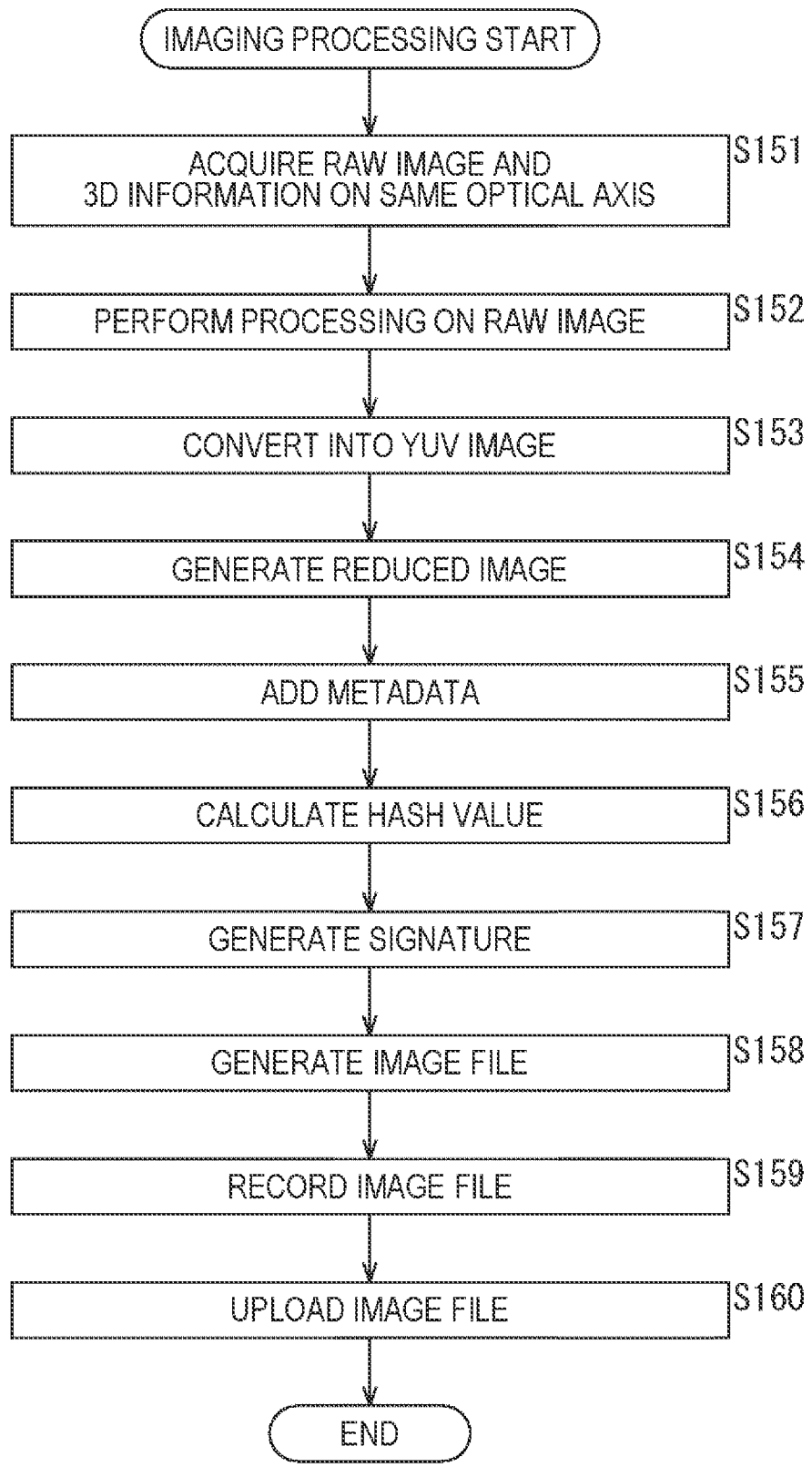
FIG. 16 is a flowchart illustrating an example of a flow of imaging processing.

Each process of steps S182 to S186 is executed similarly to each process of steps S161 to S165 of FIG. 16. That is, the main image, the 3D information, the reduced image, the metadata, and the like are generated.

In step S187, the signature control unit 153 determines whether or not to generate a signature on the basis of the execution mode of the signature set in step S181. In a case where it is determined that the execution mode of the signature is the mode for generating the signature, the process proceeds to step S188.

Each process of steps S188 and S189 is executed similarly to each process of steps S166 and S167 of FIG. 16. That is, the hash value of the information including at least the main image and the 3D information is calculated, and the signature is generated using the device secret key corresponding to the imaging device 111. That is, a signature of information including at least the main image and the 3D information is generated.

When the process of step S189 ends, the process proceeds to step S190. Furthermore, in a case where it is determined in step S187 that the execution mode of the signature is the mode in which the signature is not generated, the processes of steps S188 and S189 are omitted, and the process proceeds to step S190.

Each process of steps S190 to S192 is executed similarly to each process of steps S158 to S160 of FIG. 16. That is, an image file is generated, and the image file is recorded on a removable recording medium or the like by the recording unit 134 or uploaded to the server 112.

When the process of step S192 ends, the imaging processing ends. Also in this case, either the process of step S191 or the process of step S192 may be omitted. Furthermore, if the RAW image and the 3D information acquired by the process of step S182 and the metadata generated by the process of step S186 are stored, the processing of other steps (setting of signature execution mode, processing on RAW image, generation of YUV image, generation of reduced image, calculation of hash value, generation of signature, generation and provision of image file, and the like) may be executed as processing different from the imaging processing after the imaging processing is completed.

By executing each process as described above, the imaging device 111 can control whether or not to generate a signature of information including at least the main image and the 3D information. As a result, the imaging device 111 can suppress an increase in load due to generation of the signature in a case where the signature is unnecessary.

Figure 22:
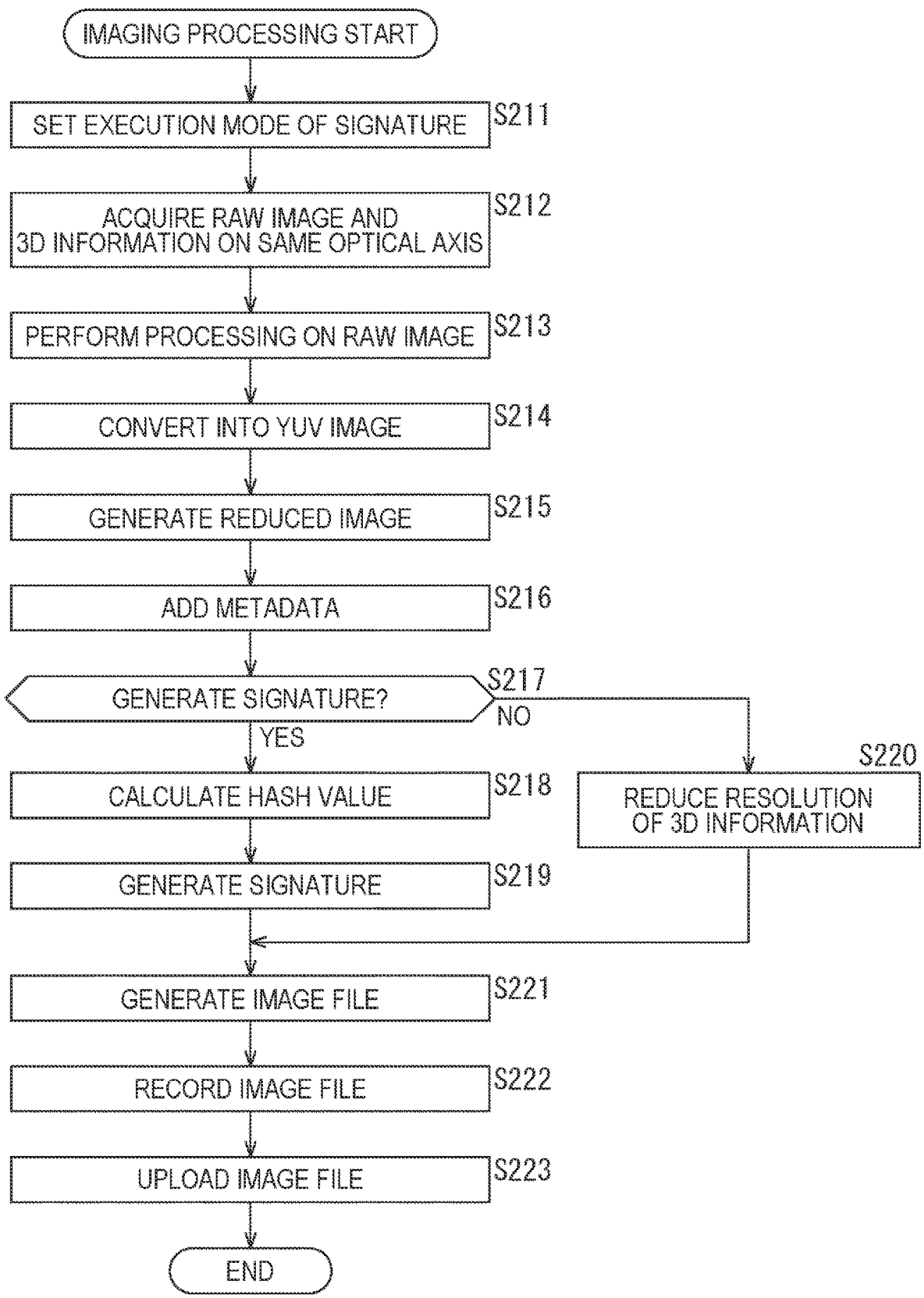
FIG. 22 is a flowchart illustrating an example of a flow of imaging processing.

Note that, in a case where the signature is not generated, the resolution of the 3D information may be reduced. For example, in a case where the authenticity of the image is confirmed using the 3D information, the higher the resolution of the 3D information, the more accurately the server 112 can determine the authenticity of the image. However, the higher the resolution of the 3D information, the larger the data amount. Therefore, in a case where the 3D information is not used to confirm the authenticity of the image and the signature of the 3D information is unnecessary, the higher the resolution of the 3D information, the more unnecessarily the data amount of the image file increases. Therefore, as described above, in a case where the signature is not generated, the 3D information processing unit 149 (3D information resolution setting unit) may perform control to reduce the resolution of the 3D information. An example of a flow of imaging processing in that case will be described with reference to a flowchart of FIG. 22.

Figure 21:
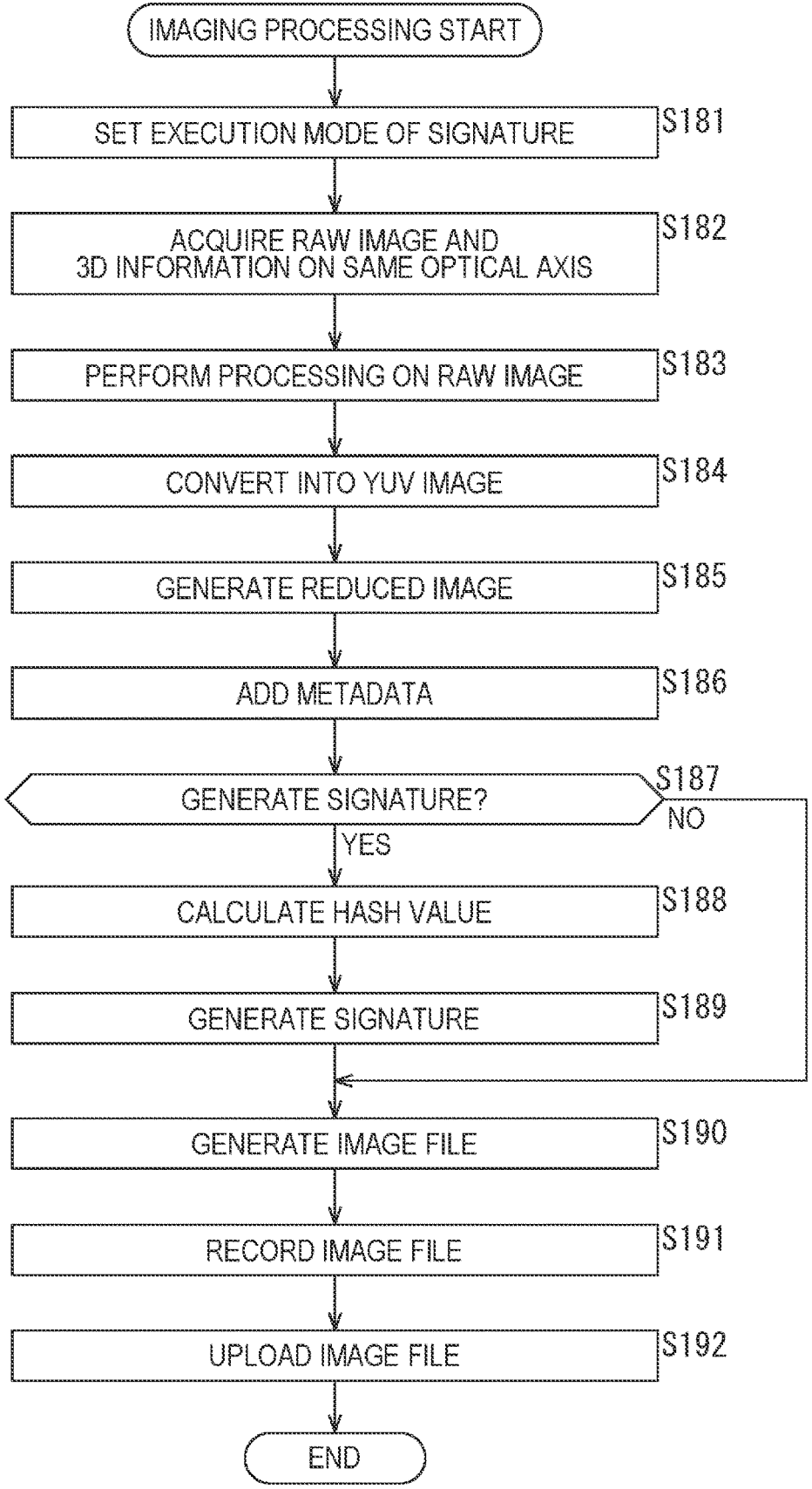
FIG. 21 is a flowchart illustrating an example of a flow of imaging processing.

When the imaging processing is started, each process of steps S211 to S216 is executed similarly to each process of steps S181 to S186 of FIG. 21. That is, the signature execution mode is set on the basis of an instruction based on a user operation or an instruction of an application or the like, and the main image, the 3D information, the reduced image, the metadata, and the like are generated.

In step S217, the signature control unit 153 determines whether or not to generate a signature on the basis of the execution mode of the signature set in step S211. In a case where it is determined that the execution mode of the signature is the mode for generating the signature, the process proceeds to step S218.

Each process of steps S218 and S219 is executed similarly to each process of steps S188 and S189 of FIG. 21. That is, the hash value of the information including at least the main image and the 3D information is calculated, and the signature is generated using the device secret key corresponding to the imaging device 111. That is, a signature of information including at least the main image and the 3D information is generated. When the process of step S219 ends, the process proceeds to step S221.

Furthermore, in a case where it is determined in step S217 that the execution mode of the signature is the mode in which the signature is not generated, the process proceeds to step S220. In step S220, the 3D information processing unit 149 reduces the resolution of the 3D information. That is, in a case where the signature is not generated, the 3D information processing unit 149 (3D information resolution setting unit) reduces the resolution of the 3D information. Note that the resolution in this case may include the resolution of the dynamic range of each pixel value (that is, the resolution in the depth direction) in addition to the resolution in the plane direction (the resolution in the X axis and the Y axis). That is, the resolution of the dynamic range of each pixel value may be reduced. When the process of step S220 ends, the process proceeds to step S221.

Each process of steps S221 to S223 is executed similarly to each process of steps S190 to S192 of FIG. 21. That is, an image file is generated, and the image file is recorded on a removable recording medium or the like by the recording unit 134 or uploaded to the server 112. However, the processing in step S221 is executed as follows. In a case where the signature is generated, the image file generation unit 151 stores the main image, the 3D information, the reduced image, the metadata, and the signature in the image file. In a case where the signature is not generated, the image file generation unit 151 stores the main image, the 3D information with the reduced resolution, the reduced image, and the metadata in the image file. When the process of step S223 ends, the imaging processing ends. Also in this case, either the process of step S222 or the process of step S223 may be omitted. Furthermore, if the RAW image and the 3D information acquired by the process of step S212 and the metadata generated by the process of step S216 are stored, the processing of other steps (Setting of signature execution mode, processing on RAW image, generation of YUV image, generation of reduced image, calculation of hash value, generation of signature, reduction of resolution of 3D information, generation and provision of image file, and the like) may be executed as processing different from the imaging processing after the imaging processing is completed.

By executing each process as described above, the imaging device 111 can reduce the resolution of the 3D information in a case where the signature of the information including at least the main image and the 3D information is not generated. Therefore, an unnecessary increase in the data amount of the image file can be suppressed.

Note that, in a case where the signature is not generated, the 3D information may not be stored in the image file. In that case, the process of step S220 is omitted. That is, in a case where it is determined in step S217 that the execution mode of the signature is the mode in which the signature is not generated, the process proceeds to step S221. In this case, in step S221, the image file generation unit 151 stores the main image, the reduced image, and the metadata in the image file.

Furthermore, in a case where the shape of the subject is a plane, a signature may not be generated. In a case where the shape of the subject is a plane, it may be difficult to determine the authenticity of the image on the basis of the state of the unevenness of the subject in the 3D information. Therefore, in such a case, the signature may not be generated as described above. By not generating the signature, it is possible to determine that there is no authenticity of the image in the determination of authenticity of the image. That is, the imaging device 111 may determine whether or not the shape of the subject is a plane, and in a case where the shape of the subject is a plane, the image file may be generated such that it is determined that there is no authenticity of the image in the determination of authenticity of the image. An example of a flow of imaging processing in that case will be described with reference to a flowchart of FIG. 23.

When the imaging processing is started, the process of step S241 is performed similarly to the process of step S151 of FIG. 16. That is, the main image and the 3D information are obtained on the same optical axis.

In step S242, the 3D information processing unit 149 analyzes the unevenness of the subject on the basis of the 3D information.

Each process of steps S243 to S246 is executed similarly to each process of steps S152 to S155 of FIG. 16. That is, a YUV image, a reduced image, metadata, and the like are generated.

In step S247, the 3D information processing unit 149 determines whether or not the shape of the subject is a plane on the basis of the analysis result of step S242. In a case where it is determined that the shape of the subject is a plane, the signature control unit 153 advances the processing to step S248. That is, the signature control unit 153 performs control to generate a signature.

Each process of steps S248 and S249 is executed similarly to each process of steps S156 and S157 of FIG. 16. That is, the hash value of the information including at least the main image and the 3D information is calculated, and the signature is generated using the device secret key corresponding to the imaging device 111. That is, a signature of information including at least the main image and the 3D information is generated. When the process of step S249 ends, the process proceeds to step S250.

Furthermore, in a case where it is determined in step S247 that the shape of the subject is not a plane, the signature control unit 153 skips the process of steps S248 and S249 and advances the processing to step S250. That is, the signature control unit 153 performs control so as not to generate a signature.

That is, in a case where the 3D information processing unit 149 (plane determination unit) determines that the shape of the subject is not a plane, the signature generation unit 150 generates a signature. In other words, in a case where the 3D information processing unit 149 determines that the shape of the subject is a plane, the signature generation unit 150 does not generate the signature (omits generation of the signature).

Each process of steps S250 to S252 is executed similarly to each process of steps S158 to S160 of FIG. 16. That is, an image file is generated, and the image file is recorded on a removable recording medium or the like by the recording unit 134 or uploaded to the server 112. When the process of step S252 ends, the imaging processing ends. Also in this case, either the process of step S251 or the process of step S252 may be omitted. Furthermore, if the RAW images and the 3D information acquired by the process of step S241 and the metadata generated by the process of step S246 are stored, the processing of the other steps (analysis of 3D information, processing on RAW image, generation of YW image, generation of reduced image, calculation of hash value, generation of signature, generation and provision of image file, and the like) may be executed as processing different from the imaging processing after the imaging processing ends.

By executing each process as described above, the imaging device 111 can omit generation of the signature in a case where the shape of the subject is a plane. That is, the imaging device 111 can prevent generation of a signature for an image in which the shape of the subject is a plane. Therefore, the imaging device 111 can determine that there is no authenticity of the image in the determination of authenticity of the image.

<2-2-5. Imaging Processing (AF-S Control)>

In the case of the single autofocus mode (AF-S), the 3D information sensor 148 may acquire 3D information at the focus fixing timing and the main exposure start timing. As described above, for example, when a predetermined operation such as shutter half-pressing is performed by the user or the like, the control unit 121 performs control for fixing the focus to the optical system 141. The focus fixing timing is timing at which the control unit 121 performs this control (timing at which the focus lock is applied). The main exposure start timing is a timing at which main exposure is started in the image sensor 142. An example of a flow of imaging processing in that case will be described with reference to a flowchart of FIG. 24.

When the imaging processing is started, in step S271, the 3D information sensor 148 determines whether or not the operation mode is the single autofocus mode (AF-S). In a case where it is determined that the mode is the single autofocus mode (AF-S), the process proceeds to step S272. In the case of the single autofocus mode, since there is a period in which the focal length is fixed before the main exposure start timing, the 3D information is acquired a plurality of times.

In step S272, the image sensor 142 generates a RAW image. Furthermore, the 3D information sensor 148 acquires 3D information from an optical image from a subject on the same optical axis as the RAW image at a plurality of timings. In this case, the 3D information sensor 148 acquires the 3D information at the focus fixing timing and the main exposure start timing. When the process of step S272 ends, the process proceeds to step S274.

Furthermore, in a case where it is determined in step S271 that the mode is not the single autofocus mode (AF-S), for example, in a case where it is determined that the mode is the continuous autofocus mode (AF-C) or the manual mode, the process proceeds to step S273. The continuous autofocus mode indicates a mode in which processing of focusing on a subject is continuously performed while a predetermined operation (for example, half-pressing of a shutter button or the like) is performed by a user or the like. The manual mode indicates a mode in which the user manually adjusts the focal length. In the case of these modes, since there is no period in which the focal length is fixed until the main exposure start timing, the 3D information is acquired only at the main exposure start timing.

In step S273, the image sensor 142 generates a RAW image. Furthermore, the 3D information sensor 148 acquires 3D information from an optical image from a subject on the same optical axis as the RAW image. In this case, the 3D information sensor 148 acquires the 3D information at the main exposure start timing. When the process of step S273 ends, the process proceeds to step S274.

Each process of steps S274 to S282 is executed similarly to each process of steps S152 to S160 of FIG. 16. When the process of step S282 ends, the imaging processing ends. Also in this case, either the process of step S281 or the process of step S282 may be omitted. Furthermore, if the RAW images and the 3D information acquired by the process of steps S271 to S273 and the metadata generated by the process of step S277 are stored, the processing of the other steps (processing on RAW image, generation of YUV image, generation of reduced image, calculation of hash value, generation of signature, generation and provision of image file, and the like) may be executed as processing different from the imaging processing after the imaging processing ends.

By executing each process in this manner, the imaging device 111 can acquire 3D information on the same optical axis as that of the RAW image at the focus fixing timing and the main exposure start timing in the case of the single autofocus mode (AF-S). Therefore, for example, after the 3D information is acquired at the focus fixing timing, it is difficult to perform the trick shooting in which the subject is switched and imaging is performed (while the focal length is fixed). That is, it becomes difficult to generate a false image having different subjects between the 3D information and the image. That is, the server 112 can more accurately confirm the authenticity of the image.

<2-2-6. Imaging Processing (Reliability Recording)>

Figure 25:
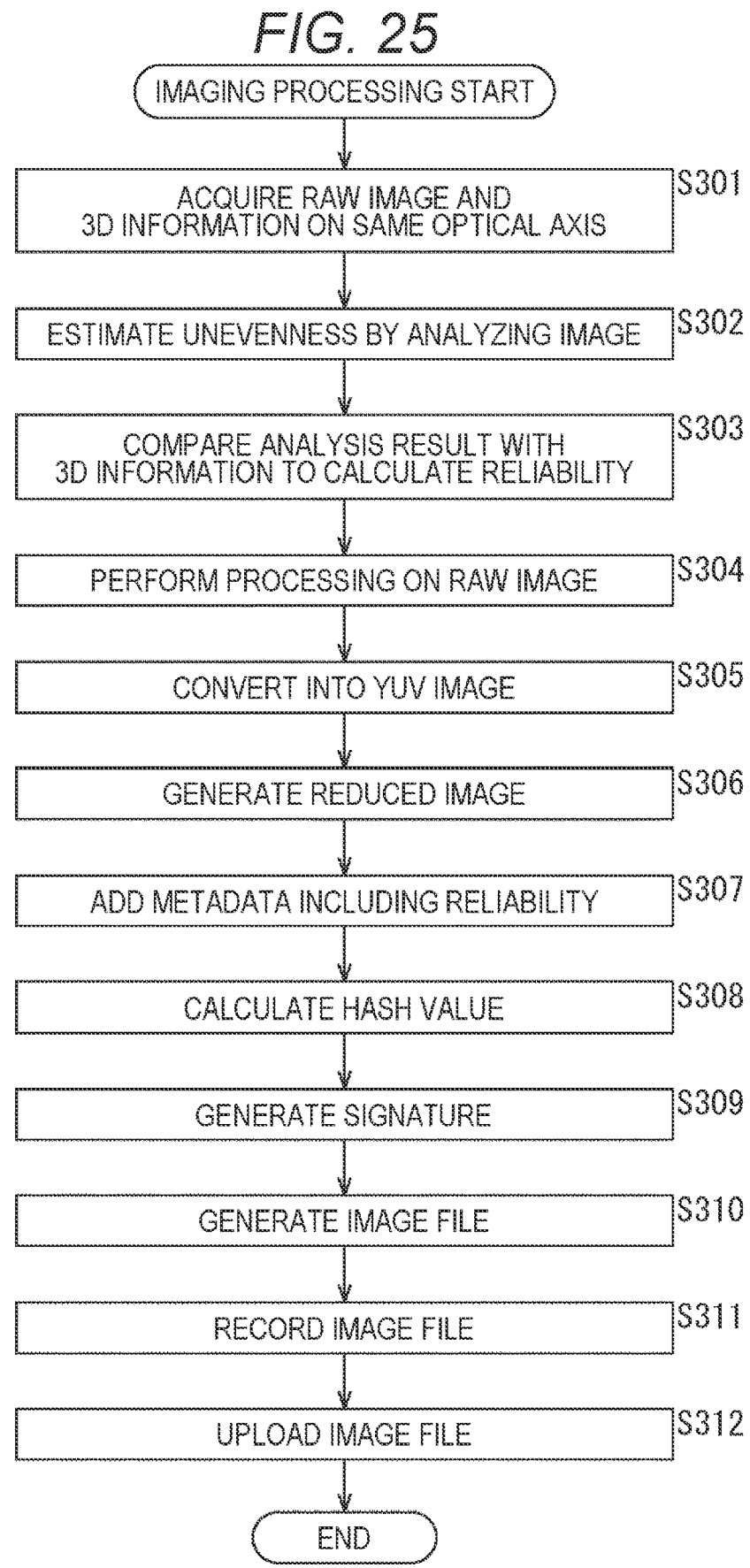
FIG. 25 is a flowchart illustrating an example of a flow of imaging processing.

The reliability of the 3D information may be calculated, and metadata including reliability information indicating the reliability may be stored in the image file. An example of a flow of imaging processing in that case will be described with reference to a flowchart of FIG. 25.

Figure 23:
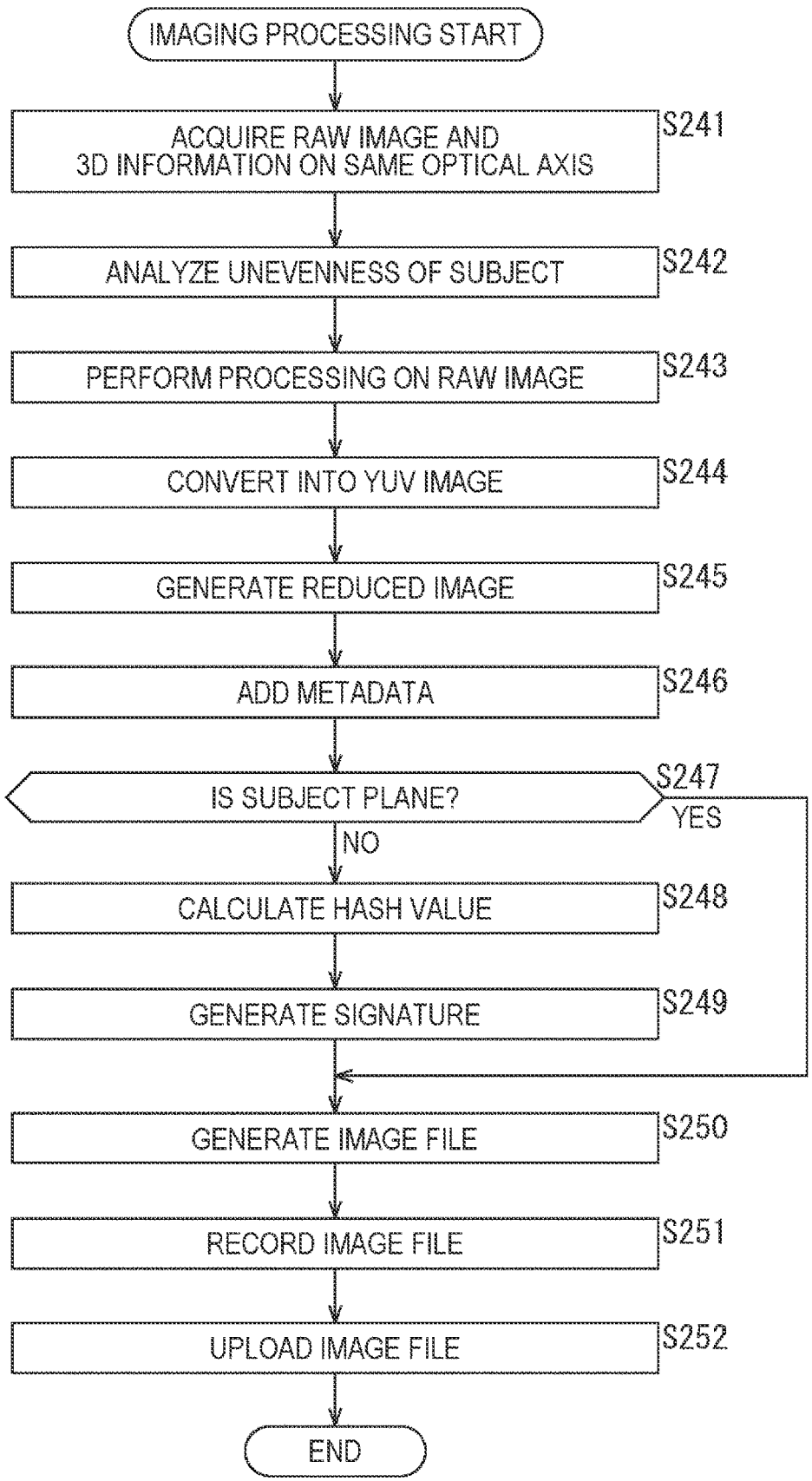
FIG. 23 is a flowchart illustrating an example of a flow of imaging processing.

When the imaging processing is started, the process of step S301 is performed similarly to the process of step S241 of FIG. 23. That is, the main image and the 3D information are obtained on the same optical axis.

In step S302, the reliability calculation unit 154 analyzes the image obtained by the image sensor 142 in step S301, and estimates the state of the unevenness of the subject. For example, the reliability calculation unit 154 may obtain a feature of the image and estimate the state of the unevenness of the image on the basis of the feature. For example, the reliability calculation unit 154 may detect the face, the eyes, the nose, the ears, and the like included in the image and estimate the state of the unevenness of each detected portion.

In step S303, the reliability calculation unit 154 compares the analysis result (that is, the state of the unevenness in the estimated image) in step S302 with the state of the unevenness indicated by the 3D information, and calculates the reliability of the 3D information on the basis of the comparison result. For example, in a case where the subject (person) faces the front with respect to the imaging device 111, in general, a nose portion which is a convex portion of the face is closer to the imaging device 111 than other portions (for example, eyes, ears, and the like) of the face (the distance to the imaging device 111 is shorter). As described above, since there is a correlation between the state of the unevenness of the subject and the 3D information, the reliability calculation unit 154 uses such a correlation to evaluate the analysis result of the image using the 3D information and calculate the reliability.

Each process of steps S304 to S306 is executed similarly to each process of steps S243 to S245 of FIG. 23. That is, a YUV image, a reduced image, and the like are generated.

In step S307, the metadata addition unit 146 generates metadata including the reliability calculated in step S303 and adds the metadata to the image. That is, the metadata addition unit 146 generates metadata other than the reliability, and includes the information indicating the reliability calculated in step S303 in the metadata.

Each process of steps S308 to S312 is executed similarly to each process of steps S248 to S252 of FIG. 23. That is, the hash value is calculated, and the signature is generated. Then, in step S310, the image file generation unit 151 compresses and encodes the YUV image (main image) to generate a JPEG image (main image). In addition, the image file generation unit 151 generates an image file storing the main image, the 3D information, the reduced image, the metadata including the information indicating the reliability calculated in step S303, and the signature. Then, the image file is recorded or uploaded. When the process of step S312 ends, the imaging processing ends. Also in this case, either the process of step S311 or the process of step S312 may be omitted. Furthermore, if the RAW image and the 3D information acquired by the process of step S301 and the metadata generated by the process of step S307 (metadata other than the reliability) are stored, the processing of other steps (analysis of image, calculation of reliability, processing on RAW image, generation of YUV image, generation of reduced image, calculation of hash value, generation of signature, generation and provision of image file, and the like) may be executed as processing different from the imaging processing after the imaging processing is completed.

By executing each process in this manner, the imaging device 111 can calculate the reliability of the 3D information and store information indicating the reliability in the image file. Therefore, the server 112 can analyze the image on the basis of the reliability. Therefore, the server 112 can more accurately determine the authenticity of the image.

<2-2-7. Imaging Processing (Shutter Speed Control)>

Figure 26:
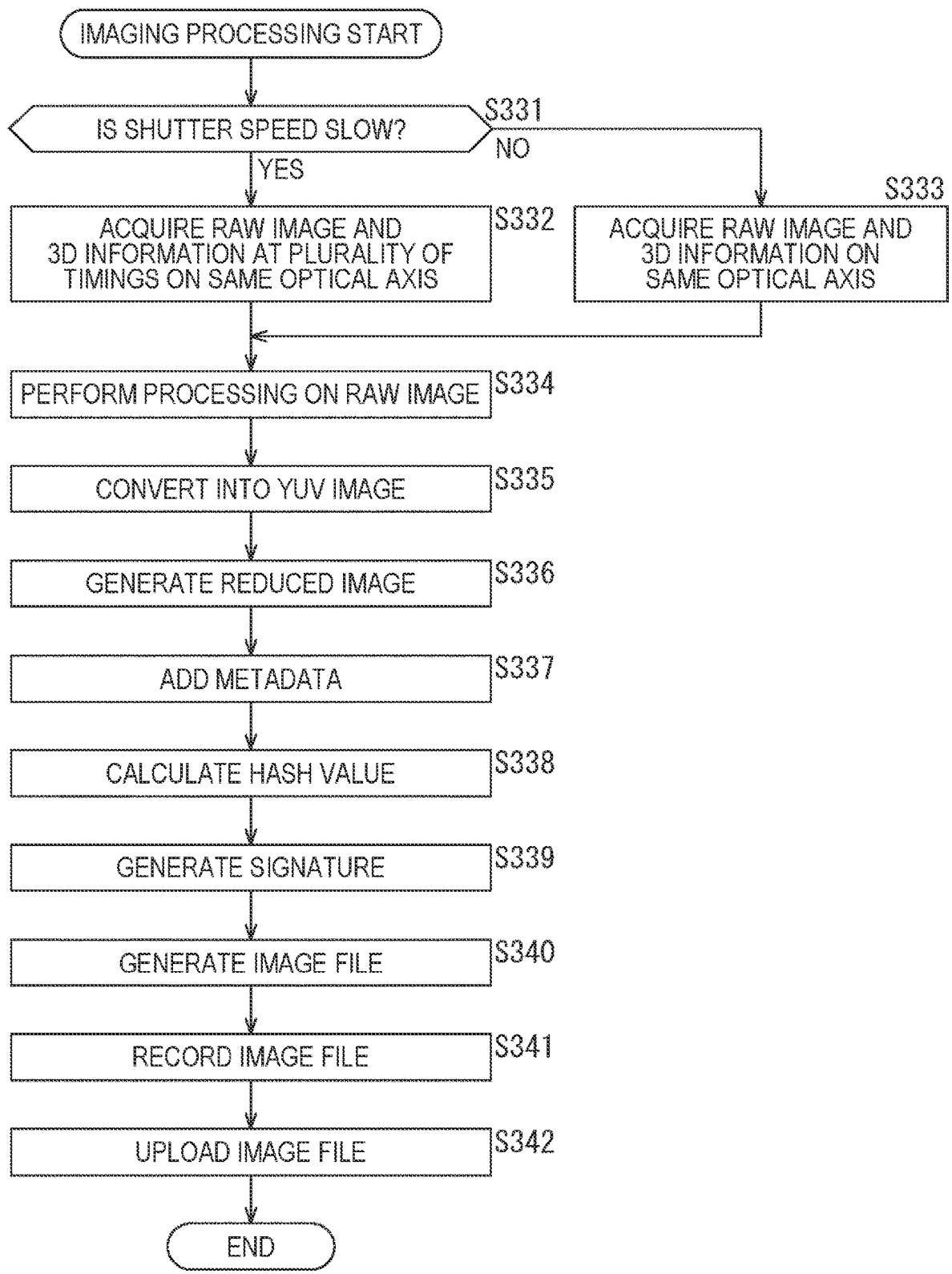
FIG. 26 is a flowchart illustrating an example of a flow of imaging processing.

In a case where the shutter speed of imaging is slower than a predetermined standard, the 3D information sensor 148 may store the 3D information a plurality of times during the main exposure of the image sensor 142. An example of a flow of imaging processing in that case will be described with reference to a flowchart of FIG. 26.

When the imaging processing is started, in step S331, the 3D information sensor 148 determines whether or not the shutter speed of the image sensor 142 is slower than a predetermined standard. In a case where it is determined that the shutter speed is slower than the predetermined standard, the process proceeds to step S332.

In step S332, the image sensor 142 generates a RAW image. Furthermore, the 3D information sensor 148 acquires 3D information from an optical image from a subject on the same optical axis as the RAW image at a plurality of timings. In this case, the 3D information sensor 148 acquires the 3D information a plurality of times during the main exposure of the image sensor 142. When the process of step S332 ends, the process proceeds to step S334.

In addition, in a case where it is determined in step S331 that the shutter speed is faster than the predetermined standard, the process proceeds to step S333. In step S333, the image sensor 142 generates a RAW image. Furthermore, the 3D information sensor 148 acquires 3D information from an optical image from a subject on the same optical axis as the RAW image. In this case, the 3D information sensor 148 acquires the 3D information at the main exposure start timing. When the process of step S333 ends, the process proceeds to step S334.

Figure 24:
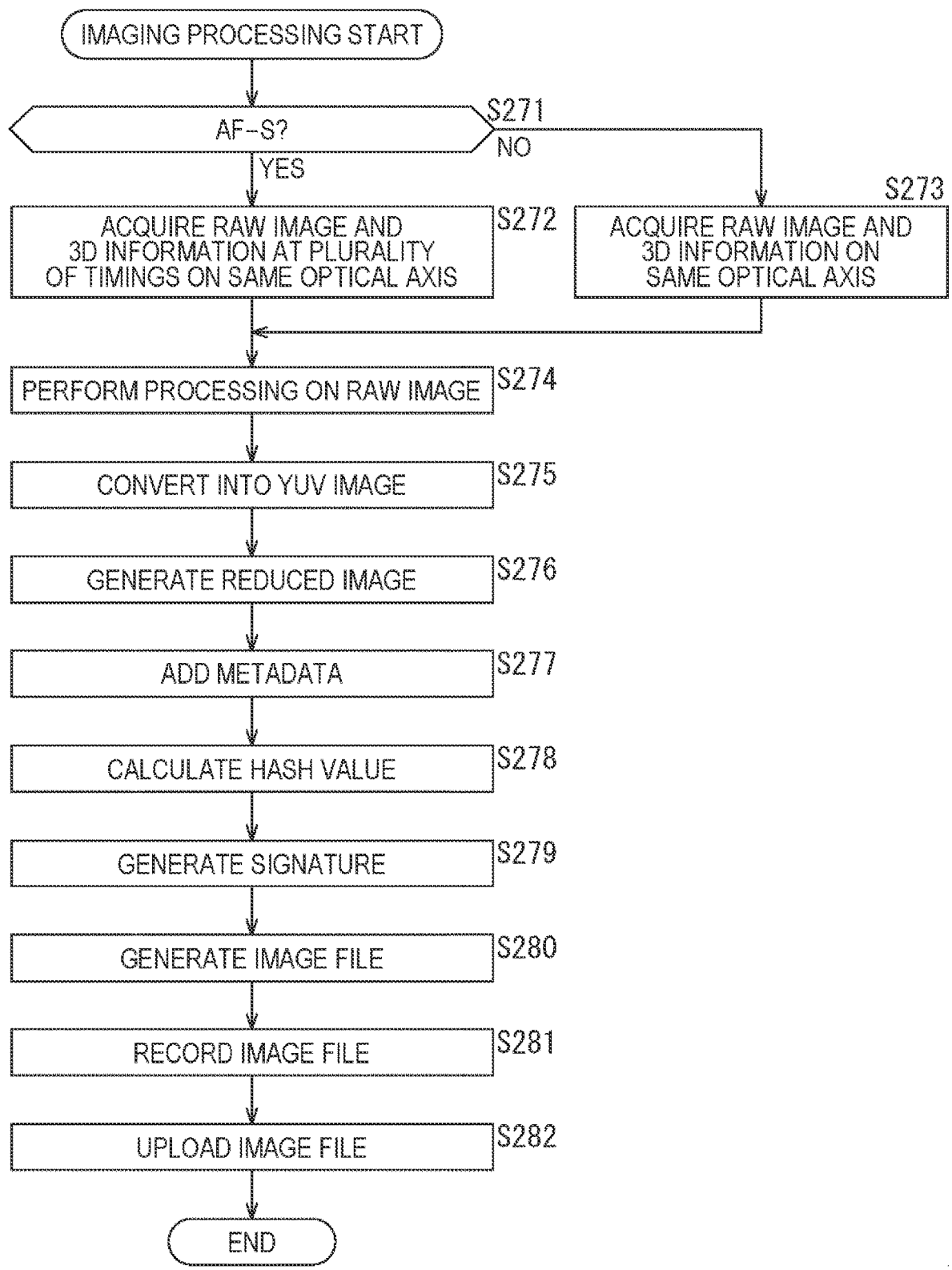
FIG. 24 is a flowchart illustrating an example of a flow of imaging processing.

Each process of steps S334 to S342 is executed similarly to each process of steps S274 to S282 of FIG. 24. When the process of step S342 ends, the imaging processing ends. Also in this case, either the process of step S341 or the process of step S342 may be omitted. Furthermore, if the RAW images and the 3D information acquired by the process of steps S331 to S333 and the metadata generated by the process of step S337 are stored, the processing of the other steps (processing on RAW image, generation of YUV image, generation of reduced image, calculation of hash value, generation of signature, generation and provision of image file, and the like) may be executed as processing different from the imaging processing after the imaging processing ends.

By executing each process in this manner, in a case where the shutter speed is slower than a predetermined standard, the imaging device 111 can detect the distance-related information a plurality of times on the same optical axis as that of the RAW image during the exposure of imaging, and generate the 3D information a plurality of times.

Therefore, for example, it is difficult to execute trick shooting such as switching the subject during the exposure period. That is, it becomes difficult to generate a false image having different subjects between the 3D information and the image. That is, even in a case where the shutter speed is slow, the server 112 can more accurately confirm the authenticity of the image.

<2-3. Processing of Server>

<2-3-1. Confirmation Processing>

Next, each process executed by the server 112 and the like will be described. The server 112 confirms the authenticity of the image stored in the image file uploaded by the imaging device 111. An example of a flow of the confirmation processing will be described with reference to a flowchart of FIG. 27.

When the confirmation processing is started, the communication unit 221 of the server 112 receives (acquires) the image file transmitted from the imaging device 111 in step S401.

In this image file, a device unique ID corresponding to the transmission source imaging device 111 is stored as metadata. In step S402, the signature confirmation unit 232 acquires the device public key corresponding to the device unique ID from the device public key database 223. For example, the signature confirmation unit 232 supplies the device unique ID to the device public key management unit 231. The device public key management unit 231 accesses the device public key database 223, acquires the device public key associated with the device unique ID, and supplies the device public key to the signature confirmation unit 232.

Then, the signature confirmation unit 232 confirms the validity of the signature stored in the image file using the device public key. That is, the signature confirmation unit 232 confirms that the main image and the 3D information stored in the image file have been generated using the device secret key corresponding to the imaging device 111 that has generated the image and the 3D information.

For example, the signature confirmation unit 232 decrypts the signature stored in the image file using the device public key to obtain the first hash value. In addition, the signature confirmation unit 232 calculates the second hash value using the main image, the 3D information, the reduced image, and the metadata stored in the image file. Then, the signature confirmation unit 232 compares the first hash value with the second hash value, and confirms whether or not the first hash value and the second hash value match each other.

That is, in a case where the first hash value and the second hash value match each other, the signature confirmation unit 232 determines that the signature is valid and the main image and the 3D information stored in the image file have not been falsified. In other words, in a case where the first hash value and the second hash value do not match, the signature confirmation unit 232 determines that the signature is invalid, and the main image and the 3D information stored in the image file have been falsified.

In step S403, the signature confirmation unit 232 determines whether or not the validity of the signature has been confirmed. In a case where it is determined that the signature is confirmed to be valid by the process of step S402, the process proceeds to step S404.

In step S404, the image confirmation processing unit 233 executes the image confirmation processing, and confirms the authenticity of the main image stored in the image file by using the 3D information stored in the image file. That is, the image confirmation processing unit 233 compares the image with the 3D information acquired on the same optical axis as the image to confirm the authenticity of the image. When the image confirmation processing in step S404 ends, the confirmation processing ends.

Note that, in a case where it is determined in step S403 that the validity of the signature has not been confirmed by the processing in step S402 (that is, it has been confirmed that the signature is invalid), the process proceeds to step S405. In step S405, the image confirmation processing unit 233 performs error processing. When the process of step S405 ends, the confirmation processing ends. That is, in this case, the image confirmation processing in step S404 is not executed (the image confirmation processing is omitted (skipped)). In this case, the image file is processed as having no authenticity of the main image.

In this manner, since it is confirmed that the main image and the 3D information have not been falsified using the signature, the server 112 can more accurately confirm the authenticity of the main image using the 3D information. Note that, in a case where it is determined in step S403 that the signature is invalid, the image confirmation processing in step S404 may be executed, and it may be determined that there is no authenticity of the image in the image confirmation processing.

<2-3-1-1. Image Confirmation Processing (Automatic Verification)>

Figure 27:
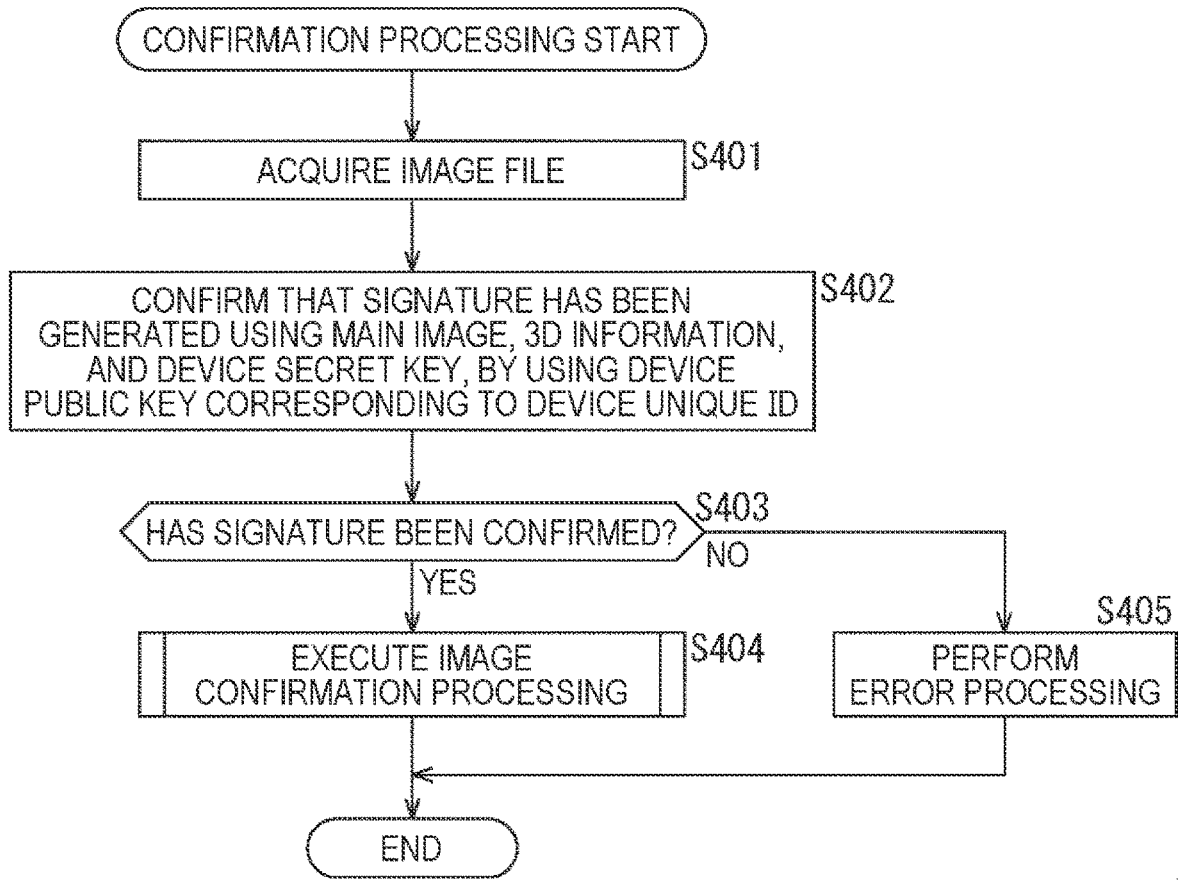
FIG. 27 is a flowchart illustrating an example of a flow of confirmation processing.

Next, in the image confirmation processing executed in step S404 of FIG. 27, any processing may be performed. For example, the server 112 may confirm the authenticity of the image. For example, the image verification unit 241 of the image confirmation processing unit 233 may confirm the authenticity of the image by comparing the unevenness of the subject of the image detected from the image with the unevenness of the subject based on the 3D information. That is, the image verification unit 241 may determine that there is authenticity of the image in a case where the unevenness of the subject of the image matches the unevenness of the subject based on the 3D information, and may determine that there is no authenticity of the image in a case where they do not match. Furthermore, the server 112 may present the confirmation result to the reviewer. For example, the support processing unit 242 of the image confirmation processing unit 233 may present the confirmation result of the authenticity of the image to the reviewer. An example of a flow of the image confirmation processing in that case will be described with reference to a flowchart of FIG. 28.

In this case, when the image confirmation processing is started, in step S421, the image verification unit 241 of the image confirmation processing unit 233 analyzes the main image to obtain features thereof, and estimates the unevenness of the subject on the basis of the features. For example, the image verification unit 241 detects the face, eyes, nose, ears, and the like of the person included in the main image, and estimates the state of the unevenness of each detected portion.

In step S422, the image verification unit 241 compares the state (analysis result) of the unevenness of the subject of the main image estimated in step S421 with the state of the unevenness of the subject indicated by the 3D information. Then, the image verification unit 241 determines the authenticity of the main image (whether or not the main image is a false image) on the basis of the comparison result.

In step S423, the support processing unit 242 supplies information indicating the comparison result (determination result as to whether or not the main image is a false image) to the terminal device 113 via the communication unit 221, and causes the information to be displayed. The user of the terminal device 113 is a reviewer who confirms the authenticity of the main image. That is, the support processing unit 242 presents a comparison result (a determination result as to whether or not the main image is a false image) to the reviewer.

When the process of step S423 ends, the image confirmation processing ends, and the process returns to FIG. 27.

Figure 29:
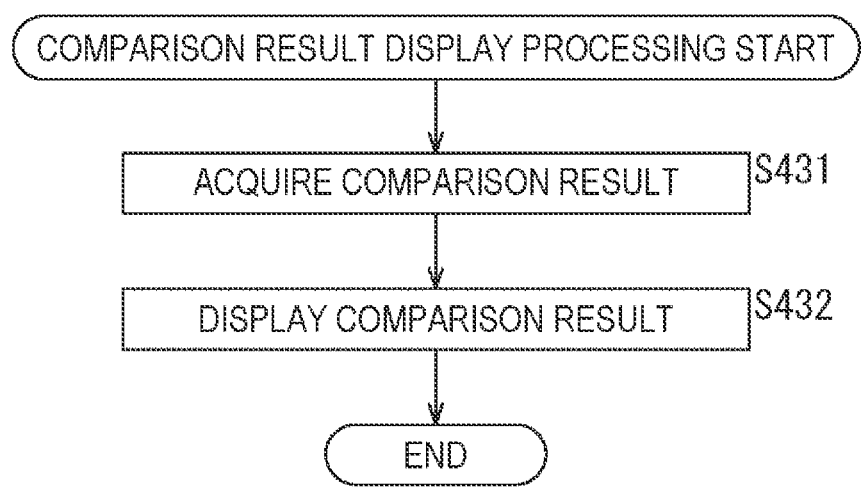
FIG. 29 is a flowchart illustrating an example of a flow of comparison result display processing.

An example of a flow of comparison result display processing executed in the terminal device 113 corresponding to such image confirmation processing of the server 112 will be described with reference to a flowchart of FIG. 29.

When the comparison result display processing is started, in step S431, the CPU 301 of the terminal device 113 acquires information indicating the comparison result (the determination result as to whether or not the main image is a false image) transmitted from the server 112 via the communication unit 314.

Figure 30:
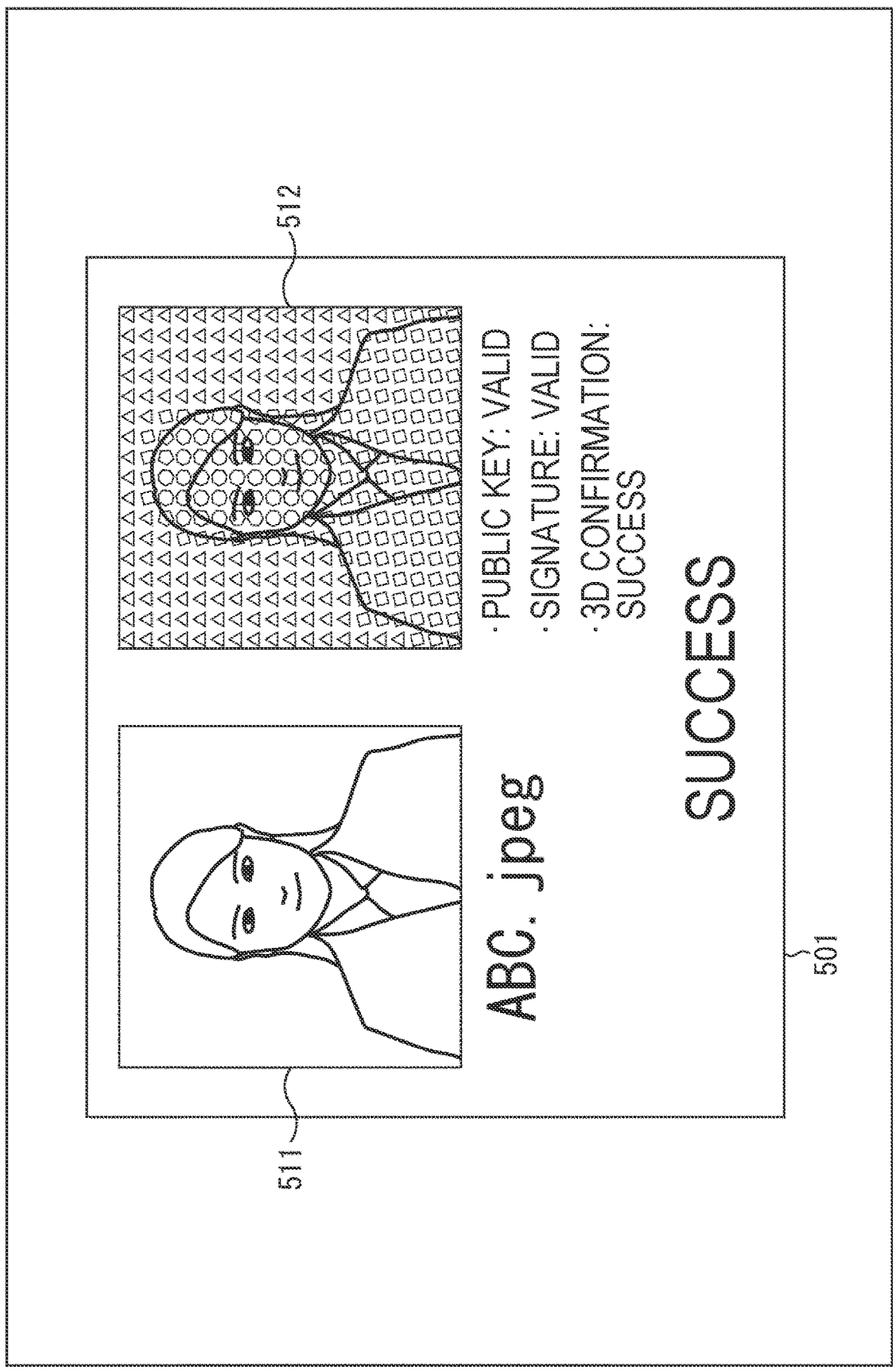
FIG. 30 is a diagram for explaining an example of a display image.

In step S432, the CPU 301 supplies information indicating the comparison result to the output unit 312 to display. The output unit 312 displays, for example, an image 501 indicating a comparison result (a determination result as to whether or not the main image is a false image) as illustrated in FIG. 30 on the display device. The content of the image 501 is arbitrary. In the case of the example of FIG. 30, the image 501 includes a main image 511. In addition, the image 501 includes a superimposed image 512 of the main image and the 3D information. In addition, the image 501 includes the file name of the main image 511. Furthermore, the image 501 includes information such as whether or not the device public key is valid, whether or not the signature is valid, a confirmation result (success or failure) of authenticity of the main image, and the like. The reviewer (the user of the terminal device 113) can grasp the comparison result (the confirmation result of the authenticity of the main image) by browsing the image 501.

When the process of step S432 ends, the comparison result display processing ends.

By executing each process as described above, the server 112 can confirm the authenticity of the main image using the 3D information detected on the same optical axis as the main image. Therefore, the server 112 can more accurately determine the authenticity of the image.

Note that, in the above description, in step S421 of the image confirmation processing, the image verification unit 241 has been described to analyze the main image, obtain the features thereof, and estimate the unevenness on the basis of the features, but a screen nail (reduced image) may be applied instead of the main image. That is, the image verification unit 241 may analyze the screen nail (reduced image) to obtain the features, and estimate the unevenness on the basis of the features.

<2-3-1-2. Image Confirmation Processing (Comparison and Display)>

Figure 31:
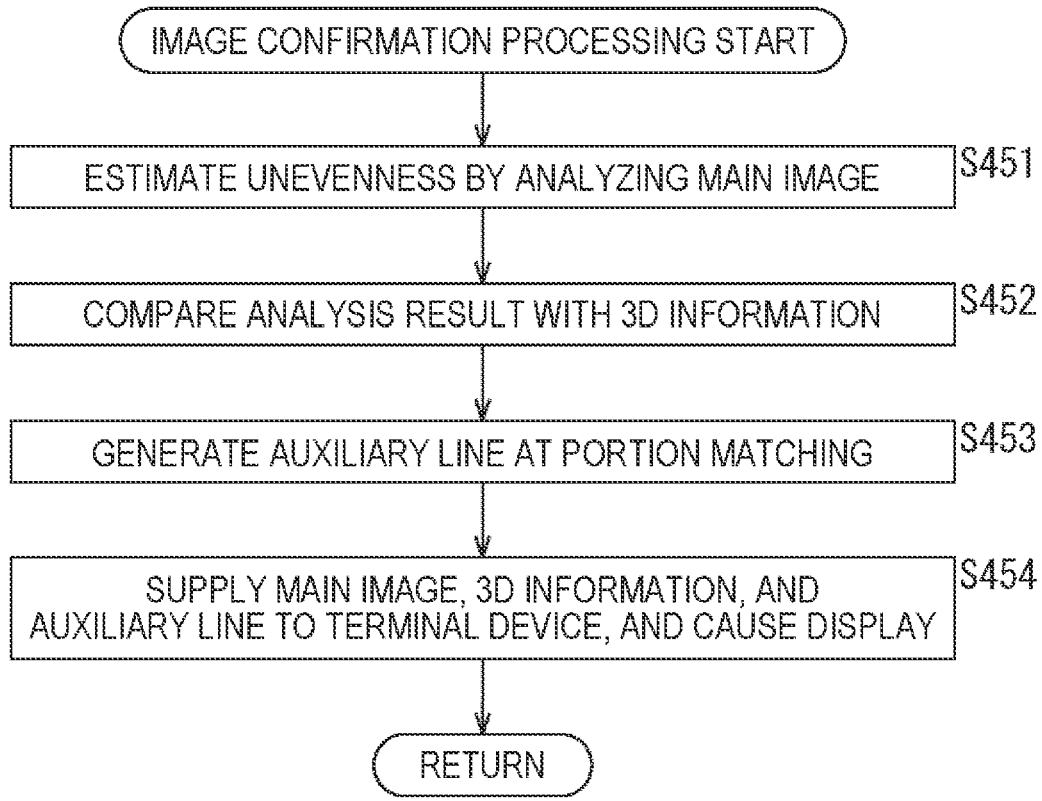
FIG. 31 is a flowchart illustrating an example of a flow of image confirmation processing.

Furthermore, in step S404 of FIG. 27, the server 112 may present a comparison result between the unevenness of the subject of the image and the unevenness of the subject based on the 3D information to the reviewer as information for allowing the reviewer to confirm whether or not the main image is a false image. An example of a flow of the image confirmation processing in that case will be described with reference to a flowchart of FIG. 31.

Figure 28:
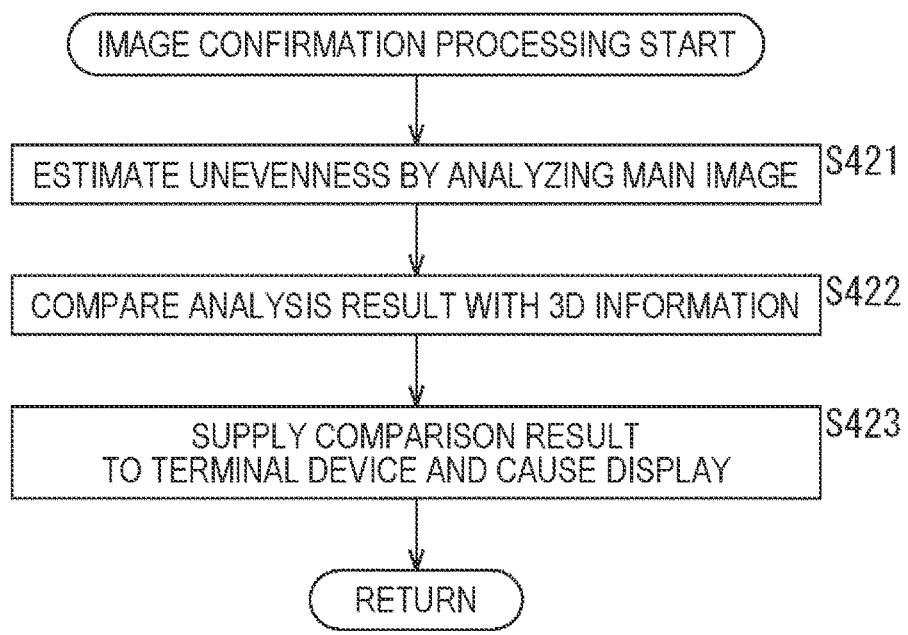
FIG. 28 is a flowchart illustrating an example of a flow of image confirmation processing.

In this case, when the image confirmation processing is started, each process of steps S451 and S452 is executed similarly to each process of steps S421 and S422 of FIG. 28. That is, the unevenness of the subject of the main image is estimated, and the estimated state (analysis result) of the unevenness of the subject of the main image is compared with the state of the unevenness of the subject indicated by the 3D information. However, in this case, the authenticity of the main image (whether or not the main image is a false image) is not determined.

In step S453, the image verification unit 241 generates an auxiliary line indicating that the state of the unevenness matches at a portion where the state of the unevenness matches in the comparison in step S452.

In step S454, the support processing unit 242 supplies information indicating the comparison result to the terminal device 113 via the communication unit 221, and causes the information to be displayed. For example, the support processing unit 242 supplies the main image, the 3D information, and the information such as the auxiliary line generated in step S453 to the terminal device 113, and causes the main image, the 3D information, and the information to be displayed as reference information for confirming the authenticity of the image.

When the process of step S454 ends, the image confirmation processing ends, and the process returns to FIG. 27.

Figure 32:
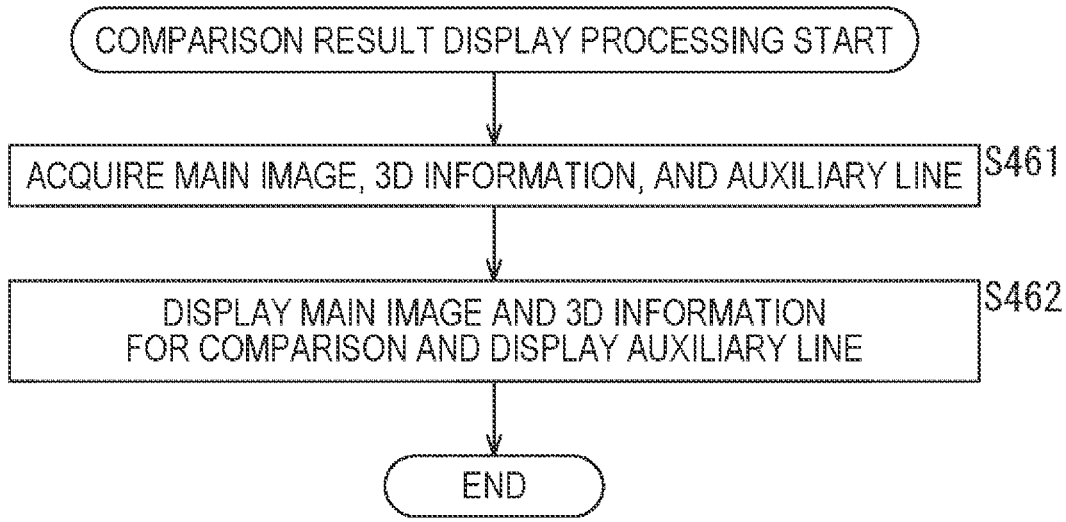
FIG. 32 is a flowchart illustrating an example of a flow of comparison result display processing.

An example of a flow of comparison result display processing executed in the terminal device 113 corresponding to such image confirmation processing of the server 112 will be described with reference to a flowchart of FIG. 32.

When the comparison result display processing is started, in step S461, the CPU 301 of the terminal device 113 acquires information (for example, the main image, the 3D information, and the auxiliary line) indicating the comparison result transmitted from the server 112 via the communication unit 314.

In step S462, the CPU 301 supplies information regarding the comparison result to the output unit 312. The output unit 312 displays the main image and the 3D information on the display device in such a state that the reviewer can compare the main image and the 3D information. The output unit 312 may also display an auxiliary line on the display device. For example, the output unit 312 displays a confirmation screen 521 as illustrated in FIG. 33 on the display device.

The confirmation screen 521 is a screen for allowing the reviewer to confirm authenticity of the main image. The contents of the confirmation screen 521 are arbitrary. For example, as illustrated in FIG. 33, an OK button 534 and an NG button 535 may be displayed on the confirmation screen 521. For example, when the user operates the input unit 311 and presses the OK button 534, the authenticity of the main image is affirmed. That is, the reviewer recognizes that the main image is not a false image. Furthermore, when the user operates the input unit 311 and presses the NG button 535, the authenticity of the main image is denied. That is, the reviewer recognizes that the main image is a false image.

Figure 33:
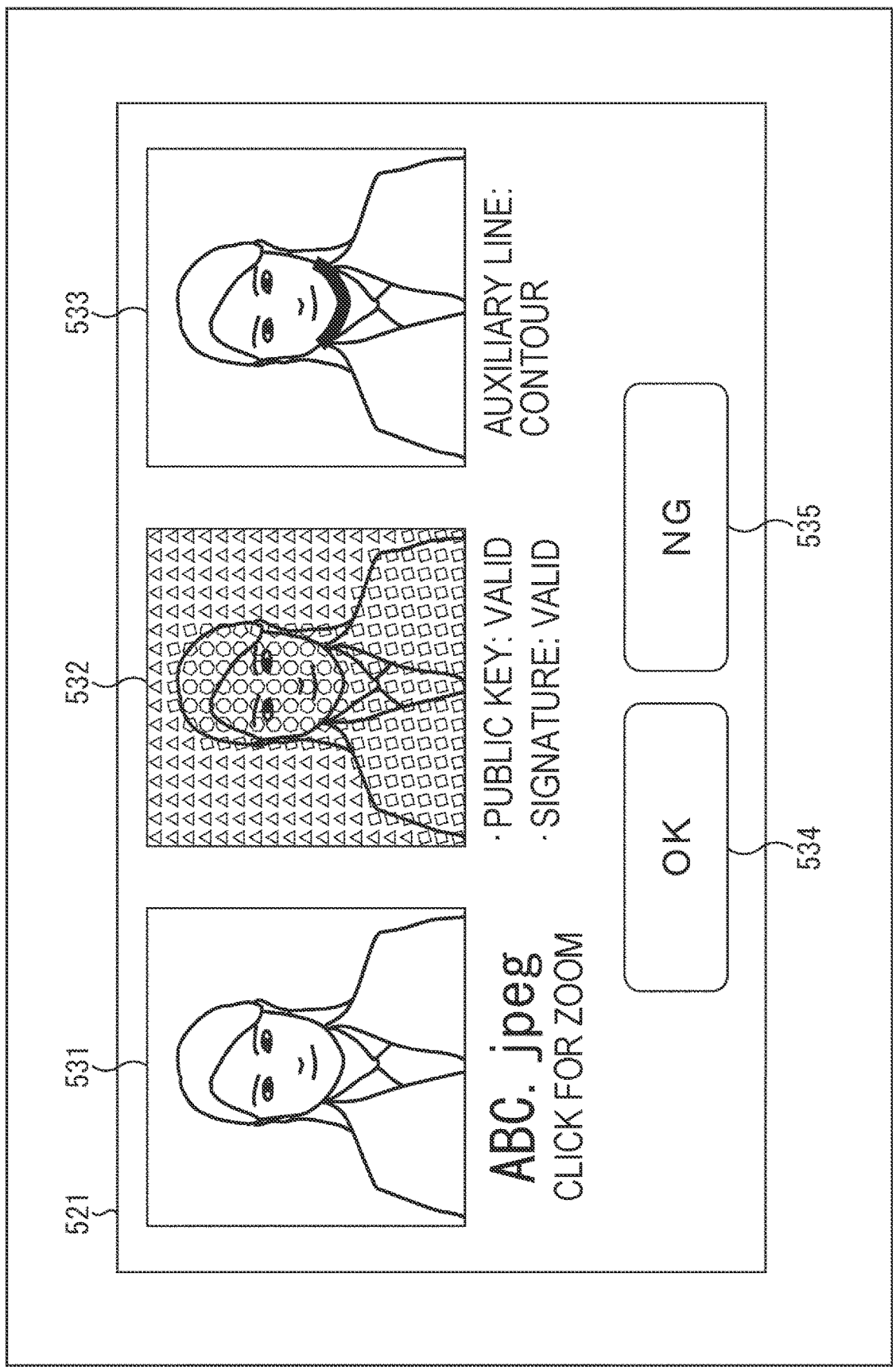
FIG. 33 is a diagram for explaining an example of a display image.

Furthermore, as illustrated in FIG. 33, on the confirmation screen 521, the main image 531 to be confirmed, the superimposed image 532 of the main image and the 3D information, the superimposed image 533 of the main image and the auxiliary line, and the like may be displayed as reference information for the reviewer to perform such confirmation. For example, the main image 531 allows the reviewer to visually grasp what kind of image the main image to be confirmed is. Furthermore, with the superimposed image 532, the reviewer can visually grasp how the state of the unevenness matches or does not match between the main image and the 3D information. Furthermore, with the auxiliary line of the superimposed image 533, the reviewer can visually grasp which portion matches.

Note that the layout of the confirmation screen 521 is arbitrary. For example, the main image and the 3D information may be displayed side by side, superimposed, or alternately. In addition, the UI (the OK button 534, the NG button 535, and the like) that urges to determine the presence or absence of authenticity may be omitted. The comparison result may be simply displayed. Further, the auxiliary line may not be a simple line, and may be displayed so that the distance therebetween can be gently recognized.

When the process of step S462 ends, the comparison result display processing ends.

By executing each process as described above, the server 112 compares the state of the unevenness between the main image and the 3D information detected on the same optical axis as that of the main image, and presents the comparison result to the reviewer, thereby allowing the reviewer to confirm the authenticity of the image. Therefore, the server 112 can more accurately determine the authenticity of the image.

<2-3-1-3. Image Confirmation Processing (Display)>

Figure 34:
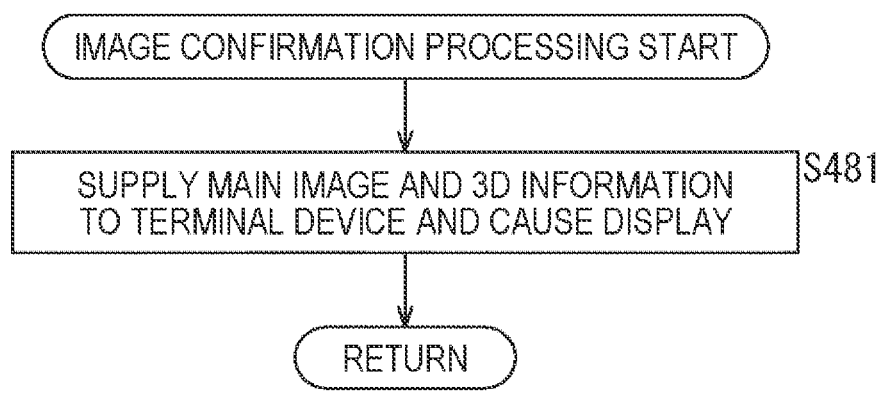
FIG. 34 is a flowchart illustrating an example of a flow of image confirmation processing.

Note that, in step S403 of FIG. 27, the server 112 may present the image and the 3D information to be compared to the reviewer without comparing the states of the unevenness of the main image and the 3D information. An example of a flow of the image confirmation processing in that case will be described with reference to a flowchart of FIG. 34.

In this case, when the image confirmation processing is started, in step S481, the support processing unit 242 of the server 112 supplies the main image and the 3D information to be compared to the terminal device 113 and causes the main image and the 3D information to be displayed. The support processing unit 242 presents these pieces of information to the reviewer as reference information for the user of the terminal device 113 as the reviewer to confirm the authenticity of the image.

When the process of step S481 ends, the image confirmation processing ends, and the process returns to FIG. 27.

Figure 35:
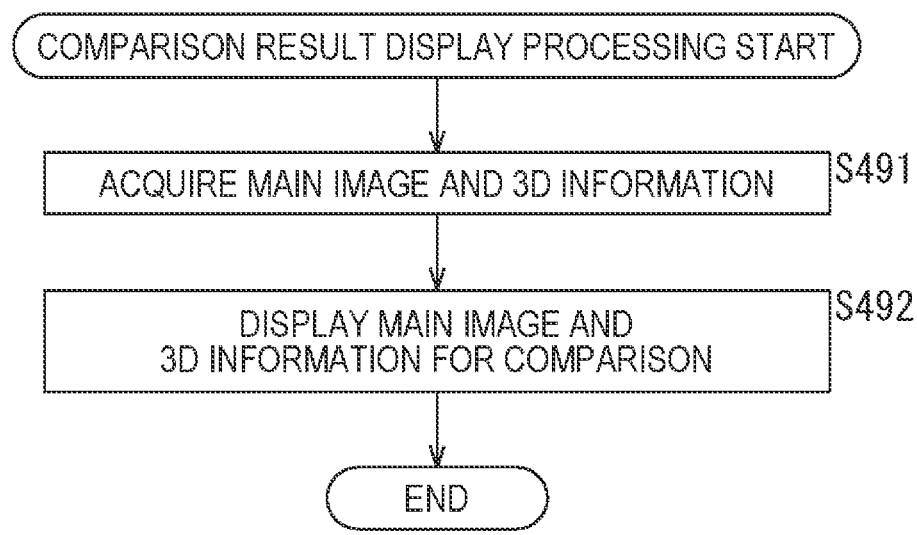
FIG. 35 is a flowchart illustrating an example of a flow of comparison result display processing.

An example of a flow of comparison result display processing executed in the terminal device 113 corresponding to such image confirmation processing of the server 112 will be described with reference to a flowchart of FIG. 35.

When the comparison result display processing is started, in step S491, the CPU 301 of the terminal device 113 acquires the main image and the 3D information transmitted from the server 112 via the communication unit 314.

In step S492, the CPU 301 supplies the main image and the 3D information to the output unit 312. The output unit 312 displays the main image and the 3D information on the display device in such a state that the reviewer can compare the main image and the 3D information. For example, the output unit 312 displays a confirmation screen 521 as illustrated in FIG. 33 on the display device. However, in this case, the display of the superimposed image 533 is omitted.

The main image 531 on the confirmation screen 521 allows the reviewer to visually grasp what kind of image the main image to be confirmed is. Furthermore, with the superimposed image 532 on the confirmation screen 521, the reviewer can visually grasp how the state of the unevenness matches or does not match between the main image and the 3D information. The reviewer refers to these images to determine the authenticity of the main image, and operates the OK button 534 or the NG button 535. In this manner, the authenticity of the main image is confirmed by the reviewer.

When the process of step S492 ends, the comparison result display processing ends.

By executing each process as described above, the server 112 presents the main image and the 3D information detected on the same optical axis as that of the main image to the reviewer, thereby allowing the reviewer to confirm the authenticity of the image. Therefore, the server 112 can more accurately determine the authenticity of the image.

<2-3-2. Confirmation Processing (Metadata Update)>

Figure 36:
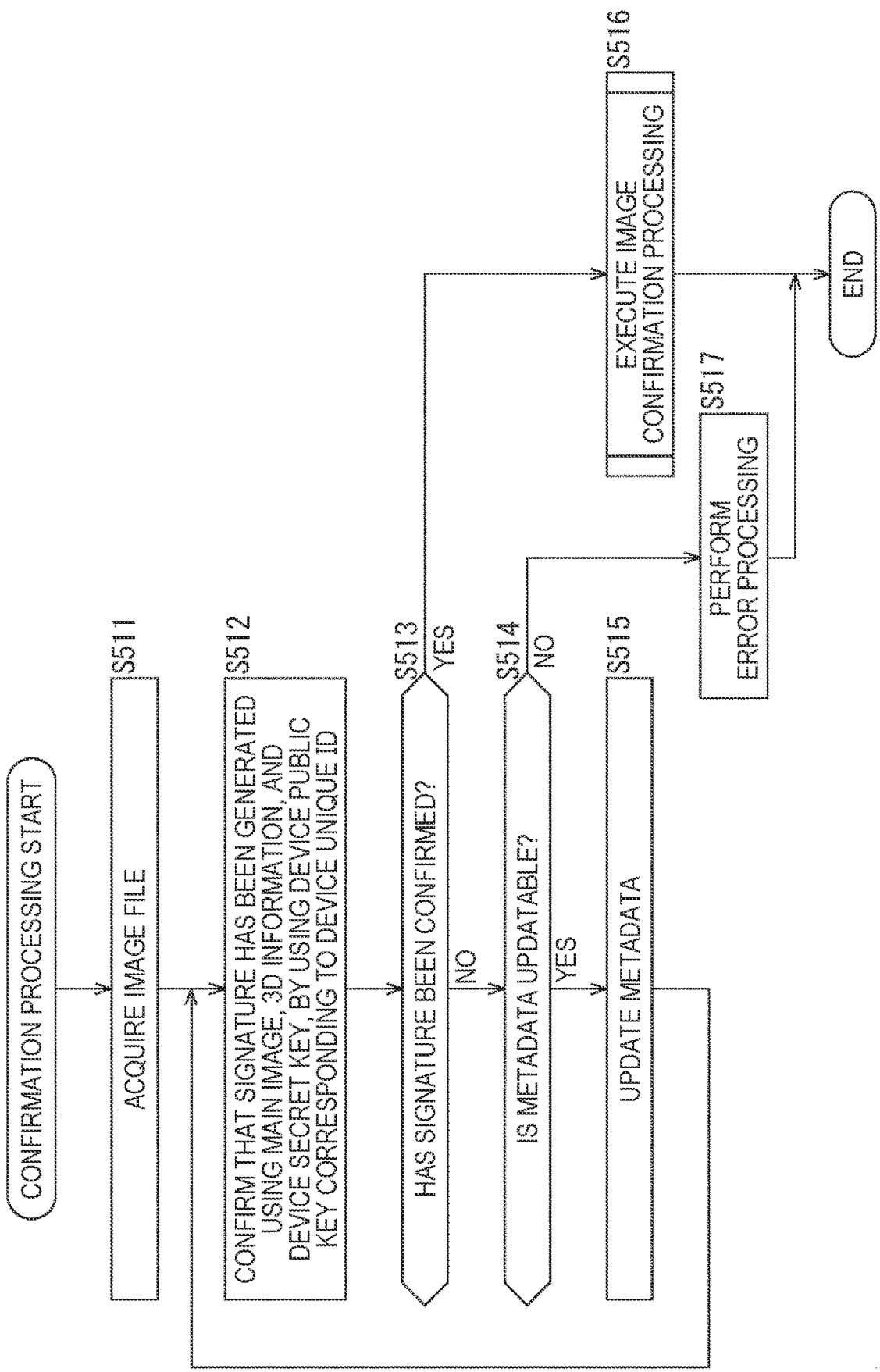
FIG. 36 is a flowchart illustrating an example of a flow of confirmation processing.

In a case where the authenticity of the image cannot be confirmed, metadata (rotation, rating, or the like) may be updated and confirmation may be performed again. An example of a flow of the confirmation processing in that case will be described with reference to a flowchart of FIG. 36.

When the confirmation processing is started, each process of steps S511 to S513 is executed similarly to each process of steps S401 to S403 of FIG. 27. That is, the image file is acquired, and confirmation of the signature and confirmation of the authenticity of the image are performed.

In step S514, the confirmation control unit 234 determines whether or not the main image and the 3D information match. In a case where it is determined that they do not match, the process proceeds to step S515.

In step S515, the confirmation control unit 234 updates the metadata (image rotation, rating, or the like), and returns the process to step S512. In other words, the confirmation control unit 234 updates the metadata and causes the signature confirmation and the image authenticity confirmation to be executed again.

Then, in a case where it is determined in step S514 that the main image and the 3D information match, the confirmation processing ends.

By executing each process as described above, the server 112 can more accurately determine the authenticity of the image even in a case where processing such as rotation is performed on the image.

<2-3-3. Confirmation Processing (Public Key Invalidation Determination)>

Figure 37:
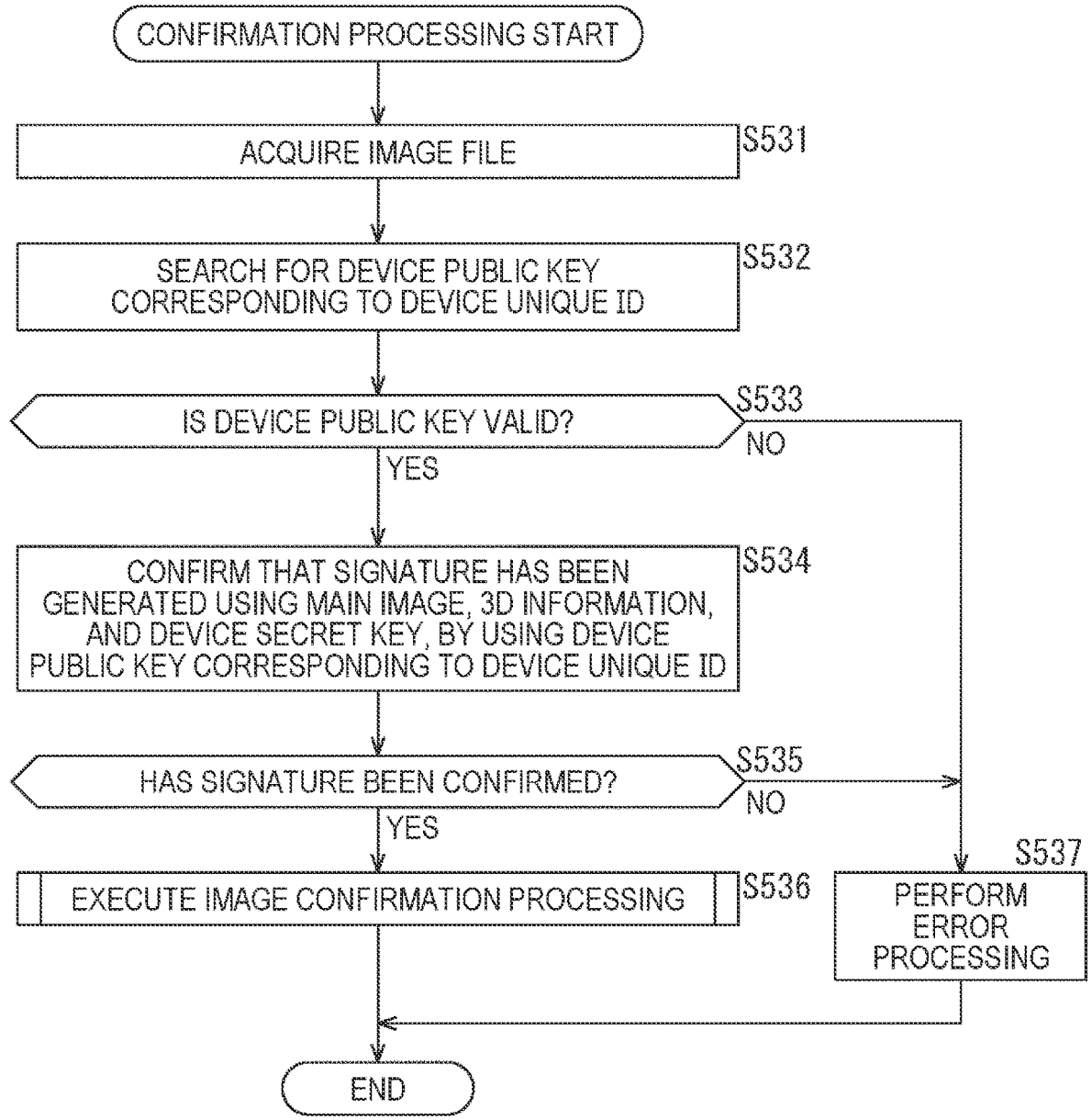
FIG. 37 is a flowchart illustrating an example of a flow of confirmation processing.

Furthermore, in the confirmation processing, determination as to whether or not the device public key is invalidated may be added. An example of a flow of the confirmation processing in that case will be described with reference to a flowchart of FIG. 37.

When the confirmation processing is started, the processing in step S531 is executed similarly to the processing in step S401 in FIG. 27. That is, an image file is acquired.

In step S532, the device public key management unit 231 searches for and acquires the device public key corresponding to the device unique ID included in the image file from the device public key database 223.

In step S533, the device public key management unit 231 determines whether or not the device public key is valid. In a case where the device public key is not invalidated in the device public key database 223, that is, in a case where the current time is before the invalidation date of the device public key, the process proceeds to step S534.

In this case, each process of steps S534 and S535 is executed similarly to each process of steps S402 and S403 in FIG. 27. That is, confirmation of the signature and confirmation of the authenticity of the image are performed. When the process of step S535 ends, the confirmation processing ends.

Furthermore, in a case where it is determined in step S533 that the device public key is invalid, that is, in a case where the current time is on or after the invalidation date of the device public key, the process proceeds to step S536. In step S536, the image confirmation processing unit 233 performs error processing. Then, when the process of step S536 ends, the confirmation processing ends. That is, in this case, the signature confirmation and the image authenticity confirmation processing are omitted (skipped).

By executing each process in this manner, it is possible to prevent the signature from being confirmed using the invalid device public key. Therefore, the server 112 can more accurately determine the authenticity of the image.

<2-3-4. Confirmation Processing (Same Optical Axis Determination)>

Note that, in the above description, it has been described that the upload of the image file to the server 112 is always performed from the imaging device 111. That is, in this case, the 3D information included in the image file is always obtained on the same optical axis as the main image.

Figure 38:
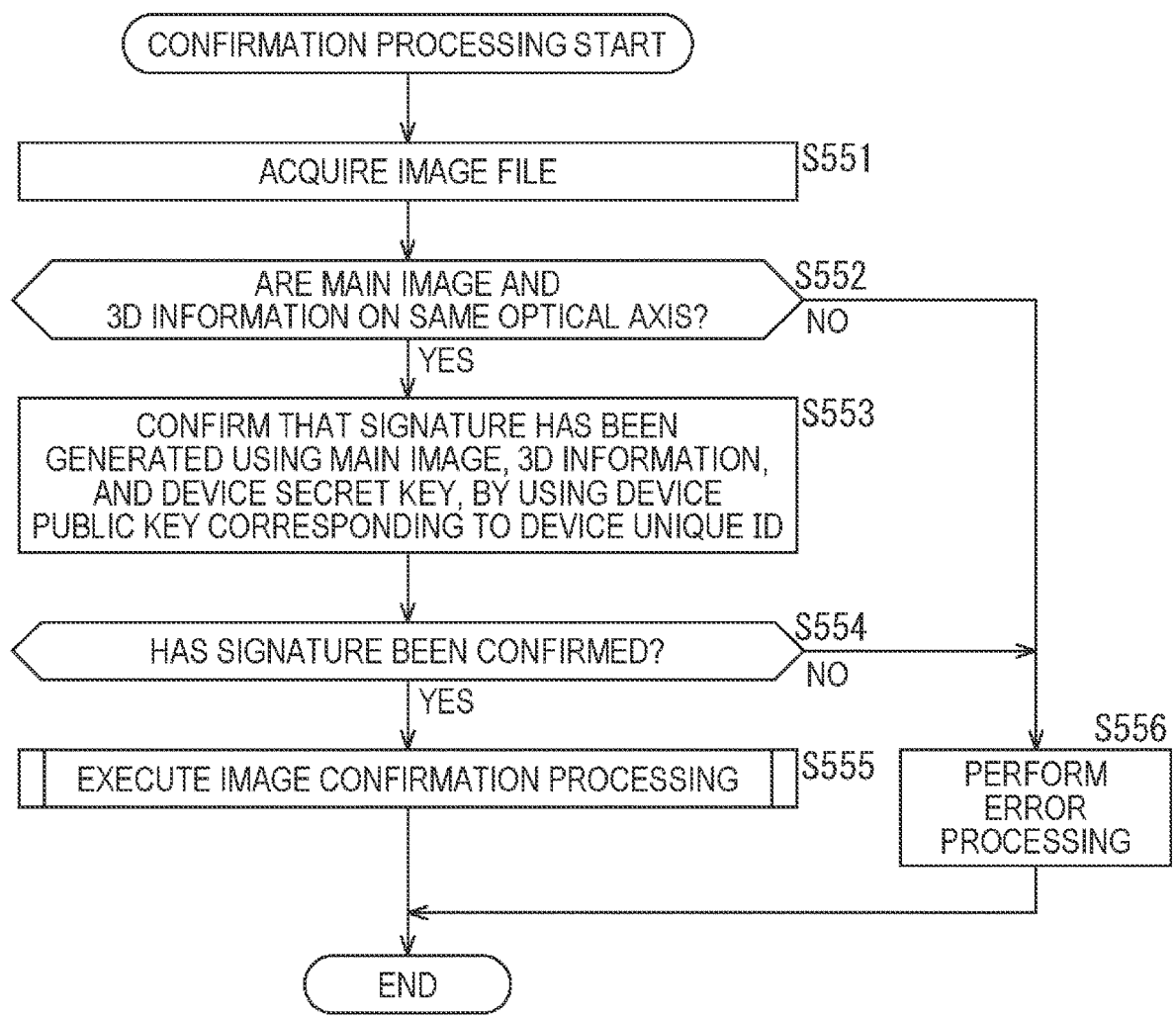
FIG. 38 is a flowchart illustrating an example of a flow of confirmation processing.

The image file may be uploaded to the server 112 from a device other than the imaging device 111. That is, the 3D information included in the image file may not be limited to the 3D information detected on the same optical axis as the main image. Then, signature confirmation or image authenticity confirmation may be performed only in a case where the 3D information is detected on the same optical axis as the main image. An example of a flow of the confirmation processing in that case will be described with reference to a flowchart of FIG. 38.

When the confirmation processing is started, the processing in step S551 is executed similarly to the processing in step S401 in FIG. 27. That is, an image file is acquired.

In step S552, the optical axis determination unit 235 determines whether or not the main image and the 3D information are obtained on the same optical axis on the basis of the metadata included in the image file.

For example, in a case where flag information of a value indicating that the main image and the 3D information are obtained on the same optical axis is stored in the image file, the optical axis determination unit 235 determines that the main image and the 3D information are obtained on the same optical axis. In addition, in a case where the device name, the model name, or the identification information of the device in which the main image and the 3D information are always obtained on the same optical axis is stored in the image file, the optical axis determination unit 235 determines that the main image and the 3D information are obtained on the same optical axis. In other words, in a case where these pieces of information are not stored in the image file, the optical axis determination unit 235 determines that the main image and the 3D information are obtained on optical axes different from each other.

In a case where it is determined that the main image and the 3D information have been obtained on the same optical axis, the process proceeds to step S553. In this case, each process of steps S553 to S556 is executed similarly to each process of steps S402 to S405 of FIG. 27. That is, validity of the signature is confirmed, and authenticity of the image is confirmed or error processing is performed according to a result of the confirmation. When the process of step S555 or step S556 ends, the confirmation processing ends.

Furthermore, in a case where it is determined in step S552 that the main image and the 3D information have been obtained on optical axes different from each other, the process proceeds to step S556. In this case, the processing in step S556 is executed similarly to the processing in step S405 in FIG. 27. That is, error processing is performed. Then, when the process of step S556 ends, the confirmation processing ends. That is, in this case, the signature confirmation and the image authenticity confirmation processing are omitted (skipped). In this case, the image file is processed as having no authenticity of the main image.

By executing each process in this manner, the server 112 can perform signature confirmation and image authenticity confirmation only in a case where the 3D information is detected on the same optical axis as the main image. Therefore, the server 112 can more accurately determine the authenticity of the image. Note that, in a case where it is determined in step S554 that the signature is invalid, the image confirmation processing in step S555 may be executed, and it may be determined that there is no authenticity of the image in the image confirmation processing.

<2-3-5. Confirmation Processing (Reliability Determination)>

Figure 39:
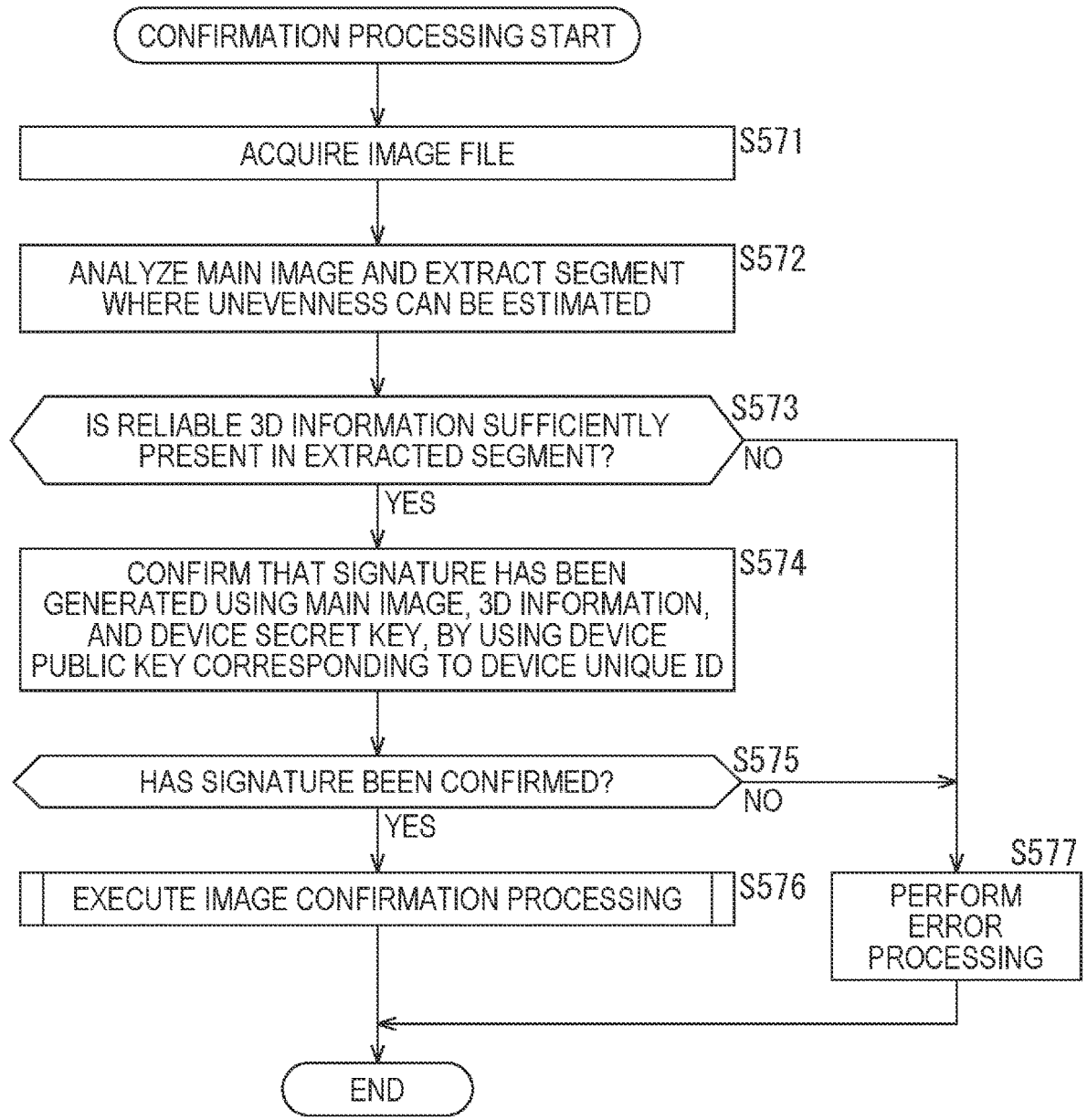
FIG. 39 is a flowchart illustrating an example of a flow of confirmation processing.

Furthermore, signature confirmation and image authenticity confirmation may be performed only in a case where the 3D information is sufficiently reliable on the basis of the information indicating the reliability of the 3D information stored as metadata in the image file. An example of a flow of the confirmation processing in that case will be described with reference to a flowchart of FIG. 39.

When the confirmation processing is started, the processing in step S571 is executed similarly to the processing in step S401 in FIG. 27. That is, an image file is acquired.

In step S572, the reliability determination unit 236 analyzes the main image stored in the image file, and extracts a segment from which the unevenness of the subject can be estimated.

In step S573, the reliability determination unit 236 refers to the information indicating the reliability of the 3D information stored as metadata in the image file, and determines whether or not the 3D information for the segment extracted in step S572 is sufficiently reliable. That is, the reliability determination unit 236 determines whether the 3D information is reliable on the basis of the reliability information indicating the reliability of the 3D information stored as metadata regarding the image in the image file storing the image and the 3D information.

In a case where the 3D information having the reliability higher than the predetermined standard is sufficiently present (more than the predetermined standard) as the 3D information for the segment, the reliability determination unit 236 determines that the 3D information for the segment is sufficiently reliable. Conversely, in a case where there is not sufficient 3D information with a reliability higher than the predetermined standard as the 3D information for the segment, the reliability determination unit 236 determines that the 3D information for the segment is not reliable.

Then, in a case where it is determined that the 3D information for the extracted segment is sufficiently reliable, the process proceeds to step S574. In this case, each process of steps S574 to S577 is executed similarly to each process of steps S402 to S405 of FIG. 27. That is, validity of the signature is confirmed, and authenticity of the image is confirmed or error processing is performed according to a result of the confirmation. When the process of step S576 or step S577 ends, the confirmation processing ends.

Furthermore, in a case where it is determined in step S573 that the 3D information for the extracted segment is not reliable, the process proceeds to step S577. In this case, the processing in step S577 is executed similarly to the processing in step S405 in FIG. 27. That is, error processing is performed. Then, when the process of step S577 ends, the confirmation processing ends. That is, in this case, the signature confirmation and the image authenticity confirmation processing are omitted (skipped). In this case, the image file is processed as having no authenticity of the main image.

By executing each process in this manner, the server 112 can perform signature confirmation and image authenticity confirmation only in a case where the 3D information is sufficiently reliable. Therefore, the server 112 can more accurately determine the authenticity of the image. Note that, in a case where it is determined in step S575 that the signature is invalid, the image confirmation processing in step S576 may be executed, and it may be determined that there is no authenticity of the image in the image confirmation processing.

<2-3-6. Confirmation Processing (Reliability Calculation)>

Figure 40:
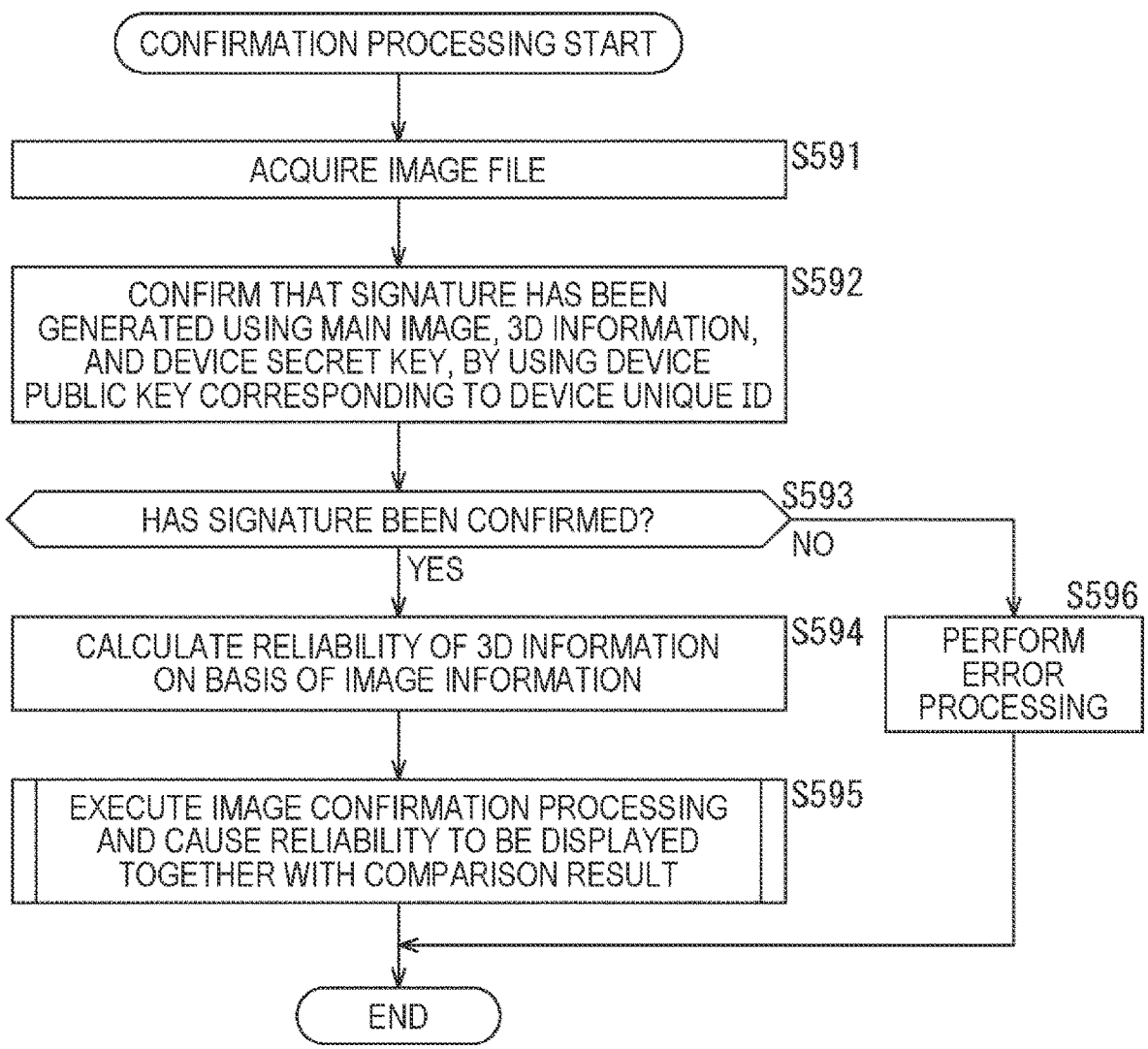
FIG. 40 is a flowchart illustrating an example of a flow of confirmation processing.

The server 112 may calculate the reliability of the 3D information and present the calculated reliability to the reviewer. An example of a flow of the confirmation processing in that case will be described with reference to a flowchart of FIG. 40.

When the confirmation processing is started, each process of steps S591 to S593 is executed similarly to each process of steps S401 to S403 of FIG. 27. That is, the image file is acquired, the validity of the signature is confirmed, and it is determined whether or not the validity has been confirmed. In a case where it is determined in step S593 that the signature is confirmed to be valid by the processing in step S592, the process proceeds to step S594.

In step S594, the reliability calculation unit 237 calculates the reliability of the 3D information stored in the image file on the basis of the metadata (camera parameter related to the image) stored in the image file. For example, the reliability calculation unit 237 calculates the reliability on the basis of the camera parameters such as the number of effective pixels, the F-number, and the focal length of the sensor unit 161 (the image sensor 142 and the 3D information sensor 148) of the imaging device 111 stored in the image file. A method of calculating this reliability is arbitrary.

In step S595, the image confirmation processing unit 233 executes image confirmation processing. This processing is executed basically similarly to the case of step S404 in FIG. 27. However, in this case, the image confirmation processing unit 233 executes the image confirmation processing using the reliability of the 3D information calculated in step S594. For example, the support processing unit 242 may present information indicating the reliability of the 3D information to the reviewer together with a comparison result of the state of the unevenness of the image and the 3D information. Furthermore, the image verification unit 241 may determine the authenticity of the main image using the reliability of the 3D information. When the process of step S595 ends, the confirmation processing ends.

Furthermore, in step S593, in a case where it is determined that it has not been confirmed that the signature is valid by the process of step S592 (it has been confirmed that the signature is invalid), the process proceeds to step S596. In step S596, the image confirmation processing unit 233 performs error processing. When the process of step S596 ends, the confirmation processing ends. That is, in this case, the calculation of the reliability in step S594 and the image confirmation processing in step S595 are not executed (these processing are omitted (skipped)). In this case, the image file is processed as having no authenticity of the main image.

By executing each process in this manner, the server 112 can calculate the reliability of the 3D information and present the reliability to the reviewer, for example. As a result, the reviewer can grasp the reliability of the 3D information. For example, in a case where the server 112 confirms the authenticity of the image and presents the confirmation result to the reviewer, the reviewer can grasp the certainty of the confirmation result. Furthermore, in a case where the reviewer confirms the authenticity of the image, the reviewer can more accurately determine the authenticity of the image on the basis of the reliability of the 3D information. Furthermore, for example, the server 112 can calculate the reliability of the 3D information and determine the authenticity of the image using the reliability. As a result, the server 112 can more accurately determine the authenticity of the image. Note that, in a case where it is determined in step S593 that the signature is invalid, the reliability calculation processing in step S594 and the image confirmation processing in step S595 may be executed, and it may be determined that there is no authenticity of the image in the image confirmation processing.

<2-3-7. Confirmation Processing (Shutter Speed Determination)>

As described above in <2-2-3. Imaging Processing> and the like, in a case where the shutter speed is slow, that is, in a case where the exposure period is long, it is possible to execute trick shooting such as switching the subject during the exposure. That is, it is possible to generate a false image having different subjects between the 3D information and the image. For example, if the shutter speed is set to 10 seconds in a dark room, the imaging device 111 is directed to a person until immediately before imaging, and the imaging device 111 is directed to the monitor of the composite image after exposure is started, an image of a subject different from the subject indicated by the 3D information can be obtained.

Figure 41:
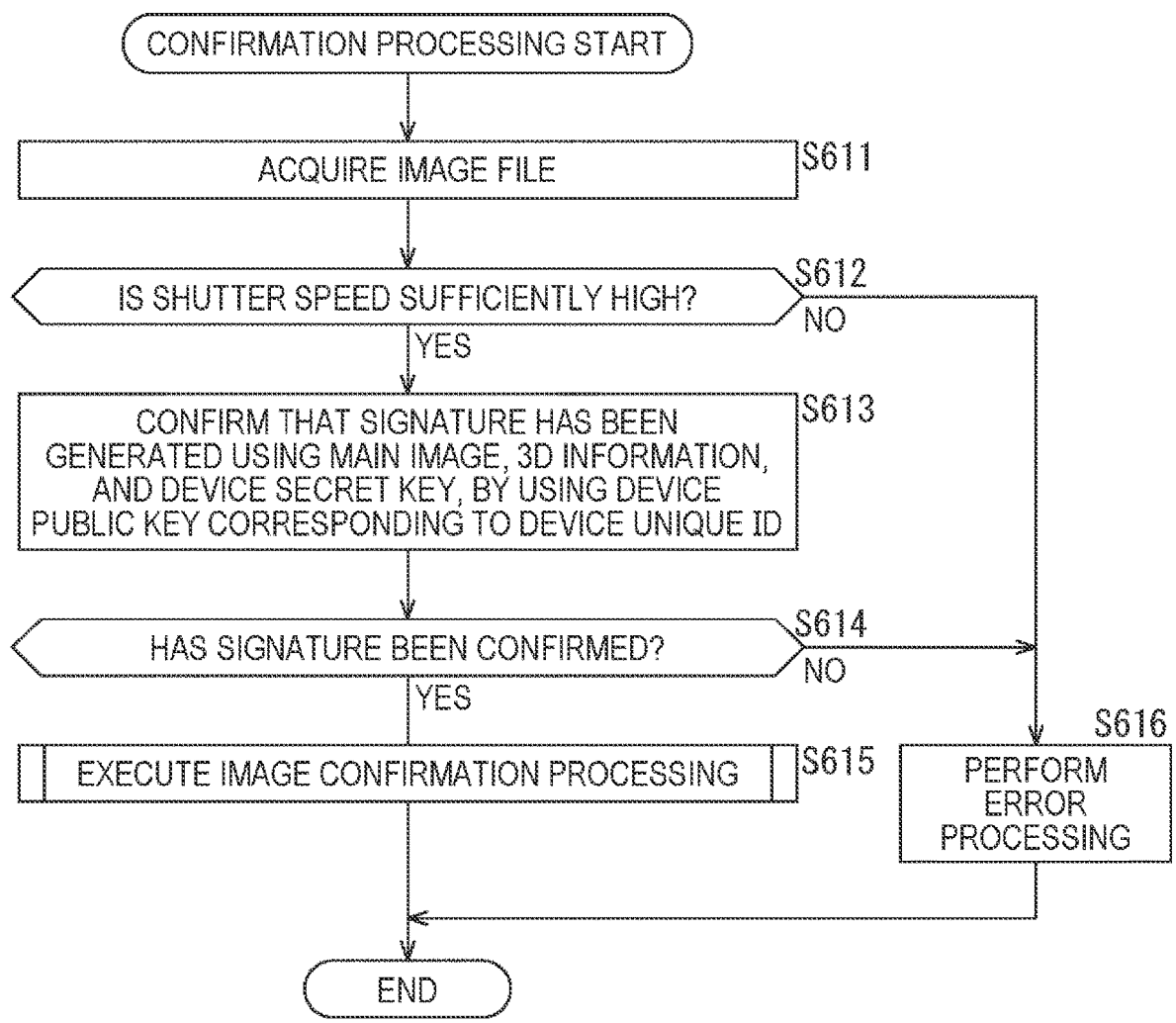
FIG. 41 is a flowchart illustrating an example of a flow of confirmation processing.

Therefore, the shutter speed at the time of generating the main image may be determined, and signature confirmation or image authenticity confirmation may be performed only in a case where the shutter speed is sufficiently high. An example of a flow of the confirmation processing in that case will be described with reference to a flowchart of FIG. 41.

When the confirmation processing is started, the processing in step S611 is executed similarly to the processing in step S401 in FIG. 27. That is, an image file is acquired.

In step S612, the shutter speed determination unit 238 refers to the information indicating the shutter speed of imaging when an image is generated, which is stored in the image file as the camera parameter related to the image, and determines whether or not the shutter speed at the time of generating the main image is sufficiently high. In a case where the shutter speed indicated by the information is higher than the predetermined standard, the shutter speed determination unit 238 determines that the shutter speed at the time of generating the main image is sufficiently high. Conversely, in a case where the shutter speed indicated by the information is lower than the predetermined standard, the shutter speed determination unit 238 determines that the shutter speed at the time of generating the main image is not sufficiently high.

Then, in a case where it is determined that the shutter speed at the time of generating the main image is sufficiently high (faster than the predetermined standard), the process proceeds to step S613. In this case, each process of steps S613 to S616 is executed similarly to each process of steps S402 to S405 of FIG. 27. That is, validity of the signature is confirmed, and authenticity of the image is confirmed or error processing is performed according to a result of the confirmation. When the process of step S615 or step S616 ends, the confirmation processing ends.

Furthermore, in a case where it is determined in step S612 that the shutter speed at the time of generating the main image is not sufficiently high (slower than the predetermined standard), the process proceeds to step S616. In this case, the processing in step S616 is executed similarly to the processing in step S405 in FIG. 27. That is, error processing is performed. Then, when the process of step S616 ends, the confirmation processing ends. That is, in this case, the signature confirmation and the image authenticity confirmation processing are omitted (skipped). In this case, the image file is processed as having no authenticity of the main image.

By executing each process in this manner, the server 112 can perform signature confirmation and image authenticity confirmation only in a case where the shutter speed at the time of generating the main image is sufficiently high. That is, the server 112 can perform signature confirmation and image authenticity confirmation only in a case where it is difficult to perform the above-described trick shooting and there is a high possibility that the main image is not a false image. Therefore, the server 112 can more accurately determine the authenticity of the image. Note that, in a case where it is determined in step S614 that the signature is invalid, the image confirmation processing in step S615 may be executed, and it may be determined that there is no authenticity of the image in the image confirmation processing.

<2-3-8. Confirmation Processing (JPEG Image Signature)>

Figure 42:
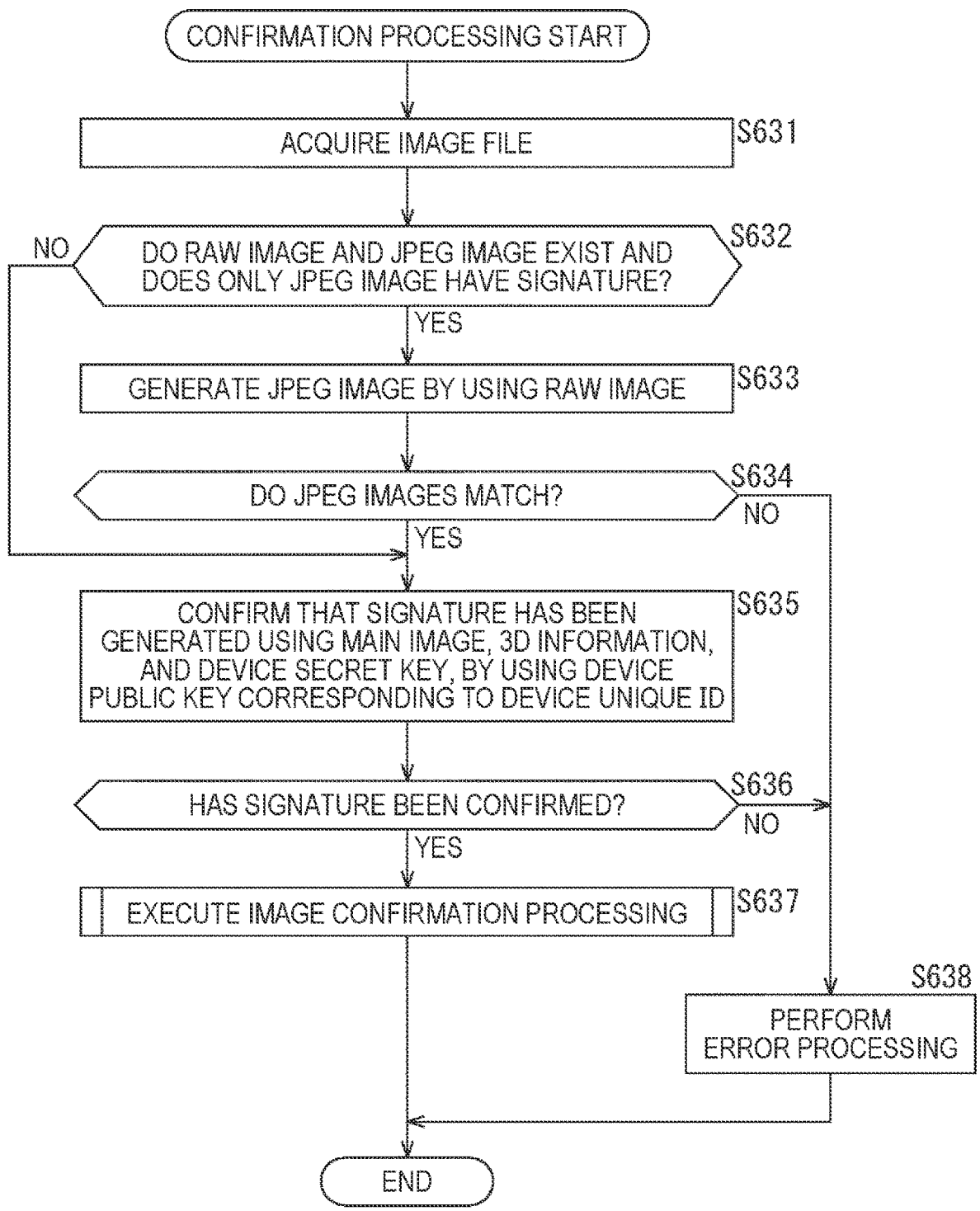
FIG. 42 is a flowchart illustrating an example of a flow of confirmation processing.

For example, in a case where both a RAW image and a JPEG image are stored as a main image in an image file and only a signature of the JPEG image is stored in the image file, the server 112 may determine whether the RAW image and the JPEG image match each other. Then, in a case where the RAW image and the JPEG image match, the signature of the RAW image may also be present. That is, in this case, the server 112 determines that the RAW image is also not falsified on the basis of the determination that the JPEG image is not falsified by the signature of the JPEG image. An example of a flow of the confirmation processing in that case will be described with reference to a flowchart of FIG. 42.

When the confirmation processing is started, the processing in step S631 is executed similarly to the processing in step S401 in FIG. 27. That is, an image file is acquired.

In step S632, the development processing unit 239 determines whether or not a RAW image and a JPEG image are stored as main images in the image file, and whether or not only the JPEG image in the main images has a signature. In a case where it is determined that the RAW image and the JPEG image are stored as the main image in the image file, the signature of the JPEG image is stored in the image file, and the signature of the RAW image is not stored in the image file, the process proceeds to step S633.

In step S633, the development processing unit 239 generates a JPEG image using the RAW image. At that time, the development processing unit 239 generates a JPEG image from the RAW image by a method similar to that of the imaging device 111.

In step S634, the development processing unit 239 compares the JPEG image generated in step S633 with the JPEG image stored in the image file, and determines whether or not the both match. In a case where it is determined that these JPEG images match each other, the process proceeds to step S635. That is, in a case where the RAW image and the JPEG image are stored as the main image in the image file, the signature of the JPEG image is stored in the image file, the signature of the RAW image is not stored in the image file, and the JPEG image generated from the RAW image matches the JPEG image stored in the image file, the process proceeds to step S635.

In addition, in a case where it is determined in step S632 that a RAW image and a JPEG image are not stored as main images in the image file acquired in step S631 (the main image is a RAW image or a JPEG image), the process proceeds to step S635. Furthermore, in a case where it is determined in step S632 that the signature of the JPEG image is not stored in the image file, the process proceeds to step S635. Furthermore, in a case where it is determined in step S632 that the signature of the RAW image is stored in the image file, the process proceeds to step S635.

In this case, each process of steps S635 to S638 is executed similarly to each process of steps S402 to S405 of FIG. 27. That is, validity of the signature is confirmed, and authenticity of the image is confirmed or error processing is performed according to a result of the confirmation. That is, if the signature of the JPEG image stored in the image file is confirmed, the server 112 determines that not only the JPEG image but also the RAW image has not been falsified. Then, the authenticity of the main image (RAW image and JPEG image) is confirmed by the image confirmation processing. When the process of step S637 or step S638 ends, the confirmation processing ends.

In addition, in a case where it is determined in step S634 that the JPEG image generated from the RAW image included in the image file does not match the JPEG image stored in the image file, the process proceeds to step S638. In this case, the processing in step S638 is executed similarly to the processing in step S405 in FIG. 27. That is, error processing is performed. Then, when the process of step S638 ends, the confirmation processing ends. That is, in this case, the signature confirmation and the image authenticity confirmation processing are omitted (skipped). In this case, the image file is processed as having no authenticity of the main image.

By executing each process in this manner, in a case where both the RAW image and the JPEG image are stored as the main image in the image file, only the signature of the JPEG image is stored in the image file, and the RAW image and the JPEG image match with each other, the server 112 can treat the RAW image as not falsified on the basis of the determination that the JPEG image is not falsified by the signature of the JPEG image. Note that, in a case where it is determined in step S636 that the signature is invalid, the image confirmation processing in step S637 may be executed, and it may be determined that there is no authenticity of the image in the image confirmation processing.

3. REDUCED IMAGE SIGNATURE

Figure 43:
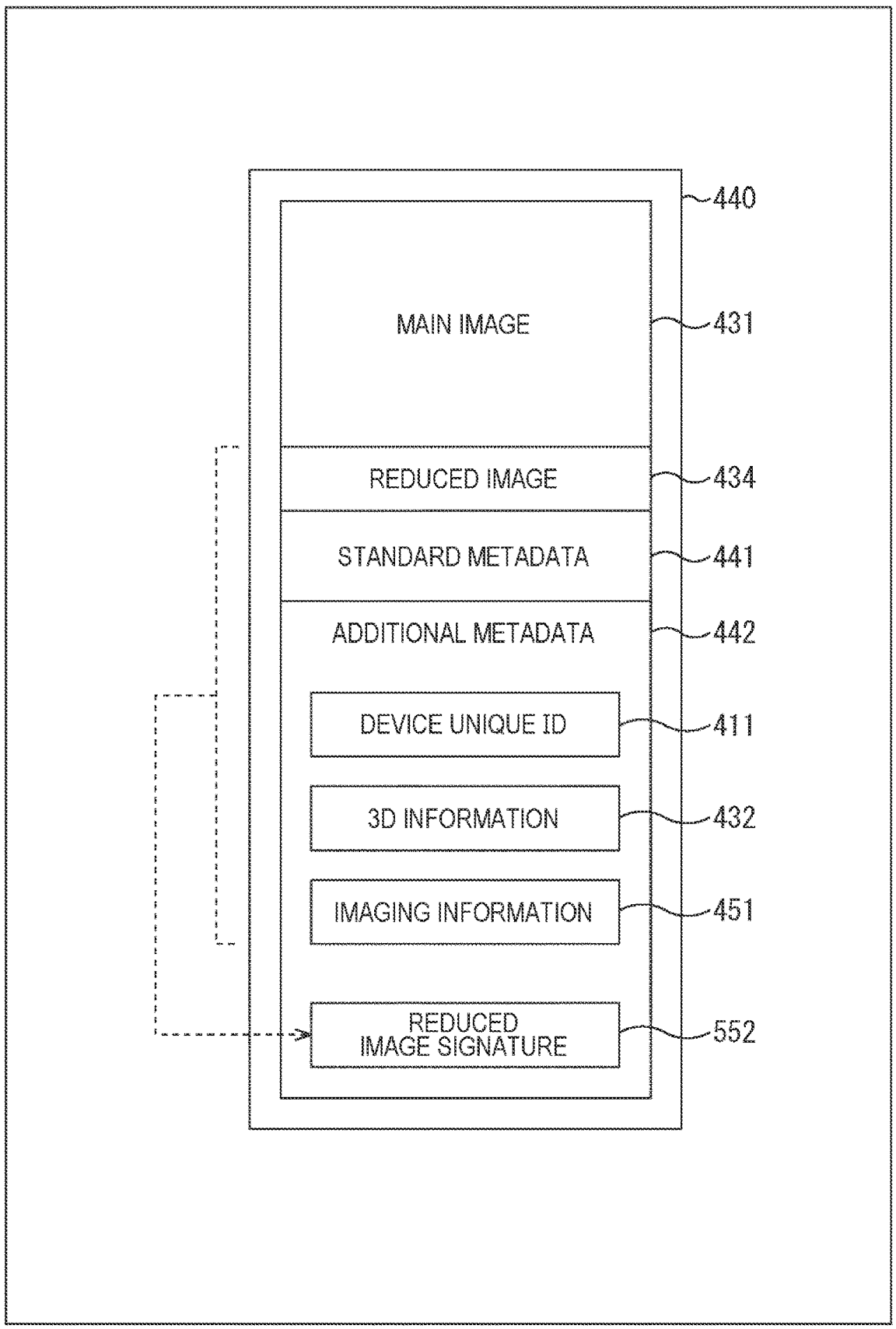
FIG. 43 is a diagram for explaining a main configuration example of an image file.

In the above description, the signature of the main image is stored in the image file, but the signature of the reduced image may be stored instead of the signature of the main image. FIG. 43 illustrates a main configuration example of the image file in that case.

As illustrated in FIG. 43, in this case, a signature (reduced image signature 552) is generated by using the reduced image 434, the standard metadata 441, and the additional metadata 442 (device unique ID 411, 3D information 432, imaging information 451, and the like) excluding the main image 431, and the reduced image signature 552 is stored in the image file 440 as the additional metadata 442.

That is, since the main image 431 is not included in the reduced image signature 552, the data amount of the reduced image signature 552 is smaller than that of the signature 452 (FIG. 19) including the main image 431. Therefore, the reduced image signature 552 can be generated faster with a smaller load than the signature 452.

For example, in a case of a continuous shooting mode in which imaging is performed a plurality of times while an imaging operation is being continued, there is a possibility that generation of an image file will not be in time for generation of a captured image if it takes time to generate a signature since imaging is performed a plurality of times in a short period of time. For example, it is assumed that imaging is performed 10 times per second in the continuous shooting mode and a main image of 20 MB is obtained every time. Then, if it takes 0.9 seconds to generate the signature of the 20 MB main image, the speed of image file generation does not catch up with the speed of imaging, and the imaging pace decreases to about 1 time per 1 second.

Figure 44:
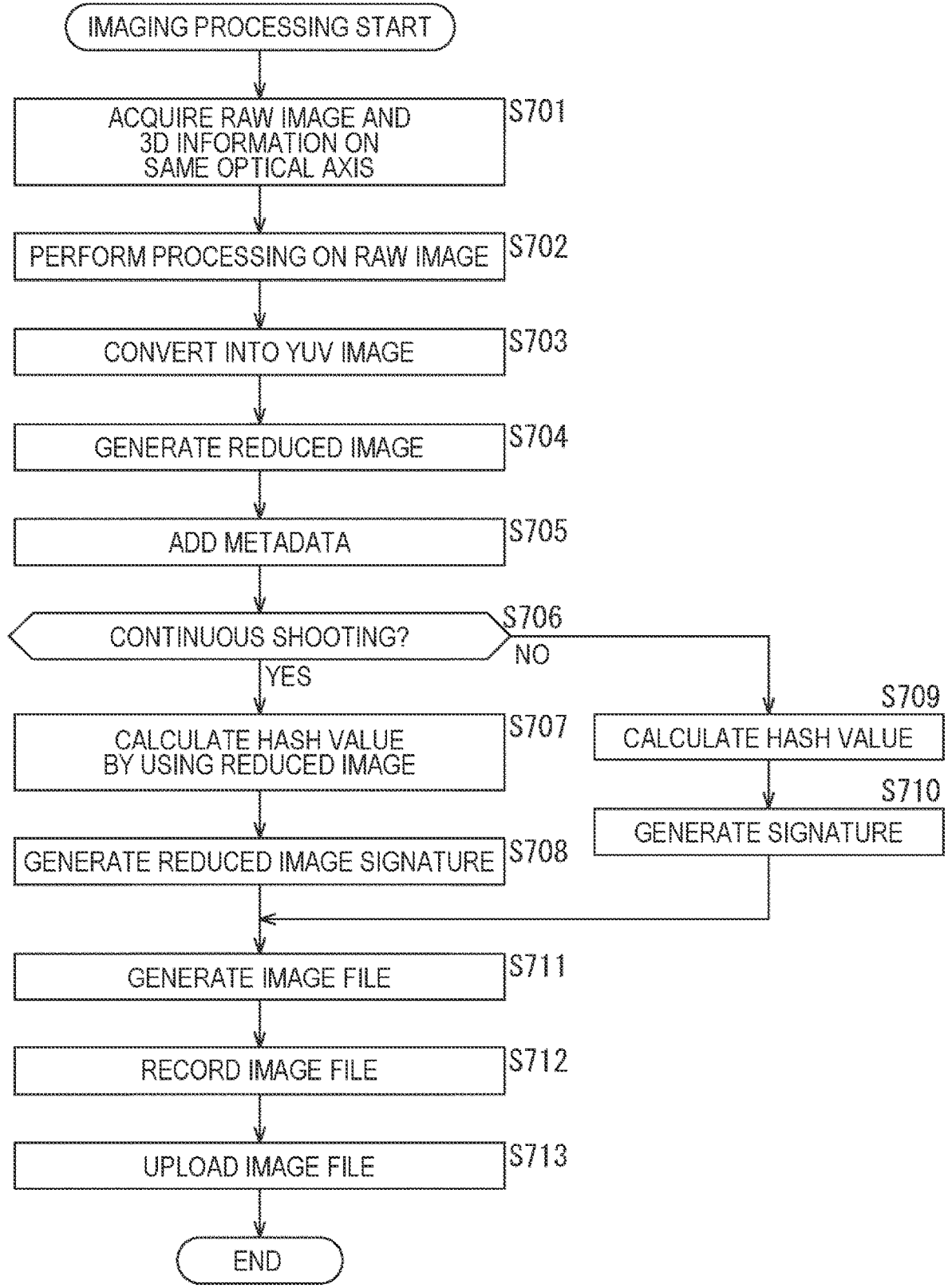
FIG. 44 is a flowchart illustrating an example of a flow of imaging processing.

Therefore, in a case where the main image is generated in the continuous shooting mode, the reduced image signature 552 may be generated instead of the signature 452. An example of a flow of imaging processing executed by the imaging device 111 in that case will be described with reference to a flowchart in FIG. 44.

When the imaging processing is started, each process of steps S701 to S705 is executed similarly to each process of steps S151 to S155 of FIG. 16. That is, the RAW image and the 3D information are obtained on the same optical axis, the RAW image is corrected, and the YUV image, the reduced image, the metadata, and the like are generated.

In step S706, the signature control unit 153 obtains information on the imaging mode of the image sensor 142 from the control unit 121, and determines whether or not the imaging mode is the continuous shooting mode. In a case where it is determined to be the continuous shooting mode, the process proceeds to step S707.

In step S707, the hash processing unit 147 calculates the hash value using the reduced image, the standard metadata, and the additional metadata (device unique ID, 3D information, imaging information, and the like) as described above. Then, in step S708, the signature generation unit 150 encrypts the hash value using the device secret key corresponding to the imaging device 111 read from the storage unit 131 to generate a reduced image signature. Note that the signature generation unit 150 may generate this reduced image signature by encrypting the hash value using a common key instead of the device secret key. When the process of step S708 ends, the process proceeds to step S711.

Furthermore, in step S706, in a case where it is determined that the imaging mode of the image sensor 142 is not the continuous shooting mode (is the single shooting mode in which imaging is performed once for one imaging operation), the process proceeds to step S709. In this case, each process of steps S709 and S710 is executed similarly to each process of steps S156 and S157 in FIG. 16. That is, a hash value is calculated using the main image or the like, and a signature including the main image is generated. When the process of step S710 ends, the process proceeds to step S711.

Each process of steps S711 to S713 is executed similarly to each process of steps S158 to S160 of FIG. 16. That is, an image file storing a reduced image signature or the like is generated, and the image file is recorded or uploaded to the server 112. When the process of step S713 ends, the imaging processing ends. Also in this case, either the process of step S712 or the process of step S713 may be omitted. Furthermore, if the RAW images and the 3D information acquired by the process of step S701 and the metadata generated by the process of step S705 are stored, the processing of the other steps (processing on RAW image, generation of YUV image, generation of reduced image, calculation of hash value, generation of signature or reduced image signature, generation and provision of image file, and the like) may be executed as processing different from the imaging processing after the imaging processing ends.

By executing each process in this manner, the imaging device 111 can generate an image file without delaying imaging even in a case where the image sensor 142 is driven in the continuous shooting mode.

Figure 45:
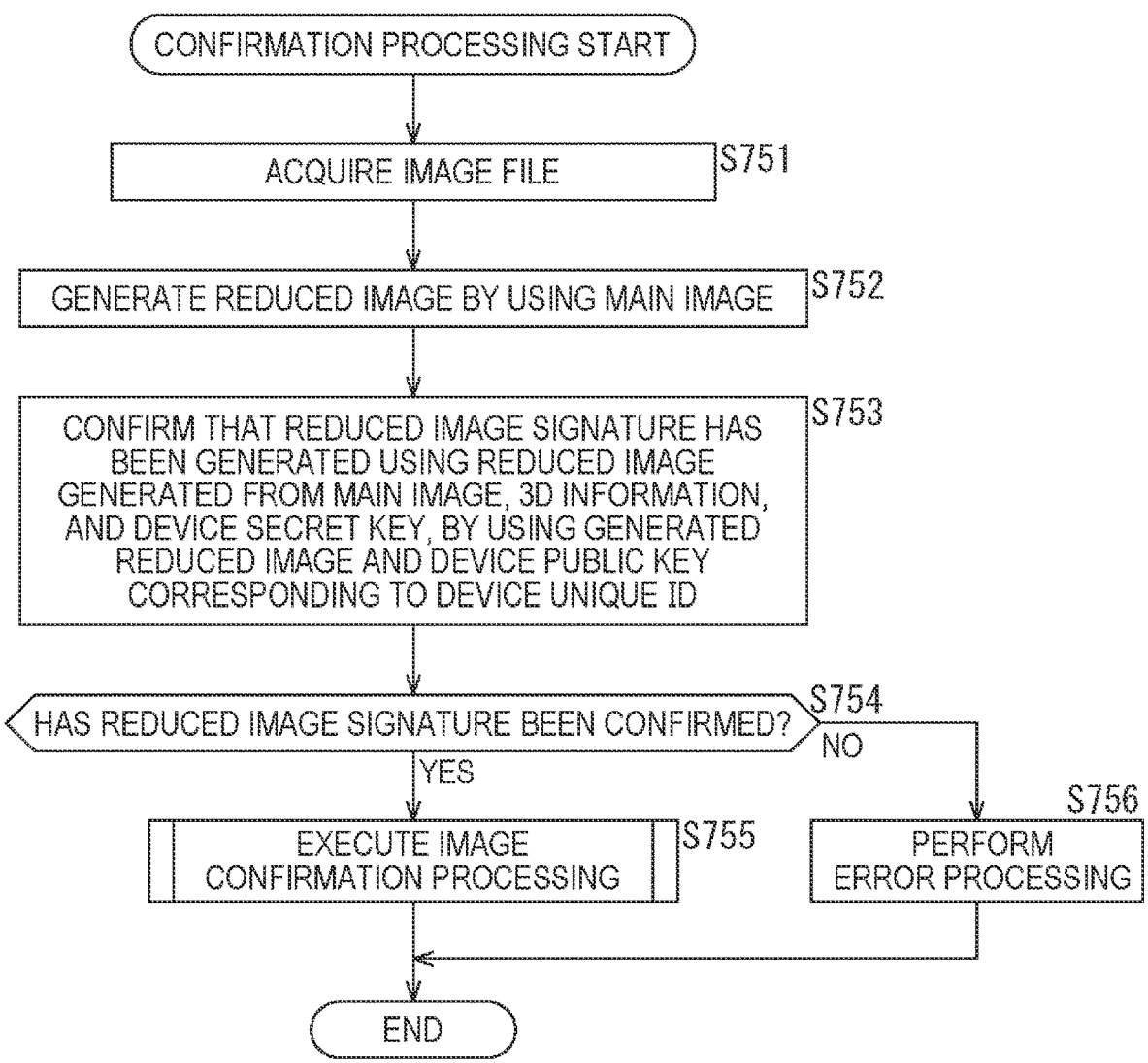
FIG. 45 is a flowchart illustrating an example of a flow of confirmation processing.

An example of a flow of the confirmation processing executed by the server 112 on the image file generated in this manner, that is, the image file storing the reduced image signature will be described with reference to a flowchart of FIG. 45.

When the confirmation processing is started, the processing in step S751 is executed similarly to the processing in step S401 in FIG. 27. That is, the image file transmitted from the imaging device 111 is acquired.

In step S752, the signature confirmation unit 232 reduces the main image included in the image file and generates a reduced image. This reduced image generation method is executed by a method similar to the case where the imaging device 111 generates a reduced image. The reduced image generating method may be shared in advance between the imaging device 111 and the server 112, or information indicating the generating method may be stored in the image file as metadata or the like.

In step S753, the signature confirmation unit 232 accesses the device public key database 223 via the device public key management unit 231, and acquires the device public key corresponding to the device unique ID included in the image file. Then, the signature confirmation unit 232 confirms the validity of the reduced image signature by using the reduced image generated in step S752 and the device public key thereof.

For example, the signature confirmation unit 232 calculates the first hash value using the reduced image generated in step S752 and the 3D information and metadata stored in the image file. In addition, the signature confirmation unit 232 decrypts the reduced image signature stored in the image file using the device public key corresponding to the device unique ID included in the image file, and calculates the second hash value. Then, the signature confirmation unit 232 determines whether or not the first hash value and the second hash value match.

In a case where the first hash value and the second hash value match, the signature confirmation unit 232 determines that the reduced image signature is valid, and the information such as the main image and the 3D information stored in the image file has not been falsified. Conversely, in a case where the first hash value and the second hash value do not match, the signature confirmation unit 232 determines that the reduced image signature is invalid, and the information such as the main image and the 3D information stored in the image file has been falsified.

In step S754, the signature confirmation unit 232 determines whether or not the validity of the reduced image signature has been confirms. In a case where it is determined by the process of step S753 that the reduced image signature is confirmed to be valid, the process proceeds to step S755. In this case, the processing in step S755 is executed similarly to the processing in step S404 in FIG. 27. That is, the image confirmation processing is executed, and the authenticity of the main image is confirmed. When the process of step S755 ends, the confirmation processing ends.

Note that, in a case where it is determined in step S754 that it has not been confirmed by the processing in step S753 that the reduced image signature is valid (that is, it has been confirmed that the reduced image signature is invalid), the process proceeds to step S756. In this case, the processing in step S756 is executed similarly to the processing in step S405 in FIG. 27. That is, error processing is performed. Then, when the process of step S756 ends, the confirmation processing ends. That is, in this case, the image authenticity confirmation processing is omitted (skipped). In this case, the image file is processed as having no authenticity of the main image.

By executing each process as described above, the server 112 can detect falsification of the main image and the 3D information using the reduced image signature. Therefore, the server 112 can more accurately confirm the authenticity of the image while suppressing an increase in load. Note that, in a case where it is determined in step S754 that the signature is invalid, the image confirmation processing in step S755 may be executed, and it may be determined that there is no authenticity of the image in the image confirmation processing.

In the above description, the reduced image signature is applied to the continuous shooting mode, but the reduced image signature can be applied to any operation mode. For example, a reduced image signature may be applied in the single shooting mode. Furthermore, a reduced image signature may be applied to a moving image mode in which a moving image is obtained by imaging.

4. REFLECTION OF CAPTURED IMAGE MODIFICATION ON 3D INFORMATION

In the imaging device 111, in a case of modifying and editing an image generated by imaging performed by the image sensor 142, the content of the modification and editing may also be reflected in the 3D information generated by the 3D information sensor 148. For example, in a case of trimming an image, the imaging device 111 may perform similar trimming on 3D information corresponding to the image. Further, information indicating the contents of the modification and editing may be stored in the image file as metadata.

Figure 46:
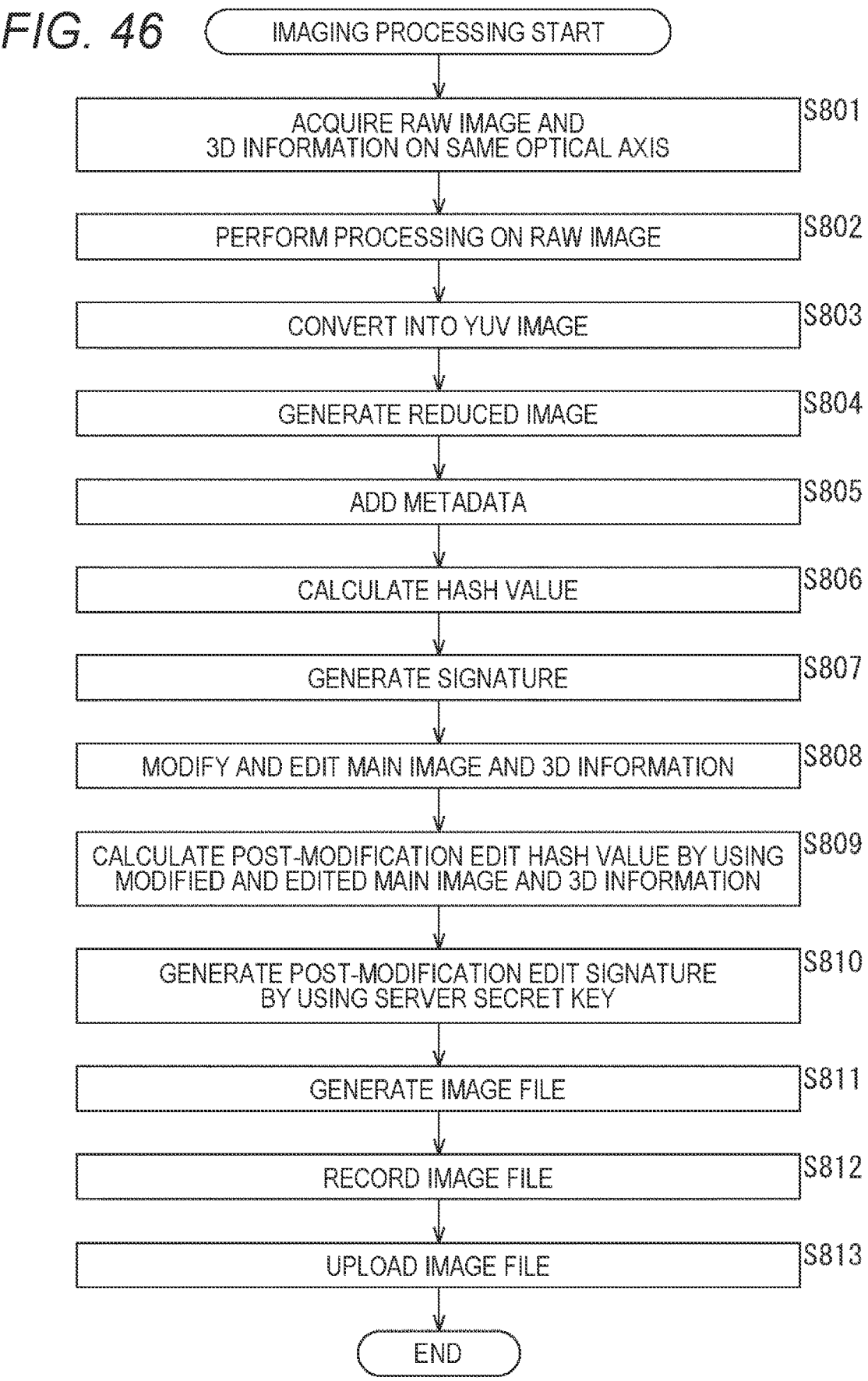
FIG. 46 is a flowchart illustrating an example of a flow of imaging processing.

In such a case, a signature (also referred to as a post-modification edit signature) of various types of information stored in the image file including each edited main image and 3D information may be generated and stored in the image file. In this case, the post-modification edit signature may be generated using a server secret key that is a device secret key corresponding to the server 112. An example of a flow of imaging processing in this case will be described with reference to a flowchart of FIG. 46.

When the imaging processing is started, each process of steps S801 to S807 is executed similarly to each process of steps S151 to S157 of FIG. 16. That is, the RAW image and the 3D information are obtained on the same optical axis, correction processing is performed on the RAW image, a YUV image (or JPEG image), a reduced image, metadata, and the like are generated, hash values thereof are calculated, and a signature is generated using the hash value and the device secret key.

Figure 47:
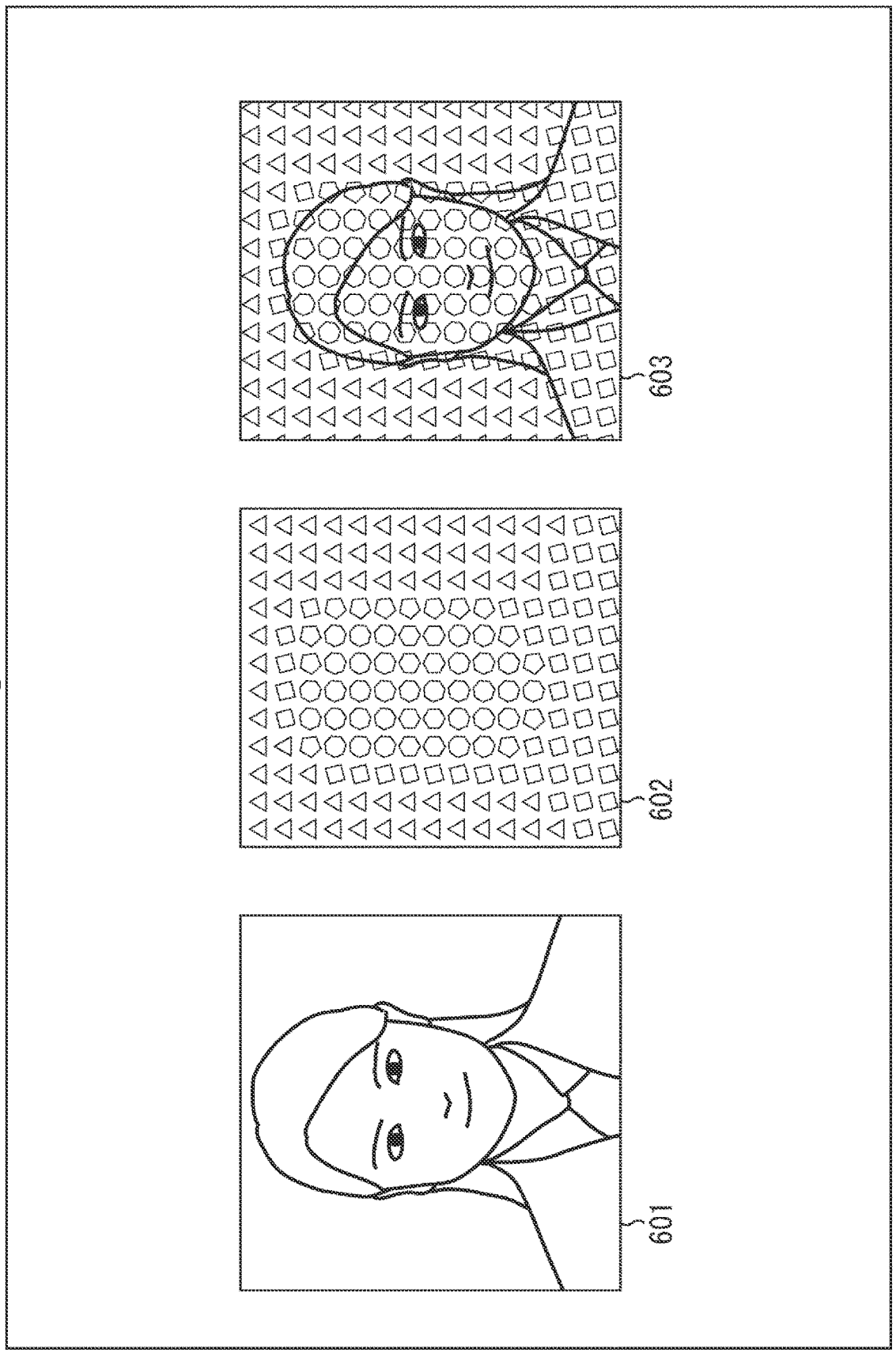
FIG. 47 is a diagram for explaining an example of a modified image and 3D information.

In step S808, the YUV processing unit 144 performs modification and editing on the main image. Furthermore, the 3D information processing unit 149 performs similar modification and editing on the 3D information. For example, the YUV processing unit 144 trims a part of the image 431 in FIG. 18 and extracts the image 601 in FIG. 47. In this case, the 3D information processing unit 149 trims the same region as the trimmed region of the image 431 in the 3D information 432 of FIG. 18, and extracts the 3D information 602 of FIG. 47. That is, the image 601 and the 3D information 602 are obtained by extracting the same region. Therefore, as illustrated in the superimposed image 603 of FIG. 47, the state of the unevenness of the subject estimated from the image 601 coincides with the state of the unevenness indicated by the 3D information 602.

In step S809, the hash processing unit 147 calculates a hash value (also referred to as a post-modification edit hash value) using the main image, the 3D image, and the like modified and edited in step S808.

In step S810, the signature generation unit 150 encrypts the post-modification edit hash value using the server secret key, and generates a post-modification edit signature.

Each process of steps S811 to S813 is executed similarly to each process of steps S158 to S160 of FIG. 16. That is, an image file is generated, the modified and edited main image and 3D image, the reduced image, the metadata, the post-modification edit signature, and the like are stored in the image file, and the image file is recorded or uploaded to the server 112. When the process of step S813 ends, the imaging processing ends. Also in this case, either the process of step S812 or the process of step S813 may be omitted. Furthermore, if the RAW image and the 3D information acquired by the process of step S801 and the metadata generated by the process of step S805 are stored, the processing of other steps (setting of signature execution mode, processing on RAW image, generation of YUV image, generation of reduced image, calculation of hash value, generation of signature, modification and editing, calculation of post-modification edit hash value, generation of post-modification edit signature, generation and provision of image file, and the like) may be executed as processing different from the imaging processing after the imaging processing is completed.

By executing each process in this manner, the imaging device 111 can store the post-modification edit signature in the image file together with the modified and edited main image, the 3D information, and the like. Therefore, the server 112 can also confirm the authenticity of the image after the modification and editing.

Note that the post-modification edit signature generated using the server secret key may or may not include the entire image before modification and editing in the signature target.

Furthermore, in a case where modification and editing are performed on an image or 3D information a plurality of times, a post-modification edit signature may be generated with the latest modified and edited image as a signature target, or a post-modification edit signature may be generated each time modification and editing is performed.

Furthermore, in a case where modification and editing of combining a plurality of images are performed, the imaging device 111 may store 3D information corresponding to each of the images and an image representing a composite interface of each of the images in an image file. Furthermore, the imaging device 111 may combine the 3D information corresponding to each image similarly to the image.

In this case, the server 112 executes the confirmation processing similarly to the case described with reference to the flowchart of FIG. 27, and confirms the signature or confirms the authenticity of the image. However, in this case, the server 112 confirms the post-modification edit signature using the server secret key.

5. APPLICATION EXAMPLE

<5-1. Server Verification>

The comparison between the image and the 3D information by the server 112 (comparison of the state of unevenness) may be performed using feature points such as a face and a person. In addition, this comparison may be performed using artificial intelligence (AI).

Furthermore, for example, the server 112 may confirm, using the 3D information, that a feature that should be relatively close in the image is close and a feature that should be relatively far is far. The feature to be confirmed may be any feature. For example, it may be other than the face, nose, or the like of a person. For example, AI may be applied to this confirmation, and this confirmation may be performed in a state where what is specifically characterized is unknown.

<5-2. Communication>

Note that transfer of image files between the imaging device 111 and the server 112 may be performed by communication, or may be performed via a removable recording medium such as an SD card (registered trademark), for example.

<5-3. Image Format>

In the signature, all the information in the image file including the main image of the original pixel number may be set as the signature target, or the main image may be excluded from the signature target. In addition, both a signature including the main image and a signature not including the main image (for example, a reduced image signature) may be generated and stored in the image file.

In addition, the image, the 3D information, and other additional information may be signed in a form of being put together into one file, or may be signed after specifying how to put together separately and arranging in the way of putting together.

In addition, the signature may be stored in an image file or may be stored in a file different from the image file.

In addition, the signature may be an electronic signature or a hash using a secret key of Rivest-Shamir-Adleman cryptosystem (RSA). These may be generated from the entire target data or it may be performed on a hash value calculated by performing high-speed hash generation processing such as Sha256 from the target data.

One main image or a plurality of main images may be stored in one image file. It similarly applies to the reduced image.

The format of the main image stored in the image file is arbitrary, and may be other than a JPEG image. For example, the main image may be a RAW image, a High Efficiency Image File Format (HEIF) image, or a Portable Network Graphics (PNG) image. Of course, other formats may be used.

A model sharing secret key (also referred to as a model secret key) may be provided, and the image may be signed using the model secret key. Then, the server 112 may confirm the signature by using a model sharing public key (also referred to as a model public key).

The signature of the image may be substituted by a hash value of the image by Sha or the like encrypted with the server public key. Then, the server 112 may decrypt the signature using the server secret key to confirm validity. Furthermore, the imaging device 111 and the server 112 may apply a common key. That is, the imaging device 111 may generate a signature using the common key, and the server 112 may confirm the signature using the common key.

6. APPENDIX

Note that, as long as there is no contradiction, any plurality of methods of the above-described various methods may be applied in combination. Furthermore, the various methods described above may be applied in combination with any other method not described above.

<Computer>

The above-described series of processing can be executed by hardware or software. In a case where the series of processing is executed by software, a program constituting the software is installed in a computer. Here, the computer includes a computer incorporated in dedicated hardware, a general-purpose personal computer capable of executing various functions by installing various programs, and the like, for example.

Figure 48:
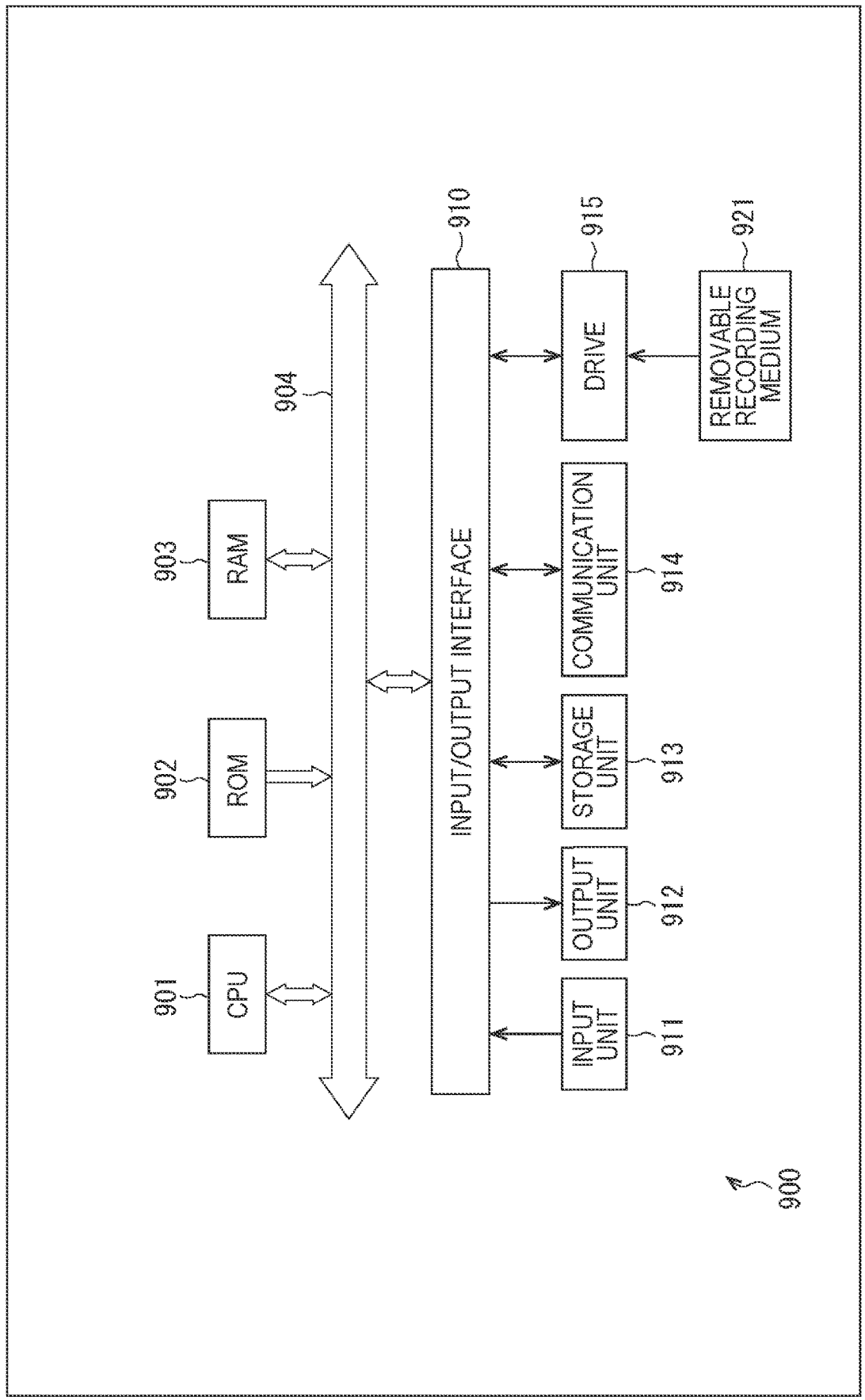
FIG. 48 is a block diagram illustrating a main configuration example of a computer.

FIG. 48 is a block diagram illustrating a configuration example of hardware of a computer that executes the above-described series of processing by a program.

In a computer 900 illustrated in FIG. 48, a central processing unit (CPU) 901, a read only memory (ROM) 902, and a random access memory (RAM) 903 are mutually connected via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable recording medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904 and executes the program, whereby the above-described series of processing is performed. The RAM 903 also appropriately stores data and the like necessary for the CPU 901 to execute various processes.

The program executed by the computer can be applied, for example, by being recorded in the removable recording medium 921 as a package medium or the like. In that case, the program can be installed in the storage unit 913 via the input/output interface 910 by attaching the removable recording medium 921 to the drive 915.

Furthermore, this program can also be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

<Object to which the Present Technology is Applicable>

The present technology can be applied to any image encoding/decoding method.

Furthermore, the present technology can be applied to an arbitrary configuration. For example, the present technology can be applied to various electronic devices.

Furthermore, for example, the present technology can also be implemented as a partial configuration of an apparatus, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to an arbitrary terminal such as a computer, an audio visual (AV) device, a portable information processing terminal, or an Internet of Things (IoT) device.

Note that, in the present specification, a system means a set of a plurality of components (devices, modules (parts), and the like), and it does not matter whether or not all the components are in the same housing. Therefore, a plurality of devices housed in separate housings and connected via a network and one device in which a plurality of modules is housed in one housing are both systems.

<Others>

The embodiments of the present technology are not limited to the above-described embodiments, and various modifications can be made without departing from the gist of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, a configuration other than the above-described configurations may be added to the configuration of each device (or each processing unit). Furthermore, as long as the configuration and operation of the entire system are substantially the same, a part of the configuration of a certain device (or processing unit) may be included in the configuration of another device (or another processing unit).

Furthermore, for example, the above-described program may be executed in an arbitrary device. In that case, it is sufficient that the device has a necessary function (functional block or the like) and can obtain necessary information.

Furthermore, for example, each step of one flowchart may be executed by one device, or may be shared and executed by a plurality of devices. Furthermore, in a case where a plurality of processes is included in one step, the plurality of processes may be executed by one device, or may be shared and executed by a plurality of devices. In other words, a plurality of processes included in one step can also be executed as processes of a plurality of steps. Conversely, the processing described as a plurality of steps can be collectively executed as one step.

Furthermore, for example, in the program executed by the computer, process of steps describing the program may be executed in time series in the order described in the present specification, or may be executed in parallel or individually at necessary timing such as when a call is made. That is, as long as there is no contradiction, the processing of each step may be executed in an order different from the above-described order. Furthermore, the process of steps describing this program may be executed in parallel with the processing of another program, or may be executed in combination with the processing of another program.

Furthermore, for example, a plurality of techniques related to the present technology can be implemented independently as a single body as long as there is no contradiction. Of course, a plurality of arbitrary present technologies can be implemented in combination. For example, some or all of the present technology described in any of the embodiments can be implemented in combination with some or all of the present technology described in other embodiments. Furthermore, some or all of the above-described arbitrary present technology can be implemented in combination with other technologies not described above.

Note that the present technology can also have the following configurations.

(1) An image processing apparatus including:
an image acquisition unit that acquires an image of a subject by capturing an optical image from the subject;
a 3D information acquisition unit that acquires 3D information from the optical image on a same optical axis as the image; and
a signature generation unit that generates a signature of the image and the 3D information.

(2) The image processing apparatus according to (1),
in which the 3D information includes distance-related information about a plurality of places in the image or information generated on the basis of the distance-related information.

(3) The image processing apparatus according to (1) or (2),
in which the 3D information acquisition unit acquires the 3D information using a phase difference method.

(4) The image processing apparatus according to any one of (1) to (3),
in which the 3D information acquisition unit acquires the 3D information at a main exposure start timing at which the image acquisition unit starts main exposure in the capturing.

(5) The image processing apparatus according to (4),
in which, in a case of a single autofocus mode, the 3D information acquisition unit acquires the 3D information at a focus fixing timing at which control for fixing a focus is performed and the main exposure start timing.

(6) The image processing apparatus according to any one of (1) to (5), further including
an image file generation unit that generates an image file storing the image, the 3D information, metadata including information indicating that the 3D information has been acquired on the same optical axis as the image, and the signature.

(7) The image processing apparatus according to any one of (1) to (6), further including
an image file generation unit that generates an image file storing the image, the 3D information, metadata including reliability information indicating reliability of the 3D information, and the signature.

(8) The image processing apparatus according to any one of (1) to (7), further including
a plane determination unit that determines whether or not the shape of the subject is a plane on the basis of the 3D information,
in which the signature generation unit generates the signature in a case where the plane determination unit determines that the shape of the subject is not a plane.

(9) The image processing apparatus according to any one of (1) to (8), further including:
a key generation unit that generates a key corresponding to the image processing apparatus; and
a providing unit that provides the key to a server.

(10) An image processing method including:
acquiring an image of a subject by capturing an optical image from the subject;
acquiring 3D information from the optical image on a same optical axis as the image; and
generating a signature of the image and the 3D information.

(11) An image processing apparatus including
an image confirmation processing unit that confirms authenticity of the image by comparing the image with 3D information acquired on the same optical axis as the image.

(12) The image processing apparatus according to (11),
in which the image confirmation processing unit compares unevenness of a subject of the image detected from the image with unevenness of the subject based on the 3D information.

(13) The image processing apparatus according to (12),
in which the image confirmation processing unit determines authenticity of the image on the basis of a result of comparison.

(14) The image processing apparatus according to (12),
in which the image confirmation processing unit performs display control to display a result of comparison on a display unit.

(15) The image processing apparatus according to any one of (11) to (14), further including
a signature confirmation unit that confirms validity of a signature of the image and the 3D information,
in which the image confirmation processing unit determines that there is no authenticity of the image in a case where validity of the signature cannot be confirmed.

(16) The image processing apparatus according to any one of (11) to (15), further including
an optical axis determination unit that determines whether the 3D information has been acquired on the same optical axis as the image,
in which the image confirmation processing unit determines that there is no authenticity of the image in a case where the 3D information is not acquired on the same optical axis as the image.

(17) The image processing apparatus according to any one of (11) to (16), further including
a reliability determination unit that determines whether the 3D information is reliable on the basis of reliability information indicating reliability of the 3D information, the reliability information being stored in an image file that stores the image and the 3D information,
in which the image confirmation processing unit determines that there is no authenticity of the image in a case where the 3D information is not reliable.

(18) The image processing apparatus according to any one of (11) to (17), further including
a reliability calculation unit that calculates reliability of the 3D information on the basis of a camera parameter related to the image, the camera parameter being stored in an image file that stores the image and the 3D information.

(19) The image processing apparatus according to any one of (11) to (18), further including
a shutter speed determination unit that determines whether a shutter speed of imaging when the image is generated is higher than a standard predetermined on the basis of a camera parameter related to the image, the camera parameter being stored in an image file that stores the image and the 3D information,
in which the image confirmation processing unit determines that there is no authenticity of the image in a case where the shutter speed is slower than the standard.

(20) An image processing method including
confirming authenticity of an image by comparing the image with 3D information acquired on a same optical axis as the image

REFERENCE SIGNS LIST

100 Image processing system
110 Network
111 Imaging device

112 Server
113 Terminal device
121 Control unit
122 Imaging processing unit
131 Storage unit
132 Key generation unit
133 Upload unit
134 Recording unit
141 Optical system
142 Image sensor
143 RAW processing unit
144 YUV processing unit
145 Reduced image generation unit
146 Metadata addition unit
147 Hash processing unit
148 3D information sensor
149 3D information processing unit
150 Signature generation unit
151 Image file generation unit
153 Signature control unit
154 Reliability calculation unit
161 Sensor unit
171 Image plane phase difference pixel
201 Control unit
221 Communication unit
222 Image analysis engine
223 Device public key database
231 Device public key management unit
232 Signature confirmation unit
233 Image confirmation processing unit
234 Confirmation control unit
235 Optical axis determination unit
236 Reliability determination unit
237 Reliability calculation unit
238 Shutter speed determination unit
239 Development processing unit
241 Image verification unit
242 Support processing unit
301 CPU
302 ROM
303 RAM
304 Bus
310 Input/output interface
311 Input unit
312 Output unit
313 Storage unit
314 Communication unit
315 Drive
321 Removable recording medium

The invention claimed is:

1. An image processing apparatus comprising:
one or more processors;
an image acquisition unit that acquires an image of a subject by capturing an optical image from the subject;
a 3D information acquisition unit that acquires 3D information showing an unevenness of the subject from the optical image on a same optical axis as the image; and
a signature generation unit that generates a signature of the image and the 3D information, wherein
the image acquisition unit includes a pixel array in which pixels that photoelectrically convert light from the subject are arranged in a matrix, and
the 3D information acquisition unit includes a plurality of image plane phase difference detection pixels formed in the pixel array, and uses the image plane phase difference detection pixels to obtain information about a plurality of locations in the image acquired by the pixel array.

2. The image processing apparatus according to claim 1, wherein the 3D information acquisition unit acquires the 3D information using a phase difference.

3. The image processing apparatus according to claim 1, wherein the 3D information acquisition unit acquires the 3D information in a predetermined range corresponding to an angle of view of the image.

4. The image processing apparatus according to claim 1, wherein the signature generation unit encrypts a hash value of information including the image and the 3D information to generate the signature.

5. The image processing apparatus according to claim 1, wherein
the image acquisition unit acquires a moving image of the subject, and
the 3D information acquisition unit acquires the 3D information from the optical image on the same optical axis as the moving image.

6. The image processing apparatus according to claim 1, wherein
the image acquisition unit acquires the image from one of the optical images split by a beam splitter, and
the 3D information acquisition unit acquires the 3D information from an other of the optical images split by the beam splitter.

7. The image processing apparatus according to claim 1, wherein
the 3D information acquisition unit acquires the 3D information at a main exposure start timing when the main exposure is started in the imaging by the image acquisition unit.

8. The image processing apparatus according to claim 1, wherein
the 3D information acquisition unit acquires the 3D information multiple times in one imaging by the image acquisition unit.

9. The image processing apparatus according to claim 1, further comprising:
an image file generation unit that generates an image file in which the image, the 3D information, and the signature are stored.

10. The image processing apparatus according to claim 1, further comprising:
a reliability calculation unit that calculates a reliability of the 3D information based on the image and the 3D information.

11. The image processing apparatus according to claim 1, further comprising:
a display unit that displays a reliability of the image and the 3D information.

12. The image processing apparatus according to claim 1, further comprising:
an image file generation unit that generates an image file containing the image, the 3D information, metadata including information indicating a reliability of the 3D information, and the signature.

13. An image processing apparatus according to claim 1, wherein the 3D information is acquired on a same optical axis as the image.

14. The image processing apparatus according to claim 1, wherein
if a validity of the signature cannot be confirmed, a signature verification unit updates metadata of the image and reconfirms the validity of the signature.

15. An image processing apparatus comprising:
one or more processors;
an image acquisition unit that acquires an image of a subject by capturing an optical image from the subject;
a 3D information acquisition unit that acquires 3D information showing an unevenness of the subject from the optical image on a same optical axis as the image; and
a signature generation unit that generates a signature of the image and the 3D information; and
a plane determination unit that determines whether a shape of the subject is a plane based on the 3D information, wherein
the signature generation unit generates the signature when the plane determination unit determines that the shape of the subject is not a plane.

16. An image processing apparatus comprising:
one or more processors;
an image acquisition unit that acquires an image of a subject by capturing an optical image from the subject;
a 3D information acquisition unit that acquires 3D information showing an unevenness of the subject from the optical image on a same optical axis as the image;
a signature generation unit that generates a signature of the image and the 3D information; and
an image processing and editing unit that processes and edits the image; and
a 3D information processing and editing unit that performs the same processing and editing as that performed on the image on the 3D information, wherein
the signature generation unit generates a signature of the processed and edited image and the 3D information.

17. The image processing apparatus according to claim 16, further comprising:
an image file generation unit that generates an image file that stores the processed and edited image, the 3D information, the signature, and metadata indicating the processed and edited image.

18. An image processing apparatus comprising:
one or more processors;
an image acquisition unit that acquires an image of a subject by capturing an optical image from the subject;
a 3D information acquisition unit that acquires 3D information showing an unevenness of the subject from the optical image on a same optical axis as the image;
a signature generation unit that generates a signature of the image and the 3D information; and
a signature verification unit that verifies a validity of a signature of information containing an image of a subject and 3D information indicating a state of the unevenness of the subject, wherein
when the validity of the signature is confirmed, an authenticity of the image is verified by comparing the state of the unevenness of the subject estimated from the image with the state of the unevenness of the subject indicated by the 3D information.

19. An image processing apparatus comprising:
one or more processors;
an image acquisition unit that acquires an image of a subject by capturing an optical image from the subject;
a 3D information acquisition unit that acquires 3D information showing an unevenness of the subject from the optical image on a same optical axis as the image;
a signature generation unit that generates a signature of the image and the 3D information; and
an optical axis determination unit that determines whether the 3D information was acquired on the same optical axis as the image; and
an image confirmation processing unit that determines that the image is not authentic when the 3D information is not acquired on the same optical axis as the image.

20. The image processing apparatus according to claim 19, wherein image confirmation processing unit performs display control to display a result of a comparison on the display unit.

21. The image processing apparatus according to claim 19, further comprising:
a reliability determination unit that determines whether the 3D information is reliable based on reliability information indicating the reliability of the 3D information stored in an image file that stores the image and the 3D information, wherein
the image confirmation processing unit determines that the image is not authentic when the 3D information is unreliable.

22. The image processing apparatus according to claim 19, further comprising:
a reliability calculation unit that calculates a reliability of the 3D information based on camera parameters related to the image, stored in an image file that stores the image and the 3D information, wherein
the image confirmation processing unit confirms an authenticity of the image based on the reliability of the 3D information.

23. An image processing method comprising:
acquiring, by an image acquisition unit, an image of a subject by capturing an optical image from the subject;
acquiring, by a 3D information acquisition unit, 3D information showing an unevenness of the subject from the optical image on a same optical axis as the image; and
generating a signature of the image and the 3D information, wherein
the image acquisition unit includes a pixel array in which pixels that photoelectrically convert light from the subject are arranged in a matrix, and
the 3D information acquisition unit includes a plurality of image plane phase difference detection pixels formed in the pixel array, and uses the image plane phase difference detection pixels to obtain information about a plurality of locations in the image acquired by the pixel array.

24. A non-transitory computer readable medium storing program code for image processing, the program code being executable by a processor to perform operations comprising:
acquiring, by an image acquisition unit, an image of a subject by capturing an optical image from the subject;
acquiring, by a 3D information acquisition unit, 3D information showing an unevenness of the subject from the optical image on a same optical axis as the image; and
generating a signature of the image and the 3D information, wherein
the image acquisition unit includes a pixel array in which pixels that photoelectrically convert light from the subject are arranged in a matrix, and
the 3D information acquisition unit includes a plurality of image plane phase difference detection pixels formed in the pixel array, and uses the image plane phase difference detection pixels to obtain information about a plurality of locations in the image acquired by the pixel array.

* * * * *